United States Patent
Walker et al.

(10) Patent No.: US 8,041,453 B2
(45) Date of Patent: Oct. 18, 2011

(54) METHOD AND APPARATUS FOR DEFINING AND UTILIZING PRODUCT LOCATION IN A VENDING MACHINE

(75) Inventors: Jay S. Walker, Ridgefield, CT (US); Daniel E. Tedesco, Huntington, CT (US); Sih Y. Lee, Northvale, NJ (US); Paul D. Signorelli, New York, NY (US); James A. Jorasch, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 315 days.

(21) Appl. No.: 10/951,296

(22) Filed: Sep. 27, 2004

(65) Prior Publication Data

US 2006/0102645 A1    May 18, 2006

(51) Int. Cl.
*G06F 17/00* (2006.01)

(52) U.S. Cl. ........ 700/238; 235/378; 235/381; 235/385; 705/14.1; 705/14.24; 705/20; 705/22; 705/28

(58) Field of Classification Search .................. 700/236, 700/238, 380, 381; 705/14.1, 14.24, 20, 705/22, 28; 235/378, 385; 340/5.9
See application file for complete search history.

(56) References Cited

U.S. PATENT DOCUMENTS

| | | | |
|---|---|---|---|
| 4,008,792 A | 2/1977 | Levasseur et al. | 194/1 N |
| 4,034,839 A | 7/1977 | Lee | 194/10 |
| 4,094,398 A | 6/1978 | Camp et al. | 194/10 |
| 4,267,915 A | 5/1981 | McLaughlin et al. | 194/1 N |
| 4,316,532 A | 2/1982 | Levasseur | 194/1 N |
| 4,463,446 A | 7/1984 | Shah et al. | 340/5.9 |
| 4,498,570 A | 2/1985 | King et al. | 194/1 |
| 4,579,213 A | 4/1986 | Rhine et al. | 194/217 |
| 4,706,794 A | 11/1987 | Awane et al. | |
| 4,867,628 A | 9/1989 | Ammon et al. | 414/273 |
| 5,240,139 A | 8/1993 | Chirnomas | 221/2 |
| 5,564,547 A | 10/1996 | Ranon et al. | 194/216 |
| 5,671,362 A * | 9/1997 | Cowe et al. | 705/28 |
| 5,769,269 A | 6/1998 | Peters | 221/7 |
| 5,884,745 A | 3/1999 | Kalis et al. | 194/217 |
| 5,930,771 A | 7/1999 | Stapp | |
| 6,012,834 A | 1/2000 | Dueck et al. | 364/479.08 |
| 6,321,985 B1 | 11/2001 | Kolls | 235/381 |

(Continued)

FOREIGN PATENT DOCUMENTS

WO    WO 97/28510    8/1997

OTHER PUBLICATIONS

"Dual Price Kits for Pre-Series 90 Venders", Dixie-Narco, Woldwide, Technical Bulletin, Jan. 8, 1990, Bulletin No. 405.

(Continued)

*Primary Examiner* — Jeffrey Shapiro
(74) *Attorney, Agent, or Firm* — Fincham Downs, LLC; Carson C. K. Fincham

(57) ABSTRACT

In accordance with one embodiment, a vending machine comprises a plurality of receptacles for holding units of products, each receptacle operable to hold a respective plurality of units in a series. The vending machine further comprises a dispensing mechanism operable to dispense, from each receptacle, a first unit in the respective plurality of units, the dispensing mechanism thereby being operable to dispense only a first unit from the respective series at a time. The vending machine further comprises a means for determining, for a unit, information allowing a relationship among the unit and a location of the unit in the receptacle to be determined.

14 Claims, 30 Drawing Sheets

U.S. PATENT DOCUMENTS

| | | | | |
|---|---|---|---|---|
| 6,328,180 | B1 | 12/2001 | Sorensen et al. | 221/131 |
| 6,397,193 | B1* | 5/2002 | Walker et al. | 705/16 |
| 6,422,373 | B1 | 7/2002 | Yellop et al. | 194/217 |
| 6,601,036 | B1* | 7/2003 | Walker et al. | 705/10 |
| 6,634,550 | B1* | 10/2003 | Walker et al. | 235/383 |
| 7,103,567 | B2* | 9/2006 | Smukowski | 705/26 |
| 7,171,451 | B2* | 1/2007 | Defosse | 709/208 |
| 7,175,081 | B2* | 2/2007 | Andreasson et al. | 235/385 |
| 2002/0038167 | A1* | 3/2002 | Chirnomas | 700/231 |
| 2002/0077724 | A1 | 6/2002 | Paulucci et al. | 700/231 |
| 2002/0107610 | A1* | 8/2002 | Kaehler et al. | 700/232 |
| 2002/0161653 | A1* | 10/2002 | Walker et al. | 705/22 |
| 2003/0006281 | A1* | 1/2003 | Thomas et al. | 235/385 |
| 2003/0141315 | A1 | 7/2003 | Chirnomas | |
| 2003/0234259 | A1 | 12/2003 | Selfridge et al. | 221/150 R |
| 2004/0103033 | A1* | 5/2004 | Reade et al. | 705/16 |
| 2004/0164146 | A1* | 8/2004 | Rosenblum | 235/381 |
| 2004/0204063 | A1* | 10/2004 | Van Erlach | 455/556.1 |
| 2005/0060063 | A1* | 3/2005 | Reichelt et al. | 700/244 |
| 2005/0167493 | A1* | 8/2005 | Barton et al. | 235/383 |
| 2006/0028392 | A1* | 2/2006 | Coveley | 343/893 |
| 2007/0050271 | A1* | 3/2007 | Ufford et al. | 705/28 |

OTHER PUBLICATIONS

"*MPC Vender Set-Up and Installation Procedure.", Dixie-Narco, Technical Bulletin, Feb. 7, 1991, Bulletin No. 409.

"Universal Satellite Device Mini-Snack Vendor—Model 3100—U Service Manual", Jul. 1997, email: VendNet@ecity.net.

"Seaga PSCA6 Pedestal Vendor Operator's Manual", Effective Sep. 2001, Seaga Manufacturing, Inc., website: www.seagamfg.com.

"A Java-enabled vending machine", OneEighty Software Ltd., dated: Jul. 2003, 8pp.

Website: "Halfbakery. Vending machine Z-coordinate", (http //www halfbakery com/idea/Vending_20machine_20Z-coordinate), download date: May 18, 2004.

"Up in smoke! Whatever happened to cigarette vending? Business basics: building blocks for small and medium size operators", Automatic Marchandiser, Sep. 1, 2003, Section 9, vol. 45, p. 38, ISSN: 1061-1797.

"Glass Front Merchandiser Pro Series Service Manual", VendNet, Nov. 2003.

Website: "Generic DN 55## BeverageMax Information", (http www dixienarco com/generic/gen_DN55_info htm), download date: Sep. 7, 2004.

International Search Report for Application No. PCT/US04/33038 dated Nov. 23, 2005, 5pp.

Written Opinion for Application No. PCT/US04/33038 dated Nov. 23, 2005, 5pp.

International Preliminary Report on Patentability for Application No. PCT/US2004/033038 dated Mar. 27, 2007, 6pp.

* cited by examiner

700

| POSITION 705 | PRODUCT 710 | 1ST POSITION 715 |
|---|---|---|
| 001 | A | YES |
| 002 | A | -- |
| 003 | A | -- |
| 004 | A | -- |
| 005 | B | -- |
| 006 | B | -- |
| 007 | B | -- |
| 008 | B | -- |
| 009 | B | -- |
| 010 | B | -- |
| 011 | C | YES |
| 012 | D | -- |
| 013 | C | -- |
| 014 | D | -- |
| 015 | C | -- |
| 016 | D | -- |
| 017 | C | -- |
| 018 | D | -- |
| 019 | -- | -- |
| 020 | -- | -- |

| POSITION 705 | PRODUCT 710 | 1ST POSITION 715 |
|---|---|---|
| 001 | A | YES |
| 002 | A | -- |
| 003 | A | -- |
| 004 | B | -- |
| 005 | B | -- |
| 006 | B | -- |
| 007 | B | -- |
| 008 | B | -- |
| 009 | B | -- |
| 010 | -- | -- |
| 011 | C | YES |
| 012 | D | -- |
| 013 | C | -- |
| 014 | D | -- |
| 015 | C | -- |
| 016 | D | -- |
| 017 | C | -- |
| 018 | D | -- |
| 019 | -- | -- |
| 020 | -- | -- |
| ooo | ooo | ooo |

| POSITION 805 | PRODUCT 810 | PRICE 815 |
|---|---|---|
| A1-1 | SNICKERS(TM) | $0.75 |
| A1-2 | SNICKERS(TM) | $0.75 |
| A1-3 | SNICKERS(TM) | $0.75 |
| A1-4 | REESE'S(TM) CUPS | $1.00 |
| A1-5 | REESE'S(TM) CUPS | $1.00 |
| A1-6 | REESE'S(TM) CUPS | $1.00 |
| ○○○ | ○○○ | ○○○ |
| H5-5 | MILANO(TM) COOKIES | $1.25 |
| H5-6 | MILANO(TM) COOKIES | $1.25 |

| POSITION 805 | PRODUCT 810 | PRICE 815 |
|---|---|---|
| A1-1 | SNICKERS(TM) | $0.75 |
| A1-2 | SNICKERS(TM) | $0.75 |
| A1-3 | REESE'S(TM) CUPS | $0.75 |
| A1-4 | REESE'S(TM) CUPS | $1.00 |
| A1-5 | REESE'S(TM) CUPS | $1.00 |
| A1-6 | [EMPTY] | -- |
| ⋮ | ⋮ | ⋮ |
| H5-5 | MILANO(TM) COOKIES | $1.25 |
| H5-6 | [EMPTY] | -- |

FIG. 8B

| RECEPTACLE IDENTIFIER 905 | PRODUCT(S) IN RECEPTACLE 910 | NUMBER OF UNITS 915 | LOADED POSITION RANK 920 | CURRENT POSITION RANK 925 |
|---|---|---|---|---|
| A1 | BRAND X CHOCOLATE BAR | 2 | 1 | 1 |
| A2 | BRAND X PEANUT BUTTER CUPS | 4 | 2 | 2 |
| | BRAND Y SODA | 6 | 1 | 1 |
| A3 | BRAND Z POTATO CHIPS | 1 | 1 | 1 |
| | BRAND Z POPCORN | 1 | 2 | 2 |
| | BRAND Z POTATO CHIPS | 2 | 3 | 3 |
| | BRAND Z POPCORN | 2 | 4 | 4 |
| ○ ○ ○ | ○ ○ ○ | ○ ○ ○ | ○ ○ ○ | ○ ○ ○ |

| RECEPTACLE IDENTIFIER 905 | PRODUCT(S) IN RECEPTACLE 910 | NUMBER OF UNITS 915 | LOADED POSITION RANK 920 | CURRENT POSITION RANK 925 |
|---|---|---|---|---|
| A1 | BRAND X CHOCOLATE BAR | 1 | 1 | 1 |
|  | BRAND X PEANUT BUTTER CUPS | 4 | 2 | 2 |
| A2 | BRAND Y SODA | 5 | 1 | 1 |
| A3 | BRAND Z POTATO CHIPS | 0 | 1 | - |
|  | BRAND Z POPCORN | 1 | 2 | 1 |
|  | BRAND Z POTATO CHIPS | 2 | 3 | 2 |
|  | BRAND Z POPCORN | 2 | 4 | 3 |
| ○ ○ ○ | ○ ○ ○ | ○ ○ ○ | ○ ○ ○ | ○ ○ ○ |

| ROW 1005 | COLUMN 1 1010 | COLUMN 2 1015 | COLUMN 3 1020 | COLUMN 4 1025 | COLUMN 5 1030 | POSITION 1035 |
|---|---|---|---|---|---|---|
| 1 | P-001-99 | P-006-79 | P-555-43 | P-555-43 | P-66-100 | 1 |
| 1 | P-001-99 | P-006-79 | P-919-00 | P-555-43 | -- | 2 |
| 1 | P-001-99 | P999-88 | P-919-00 | P-555-43 | -- | 3 |
| 2 | P-771-51 | P-771-51 | -- | P-004-32 | P-910-33 | 1 |
| 2 | P-771-51 | P-771-51 | -- | P-004-32 | P-910-33 | 2 |
| 2 | P-771-51 | -- | P-108-91 | P-004-32 | P-111-82 | 3 |
| 3 | P-894-39 | P-108-91 | -- | P-528-71 | P-909-52 | 1 |
| 3 | P-894-39 | P-108-91 | -- | P-528-71 | P-909-52 | 2 |
| 3 | -- | P-333-10 | P-103-91 | P-528-71 | P-909-52 | 3 |
| 4 | P-333-10 | P-333-10 | -- | P-894-31 | P-721-85 | 1 |
| 4 | -- | P-333-10 | -- | P-103-91 | P-721-85 | 2 |
| 4 | -- | P-333-10 | -- | P-103-91 | -- | 3 |

FIG. 10A

| ROW 1005 | COLUMN 1 1010 | COLUMN 2 1015 | COLUMN 3 1020 | COLUMN 4 1025 | COLUMN 5 1030 | POSITION 1035 |
|---|---|---|---|---|---|---|
| 1 | P-001-99 | P-006-79 | P-919-00 | P-555-43 | P-66-100 | 1 |
|  | P-001-99 | P-006-79 | P-919-00 | P-555-43 | -- | 2 |
|  | P-001-99 | P999-88 | -- | P-555-43 | -- | 3 |
| 2 | P-771-51 | P-771-51 | -- | P-004-32 | P-910-33 | 1 |
|  | P-771-51 | P-771-51 | -- | P-004-32 | P-910-33 | 2 |
|  | P-771-51 | -- | P-108-91 | P-004-32 | P-111-82 | 3 |
| 3 | P-894-39 | P-108-91 | -- | P-528-71 | P-909-52 | 1 |
|  | P-894-39 | P-108-91 | -- | P-528-71 | P-909-52 | 2 |
|  | -- | P-333-10 | -- | P-528-71 | P-909-52 | 3 |
| 4 | P-333-10 | P-333-10 | P-103-91 | P-894-31 | P-721-85 | 1 |
|  | -- | P-333-10 | -- | P-103-91 | P-721-85 | 2 |
|  | -- | P-333-10 | -- | P-103-91 | -- | 3 |

| PRODUCT 1105 | PRICE 1110 |
|---|---|
| P-001-02 | $1.00 |
| P-021-34 | $1.00 |
| P-902-41 | $0.75 |
| P-621-02 | $1.25 |
| P-002-33 | $1.00 |
| P-931-99 | $0.50 |
| P-241-89 | $1.50 |

FIG. 11

| TRANSACTION IDENTIFIER 1205 | TRANSACTION DATE / TIME 1210 | PRODUCT(S) PURCHASED 1215 | VENDED FROM 1220 | TRANSACTION TOTAL 1225 |
|---|---|---|---|---|
| T-987654321 | 8/23/2004 1:20 PM | P-009-321 | A1 | $1.00 |
| | | P-001-99 | A1 | |
| T-987654322 | 8/23/2004 1:21 PM | P-001-99 | A1 | $0.75 |
| T-987654323 | 8/23/2004 1:27 PM | P-924-83 | K1 | $1.25 |
| T-987654324 | 8/23/2004 1:31 PM | P-800-44 | B1 | $1.00 |
| T-987654325 | 8/23/2004 2:04 PM | P-001-99 | A1 | $1.50 |
| | | P-232-00 | C5 | |

METHOD AND APPARATUS FOR DEFINING AND UTILIZING PRODUCT LOCATION IN A VENDING MACHINE

This Application is related to the following commonly-owned U.S. patent applications:
1) U.S. patent application Ser. No. 08/920,116 entitled "Method And System For Processing Supplementary Product Sales At A Point-Of-Sale Terminal", filed Aug. 26, 1997 in the name of Walker et al., which issued as U.S. Pat. No. 6,119,099 on Sep. 12, 2000;
2) Co-pending U.S. patent application Ser. No. 08/947,798 entitled "Method And Apparatus For Dynamically Managing Vending Machine Inventory Prices", filed Oct. 9, 1997 in the name of Tedesco et al.;
3) Co-pending U.S. patent application Ser. No. 09/345,092 entitled "Vending Machine System And Method For Encouraging The Purchase Of Profitable Items", filed Jun. 30, 1999 in the name of Walker et al.;
4) Co-pending U.S. patent application Ser. No. 09/603,677 entitled "Method And Apparatus For Selecting A Supplemental Product To Offer For Sale During A Transaction", filed Jun. 26, 2000 in the name of Mueller et al.
5) Co-pending U.S. patent application Ser. No. 09/994,810 entitled "Method And Apparatus For Utilizing Demand Information At A Vending Machine", filed Nov. 27, 2001 in the name of Walker et al.;
6) Co-pending U.S. patent application Ser. No. 10/095,372 entitled "Method And Apparatus For Vending A Combination Of Products", filed Mar. 11, 2002 in the name of Walker et al.;
7) Co-pending U.S. patent application Ser. No. 10/403,184 entitled "Method And Apparatus For Managing And Providing Offers", filed Mar. 28, 2003 in the name of Van Luchene et al.; and
8) Co-pending U.S. patent application Ser. No. 10/855,247 entitled "Method and Apparatus for Managing Vending Machine Offers", filed May 27, 2004 in the name of Walker et al.

The entirety of each of the above applications is incorporated by reference herein for all purposes.

BACKGROUND OF THE INVENTION

The present invention relates to vending machines. One aspect of the invention relates in particular to vending machines of the type that comprise (i) a plurality of receptacles (e.g., rows, trays or columns) for holding units of products, each receptacle being operable to hold a respective plurality of units in a series; and (ii) a dispensing mechanism operable to dispense, from each receptacle, a first unit in the respective plurality of units, the dispensing mechanism thereby being operable to dispense only a first unit from the respective series at a time. Such vending machines are referred to as "series dispensing" vending machines herein.

A vending machine typically holds a finite number of units of products and is refilled by an operator (e.g., a route driver) on a periodic or non-periodic basis. An operator typically loads a vending machine with a number of units of a variety of different products. For example, a first tray may be loaded with a plurality of units of a first product while a second tray may be loaded with a plurality of units of a second product. The operator typically determines how many units of each product to load based on past experience regarding demand for the products. For example, if a first product has been very popular in the past (e.g., the first product is usually sold out or almost sold out when the operator arrives to refill the vending machine), the operator may fill two or more trays of the vending machine with the product. In the same example the operator may only fill one tray of the vending machine with a second, less popular, product (e.g., a product of which some units are typically still available from the vending machine when the operator arrives to refill the vending machine).

A conventional vending machine stores very minimal information (e.g., the single price for all products available from the vending machine or, at most, respective price associated with each tray of the vending machine). It would be advantageous for a vending machine to store, or be operable to access, more detailed information regarding the products available for sale from the vending machine. This would allow various methods to be employed to facilitate additional sales from the vending machine.

Many other drawbacks of conventional vending machines limit the profitability of the vending machines.

BRIEF DESCRIPTION OF THE FIGURES

FIG. 7A is a table illustrating an exemplary data structure of a product inventory database for use in the present invention.

FIG. 7B is a table illustrating the exemplary data structure of the product inventory database depicted in FIG. 7A, illustrating a change in data due to a vending of a product.

FIG. 8A is a table illustrating an exemplary data structure of a product inventory database for use in the present invention.

FIG. 8B is a table illustrating the exemplary data structure of the product inventory database depicted in FIG. 8A, illustrating a change in data due to a vending of a product.

FIG. 9A is a table illustrating an exemplary data structure of a product inventory database for use in the present invention.

FIG. 9B is a table illustrating the exemplary data structure of the product inventory database depicted in FIG. 9A, illustrating a change in data due to vending of products.

FIG. 10A is a table illustrating an exemplary data structure of a product inventory database for use in the present invention.

FIG. 10B is a table illustrating the exemplary data structure of the product inventory database depicted in FIG. 10A, illustrating a change in data due to vending of a product.

FIG. 11 is a table illustrating an exemplary data structure of a product price database for use in the present invention.

FIG. 12 is a table illustrating an exemplary data structure of a transaction database for use in the present invention.

DETAILED DESCRIPTION

1. Introduction

Figure 1:
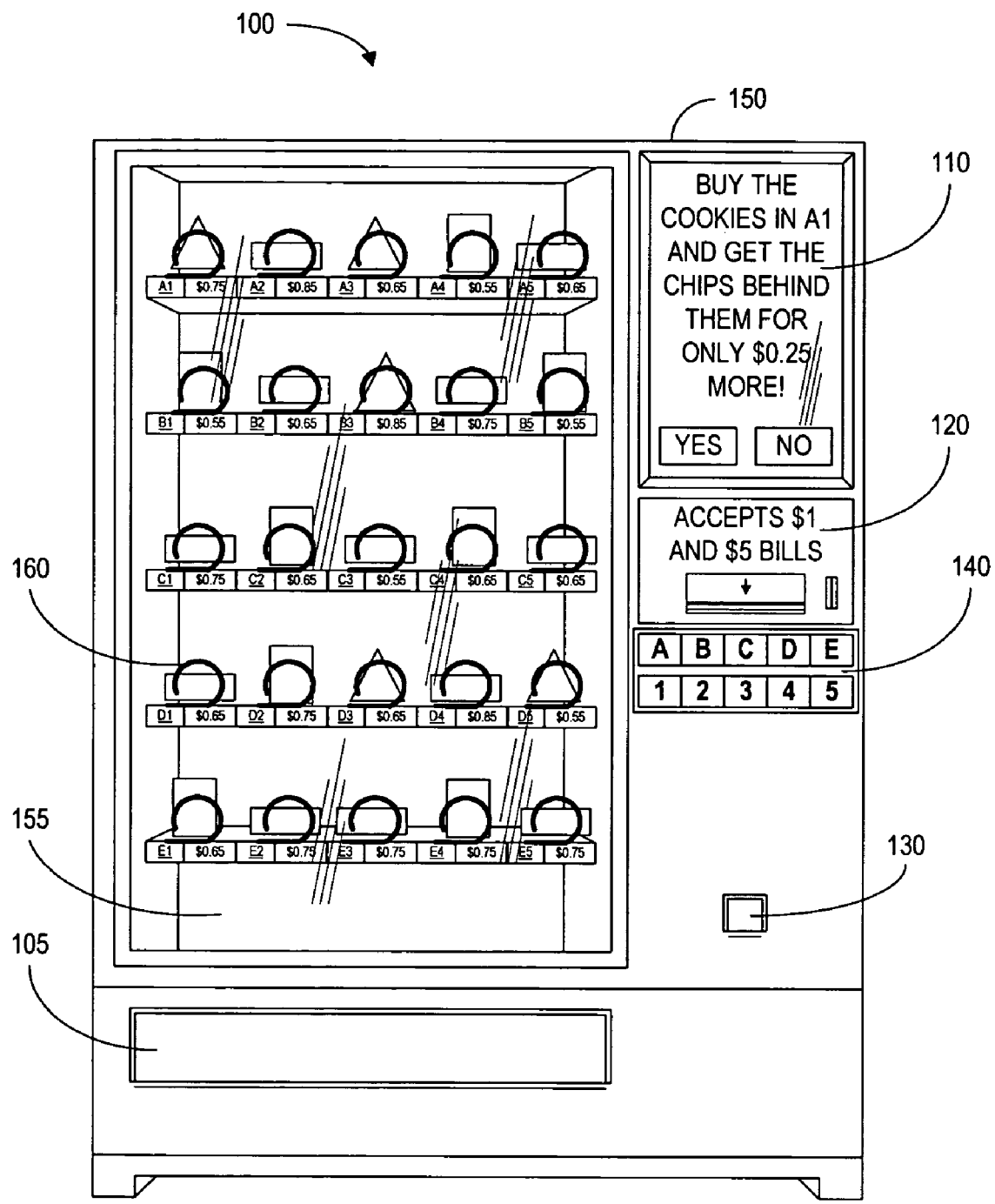
FIG. 1 is a diagram illustrating an example of the external appearance of a vending machine, in accordance with one embodiment.

Applicants have previously invented various novel methods that may be employed in a vending machine, for example, to stimulate sales at the vending machine. For example, Applicants have recognized that it may be advantageous to provide offers for packages of products from a vending machine. Commonly-owned U.S. application Ser. No. 10/095,372, filed Mar. 11, 2002 in the name of Walker et al. and entitled "METHOD AND APPARATUS FOR VENDING A COMBINATION OF PRODUCTS" and commonly-owned U.S. application Ser. No. 10/902,347, filed Jul. 29, 2004 in the name of Walker et al. and entitled "PRODUCTS AND PROCESSES FOR VENDING A PLURALITY OF PRODUCTS VIA DEFINED GROUPS" each describes various methods for offering packages of products at a vending machine. In another example, Applicants have recognized that it may be advantageous to offer a product to a customer in exchange for any change due to the customer. Commonly-owned U.S. application Ser. No. 10/855,247 filed May 27, 2004 in the name of Walker et al. and entitled "METHOD AND APPARATUS FOR MANAGING VENDING MACHINE OFFERS" and commonly-owned U.S. application Ser. No. 10/095,372 each describe various methods for offering a product to a customer in exchange for any change due to the customer. In yet another example, Applicants have recognized that it may be advantageous to apply revenue management principles to a vending machine to determine the particular products to be stocked in a vending machine, and the particular number of units of each product to be stocked (e.g., in order to maximize sales for a given fill period of the vending machine). Commonly-owned U.S. application Ser. No. 10/855,247 describes various methods for applying revenue and/or profit management principles to promote sales at a vending machine and of managing offers to be output via a vending machine.

Further, Applicants have recognized that implementation of some or all of the above novel methods may be made more efficient and/or effective if a vending machine were operable to access more detailed information regarding the products stocked in the vending machine than conventional vending machines are operable to access. For example, Applicants have recognized that it would be advantageous for a vending machine to access information regarding how many units of a product are stored in a receptacle of the vending machine, a respective position of each individual unit within a receptacle and/or a relative positioning of the units within the receptacle. A receptacle, as the term is used herein, is any structure or container of any shape in a vending machine for holding, carrying, or exhibiting articles available for sale from the vending machine (e.g., products such as snacks or soda).

Conventional series vending machines typically only have access to an indication of a receptacle identifier and the price associated with the receptacle (i.e., row "A1" is associated with a price of $1.00). Applicants, however, have recognized that it would be advantageous, in some circumstances, to store an indication of a number of units of each product stored in a particular receptacle of a vending machine. Applicants have also recognized that, in some circumstances, it would be further advantageous to store a location of each individual unit of product stored in a receptacle of a vending machine. Applicants have further recognized that it would be advantageous, in some embodiments, to store a relative positioning of a unit of a product within a receptacle of the vending machine (e.g., where the unit of the product is located relative to another unit of product, relative to a front of the receptacle, etc.). Applicants have also recognized that, in some circumstances, it would be also be advantageous to stock a single receptacle of a vending machine with a number of units of a first product and a number of units of a second product and for a vending machine to have access to information regarding the relative location of the units of the first product and the units of the second product. Applicants have still further recognized that, in some circumstances, it would be advantageous for a single receptacle of a vending machine to store a number of units of a first product associated with first information and a number of units of a second product associated with second information. In the latter embodiment, Applicants have recognized that it would be advantageous, in some circumstances, for a vending machine that has access to such information to be operable to determine when it would be appropriate to cause an indicator of the first and second information to change the information being indicated (e.g., based on inventory information accessible to the vending machine).

For example, Applicants have recognized that it would be advantageous for a vending machine to have access to information indicating that the first three units of product in a receptacle (i.e., the next three products available for vending) are units of product "A" while the four units behind the units of product "A" are units of product "B", if that was the inventory of the receptacle. A vending machine that has access to such information (information indicating where the units of product A and product B are located in a given receptacle) may, for example, be operable to store products of different prices in a single receptacle. Such a vending machine may further be operable to change the price displayed for the receptacle as the product available for vending from the receptacle changes. In another example, a vending machine that has access to such information may determine that product "B" should be made available for vending (e.g., because product "B" has sold out from all other receptacles and is determined to be a very popular product). Thus, the vending machine may output promotions for product "A" in an attempt to promote sales of product "A" and make the units of product "B" located behind the units of product "A" available for vending. Applicants have invented many other uses for such information, as detailed herein.

Conventional vending machines are not operable to access information such as the locations of individual units of products in a given receptacle of the vending machine, a relative positioning of units of products within a given receptacle, or even a number of units of product stored in a given receptacle. Prior to Applicants' invented methods of promoting sales at a vending machine, there has been no recognized need for a series dispensing vending machine to have access to such detailed location information. Further, prior to Applicants' invented methods for utilizing information such as the locations of individual units of products in a given receptacle of a vending machine, there have been no recognized uses for such information in a series dispensing vending machine.

Thus, in accordance with one embodiment, a vending machine comprises (i) a plurality of receptacles for holding units of products, each receptacle operable to hold a respective plurality of units in a series; (ii) a dispensing mechanism operable to dispense, from each receptacle, a first unit in the respective plurality of units, the dispensing mechanism thereby being operable to dispense only a first unit from the respective series at a time; and (iii) means for determining, for each unit, information allowing a relationship among a unit and a location of the unit in the receptacle to be determined.

In one embodiment the means for determining information comprises a memory of the vending machine. In one embodiment the means for determining information comprises a remote memory accessible by the vending machine via a network. In one embodiment the means for determining information comprises a memory associated with a unit of a product (e.g. a radio frequency identification (RFID) tag). The information may define, for a position, an identity of the unit. In another example, the information may define, for an identity of the unit, a position of the unit. In one embodiment, the vending machine further comprises a means for performing an action based on the information. For example, a processor of the vending machine may be programmed to output an offer based on the information.

In accordance with one embodiment, a vending machine comprises: (i) a plurality of receptacles for holding units of products, each receptacle operable to hold a respective plurality of units in a series; (ii) a dispensing mechanism operable to dispense, from each tray, a first unit in the respective plurality of units, the dispensing mechanism thereby being operable to dispense only a first unit from the respective series at a time; and (iii) a means for determining, for each unit of product stored in the vending machine, a position defined by an x, y and z coordinate. The means for determining may comprise, for example, a memory of the vending machine, the memory storing, for each unit of product stored in the vending machine, a position defined by an x, y and z coordinate. In another example, the means for determining may comprise a remote memory accessible by the vending machine via a communication network, wherein the remote memory stores, for each unit of product stored in the vending machine, a position defined by an x, y and z coordinate. In yet another example, the means for determining may comprise a memory associated with a unit of a product (e.g., a RFID tag).

In accordance with one embodiment, a method comprises storing, in a memory of a vending machine, a first price and a second price associated with a single receptacle of the vending machine, the receptacle being operable to store a plurality of units of products, wherein only one of the first price and the second price is active at a time. The method further comprises storing, in the memory of the vending machine, a rule for determining which one of the first price and the second price is to be active, the rule being a rule based on an inventory status of the receptacle.

In accordance with one embodiment, a method includes storing, in a memory of a vending machine, an indication of a first number of units of a first product placed in a receptacle of the vending machine and an indication of a second number of units of a second product placed in the receptacle, wherein the units of the first product and the units of the second product are placed in the receptacle one behind another such that only a single unit of one of the first product and the second product can be vended from the vending machine at a time. The method further includes storing, in the memory, a first price associated with the first product and a second price associated with the second product. The method further includes storing, in the memory, a rule for determining which price is to be displayed as the price associated with the receptacle, wherein the rule indicates that either the first price or the second price is to be displayed based on whether a unit of the first product or a unit of the second product is next available for vending from the vending machine.

In accordance with one embodiment, a method includes changing, from a first price to a second price, a price displayed as the price for products in a particular receptacle of a vending machine based on inventory information associated with the receptacle, the vending machine comprising a plurality of receptacles positioned in a plurality of rows and a plurality of columns of the vending machine, each receptacle being capable of storing a plurality of units of one or more products.

In accordance with one embodiment, a method includes determining, for a receptacle of a vending machine, a first product that is a product next available for vending from the receptacle. The method further includes determining, for the receptacle, a second product stored in the tray, the second product being stored behind the first product and thus not being next available for vending from the receptacle until at least the first product has been sold. The method further includes determining that a predetermined rule has been satisfied, thereby determining that the second product should be made next available for vending from the receptacle. The method further includes outputting a promotion for the first product in an effort to make the second product available for vending from the receptacle.

In one embodiment, determining that a predetermined rule has been satisfied comprises determining that a demand for the second product exceeds a predetermined threshold.

In one embodiment, determining that a predetermined rule has been satisfied comprises determining that a consumer has indicated an interest in purchasing the second product and that the second product is not next available for vending from any other receptacle of the vending machine. In one embodiment, determining that a predetermined rule has been satisfied comprises determining that a demand for the first product is below a predetermined threshold.

In accordance with one embodiment, a vending machine comprises a plurality of receptacles positioned in a plurality of rows and a plurality of columns of the vending machine, each receptacle being capable of storing a plurality of units of one or more products. The vending machine further comprises a memory operable to store two or more distinct prices for a single receptacle and a rule for determining which of the two or more distinct prices is to be displayed as the price for purchasing the next available unit of a product from the receptacle. The rule is based on information associated with inventory stored in the receptacle.

In accordance with one embodiment, a vending machine comprises a plurality of receptacles arranged in a plurality of rows and a plurality of columns of the vending machine, each receptacle comprising a plurality of positions and being capable of storing a plurality of units of one or more products, each unit of the plurality of units being stored in one of the plurality of positions. The vending machine further comprises a memory operable to store an identification of a respective unit of a product stored in each position of each receptacle.

In accordance with one embodiment, a vending machine comprises a plurality of receptacles arranged in a plurality of rows and a plurality of columns of the vending machine, each receptacle comprising a plurality of positions and being capable of storing a plurality of units of one or more products, each respective unit of the plurality of units being stored in one of the plurality of positions. The vending machine further comprises a memory operable to store (i) an indication of a first number of units of a first product and a second number of units of a second product stored in a single receptacle; and (ii) a first price for the first product and a second price for the second product. The vending machine further comprises a processor operable to (i) determine that a unit of the first product is next available for vending from the receptacle, (ii) display the first price as the price associated with the receptacle; (iii) determine that the unit of the first product has been vended; (iv) determine that a unit of the second product is next available for vending from the receptacle; and (v) change the price associated with the receptacle from the first price to the second price.

In one embodiment, the processor being operable to determine that a unit of the second product is next available for vending from the receptacle comprises the processor being operable to determine which position of the receptacle stores a unit of a product next available for vending from the receptacle. In one embodiment, the processor is further operable to (i) track a number of units of the first product that have been sold from the receptacle of the vending machine; and (ii) determine that the number of units of the first product that have been sold is equal to the first number, thereby determining that the units of the second product are next available for vending from the receptacle. In one embodiment, the memory of the vending machine is further operable to store an indication, for the receptacle, of which one of a unit of the first product and a unit of the second product is stored in a respective position of the receptacle.

In accordance with one embodiment, a method comprises determining that it would be advantageous, to a vending machine operator, to sell a unit of a first product from the vending machine. The method further includes determining that vending a unit of a second product is a pre-condition to selling the unit of the first product. The method further includes causing an event that facilitates the vending of the second product such that the first product is made available for sale.

Numerous embodiments are described in herein, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

With these and other advantages and features of the invention that will become hereinafter apparent, the nature of the invention may be more clearly understood by reference to the following detailed description of the invention, the appended claims and to the several drawings included herein.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense.

Any enumerated listing of items herein does not imply that any or all of the items are mutually exclusive, unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

Terms

Throughout the description that follows and unless otherwise specified, the following terms may include and/or encompass the example meanings provided in this section. These terms and illustrative example meanings are provided to clarify the language selected to describe embodiments of the invention both in the specification and in the appended claims.

The terms "a", "an" and "the" mean "one or more", unless expressly specified otherwise.

The term "actual product velocity" may refer to an actual rate at which a given product is sold by a vending machine during a period of time (e.g., during a sales period).

The term "baseline velocity demand" may refer to the total number of products sold at retail price within a particular period of time (e.g., during a particular sales period).

The term "computer-readable medium" as used herein refers to any medium that participates in providing instructions which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying a sequences of instructions to a processor.

The term "control system" may refer to a combination of hardware and software, operative to carry out methods of the present invention. For example, a control system may comprise a processor performing instructions of a program.

The terms "customer device" and "user device" shall be synonymous and may refer to any device owned or used by a customer, which device is capable of accessing and/or outputting online and/or offline content. Customer devices may communicate with one or more vending machine controllers, one or more vending machines, one or more third-party service provider controllers, one or more user terminals, and/or other network nodes. In some embodiments, customer devices may, for example, include gaming devices, personal computers, personal digital assistants, point-of-sale terminals, point of display terminals, kiosks, telephones, cellular phones, automated teller machines (ATMs), pagers, and combinations of such devices.

The terms "dynamically priced upsell promotion", "dynamic priced upsell promotion", "roundup deal", "roundup promotion", and "spare-change upsell promotion" shall be synonymous and may refer to a promotion to a customer of a first product for the purchase of an additional product in exchange for an additional amount that is equal to an amount of change due back to the customer as a result of the customer's purchase of the first product.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "fill period" and "sales period" shall be synonymous and may refer to the period of time between restocking events at a vending machine.

The terms "fixed price upsell promotion" and "upsell promotion" shall be synonymous and may refer to a promotion to a customer of a first product for the purchase of an additional product in exchange for an additional amount that is not necessarily correlated with an amount of change due back to the customer as a result of the customer's purchase of the first product. In some embodiments, a customer who has purchased a first product and is thereby due change may be required to deposit additional currency in order to accept a fixed price upsell promotion. Thus, the fixed price upsell promotion may require that the customer pay an amount equal to his or her change due plus an additional amount of currency.

The terms "full price" and "retail price" shall by synonymous and may refer to the normal price charged for the purchase of a given product. Typically, promotions present customers with the opportunity to purchase products at less than full price.

The terms "ideal product velocity", "target product velocity", and "target velocity" shall be synonymous and may refer to the desired rate at which a given product should be sold by a vending machine during a period of time (e.g., during a sales period). Thus, in some embodiments, an ideal velocity may be set or calculated for each product indicating the rate at which products must be sold in order to deplete the inventory to a certain level by the end of a given sales period (i.e., by the next restocking event at the vending machine).

For example, an ideal product velocity may be calculated by a vending machine control system after an operator inputs a restock date and a desired remaining inventory for the date. For example, an operator may wish to have only one of each product remaining at the next restocking event so that the vending machine sells as many products as possible without completely selling out and thereby disappointing customers. Thus, in the preceding example, if an operator (a) stocks 50 units of Soda A, (b) inputs a restock date fourteen days away, and (c) indicates that only one unit of Soda A should remain at the restock date, the control system may divide 49 by 14 to conclude that, on average, 3.5 units must be sold per day within the sales period in order to realize the ideal product velocity.

As discussed herein, a vending machine or other device may periodically, substantially continuously, or otherwise determine whether or not actual product velocity is at least equal to the ideal product velocity, and if not, may institute promotions as discussed herein. An ideal product velocity may be further set so that if such a velocity is reached, the increase in volume will sufficiently offset any discounts afforded to customers through promotions, thereby eliminating or reducing the potential for dilution.

The terms "including", "comprising" and variations thereof mean "including but not limited to", unless expressly specified otherwise.

The term "input device" may refer to a device that is used to receive an input. An input device may communicate with or be part of another device (e.g. a point of sale terminal, a point of display terminal, a customer terminal, a controller, a customer device, a vending machine, a controller, a peripheral device, etc.). Some examples of input devices include: a barcode scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, a RF receiver, a thermometer, a pressure sensor, and a weight scale.

The term "output device" may refer to a device that is used to output information. An output device may communicate with or be part of another device (e.g. a vending machine, a point of sale terminal, a point of display terminal, a customer device, a controller, etc.). Possible output devices include: a cathode ray tube (CRT) monitor, liquid crystal display (LCD) screen, light emitting diode (LED) screen, a printer, an audio speaker, an infra-red transmitter, and a radio transmitter.

The term "minimum selling price" may refer to the lowest price at which a product may be sold. The minimum selling price may not necessarily reflect the cost of the product to the operator of a vending machine. Thus, the minimum selling price may include an acceptable profit margin. Conversely, the minimum selling price may be set less than the cost of a product to the operator of a vending machine, as may be the case where a promotion or series of promotions would sufficiently offset any loss associated with selling the particular product below cost.

The term "operator" may refer to the owner of a vending machine, or agent or associate thereof (e.g., a route driver or lessee of a vending machine).

The terms "package deal", "combination deal", "package promotion", "package of products", "combination promotion", "combination product promotion", "'Load-up' deal", "value combo deal", and "combo deal" shall be synonymous and may refer to a promotion enabling a customer to purchase at least two products for a single price. In one or more embodiments, package promotions are configured to result in a benefit (e.g., net-savings) to the customer when compared to the sum of the individual component product's retail prices.

The term "peripheral device" may refer to any device associated with one or more vending machines, the peripheral device being operable to perform any of the functions described herein. For example, in one embodiment a prior art vending may be retrofitted with a peripheral device that comprises a processor, memory, and output device for facilitating promotions in accordance with embodiments of the present invention. A peripheral device may or may not be attached to a vending machine. A peripheral device may or may not be operable to direct the associated vending machine to perform certain functions. A peripheral device, or portions thereof, may be housed inside the casing of the associated vending machine. Further, a peripheral device may be operable to detect one or more events at a vending machine. For example, a peripheral device may be operable to detect one or more signals output by a processor of a vending machine. Further still, a peripheral device may be operable to communicate with a processor of an associated vending machine.

The terms "product," "good," "item", "merchandise," and "service" shall be synonymous and may refer to anything licensed, leased, sold, available for sale, available for lease, available for licensing, and/or offered or presented for sale, lease, or licensing including individual products, packages of products, subscriptions to products, contracts, information, services, and intangibles. Examples of goods sold at vending machines include beverages (e.g. cans of soda) and snacks (e.g. candy bars). Examples of services sold by vending machines include car washes, photography services and access to digital content (e.g. permitting the downloading of MP3 files or "ring tunes" to a handheld device).

The term "profit inventory management" or "PIM" may refer to the practice of managing the sale of products so as to increase a vending machine's profitability during a period of time (e.g., during a sales period). In some embodiments, a vending machine is programmed to evaluate sales data in light of stored rules indicative of a profit goal. For example, stored rules may indicate an ideal product velocity that would tend to increase the machine's profitability. The machine may determine that, based on current sales data, the ideal product velocity (for a given product or group of products) will not be achieved based on current promotions, prices, or other sales parameters. In response, the vending machine may execute multi-variant equations to identify, construct and offer a promotion to a customer with the goal of achieving the ideal product velocity (for a given product or group of products).

The term "promotion" may refer to a message that is output, regarding some product, distinct from a general offer to sell products from a vending machine at retail prices. For example, a promotion may comprise a message intended to increase machine profitability. Typically, a promotion allows customers to purchase one or more products under terms that are generally more favorable to the customer than standard retail terms (e.g., at prices less than or equal to the corresponding product's full price(s), but greater than or equal to the corresponding product's minimum price(s)).

The term "receptacle" may refer to any structure or container of any shape in a vending machine for holding, carrying, or exhibiting articles available for sale from the vending machine (e.g., products such as snacks or soda). For example, in one embodiment a receptacle may comprise a tray including a dual helix dispensing mechanism.

The terms "restock date", "restock time", "restock event" and "pick-up" shall be synonymous and may refer to the time and/or date that a vending machine is scheduled (or, in some embodiments, expected) to be restocked by an operator of a vending machine.

The terms "server" and "controller" shall be synonymous and may refer to any device that may communicate with one or more vending machines, one or more third-party controllers, one or more remote controllers, one or more customer devices, one or more peripheral devices and/or other network nodes, and may be capable of relaying communications to and from each.

The terms "target profit" and "ideal profit" may be used interchangeably and may refer to a desired profit to be achieved by a vending machine or group of vending machines. In some embodiments, the profit goal set by an operator of a vending machine.

The scope of the present invention and embodiments thereof may be understood more fully with reference to the following figures. Embodiments of the present invention are first described by means of schematic and block diagrams illustrating exemplary system infrastructure and devices that may be utilized by an entity practicing the present invention. Exemplary data structures illustrating tables that may be used when practicing embodiments of the present invention are then described, followed by flow diagrams that illustrate exemplary processes consistent with some embodiments of the present invention. Finally, some exemplary screen displays that may be output to an operator of a vending machine are described.

2. Systems and Apparatus

Generally, a vending machine in accordance with the present invention may comprise a device, or communicate with a device (e.g., a controller, a peripheral device, and/or a peripheral device controller), configured to manage sales transactions with customers by, among other things, receiving payment from customers, storing information related to the location of individual units of products, controlling the pricing and/or distribution of goods and/or controlling entitlements to services.

Referring now to FIG. 1, illustrated therein is an example of the external appearance of a vending machine 100, in accordance with one embodiment. The vending machine 100 includes an inventory storage and dispensing mechanism 160, which comprises a rotating helix and gravity dispensing system, wherein products are located in receptacles (e.g., trays) and between coils of one or more rotating helices. A helix is typically rotated by a motor located at the back of the receptacle, as would be understood by one of ordinary skill in the art. The vending machine causes a product to be dispensed by causing the helix of the receptacle selected by a customer to rotate (e.g., via the motor) such that a unit of a product is pushed out of the receptacle. Gravity causes the product to fall into the delivery bin 105. The vending machine 100 also includes an output screen 110 for outputting information to customers of the vending machine. Illustrated in output screen 110 is an offer to a customer to purchase a product next available from a particular receptacle and the product behind the next available product for a fixed price upsell amount. For example, assume the product that is next available for vending from the receptacle is determined to be an unpopular product (e.g., it has been next available for a predetermined amount of time without being purchased). Further assume that the product behind this unpopular product is determined to be a popular product (e.g.; it has sold out from all other receptacles in which it was previously available). In such circumstances, the exemplary offer illustrated in output screen 110 may be output in order to stimulate the sale of the less popular product that is next available for sale from the receptacle by packaging it with the popular product behind it, for a fixed price upsell offer. Other uses of information regarding locations of individual units of products are discussed in detail below.

The vending machine 100 further includes a payment mechanism 120 for receiving payment for products and a change bin 130 for delivering change or refunds to customers, in the form of coins. The vending machine 100 also includes an input device 140. Input device 140 may be utilized by a customer to input information to the vending machine. For example, input device 140 may comprise a keypad or touchscreen that a customer may use to indicate a selection of a receptacle from which a product may be vended and/or an acceptance of an offer output to the customer. The vending machine 100 may include additional conventional components (e.g., bezels for selecting products), as would be understood by one of ordinary skill in the art.

It should be noted that the vending machine 100 is depicted as a snack machine that holds products in a plurality of receptacles (e.g., trays) that are arranged in a plurality of rows and columns. As described above, each receptacle is operable to hold a unit of a product between two or more coils of helices that span the length of the tray. However, the present invention is not limited to use in this type of vending machine. Embodiments of the present invention may be implemented, for example, in any vending machine that comprises (i) a plurality of receptacles (e.g., trays or columns) for holding units of products, each receptacle being operable to hold a respective plurality of units in a series; and (ii) a dispensing mechanism operable to dispense, from each receptacle, a first unit in the respective plurality of units, the dispensing mechanism thereby being operable to dispense only a first unit from the respective series at a time. Such vending machines are referred to as "series dispensing" vending machines herein.

For example, embodiments of the present invention may be implemented in a vending machine that holds products in tray with a push mechanism for dispensing a unit of a product from a tray. Similarly, embodiments of the present invention may be implemented in a vending machine that utilizes a robotic mechanism for dispensing products from a tray. Embodiments of the present invention may also be implemented in a vending machine that stores products in columns, wherein a unit of a product is released from a column by an opening of a lip or other holding mechanism of the column such that the unit falls out of the column with the aid of gravity (e.g., a soda can dispensing machine). Thus, although embodiments described herein may refer to a helix-type vending machine typically used to vend snacks, other types of vending machines which do not feature a helix dispensing mechanism may be employed. For example, in one embodiment vending machine 100 may comprise a beverage machine, such as the DN 55 Beverage Max™ from Dixie-Narco, Inc.™ of Williston, S.C.

The vending machine 100 further includes a cabinet 150. Cabinet 150 may be constructed from, for example, any combination of (1) commercial grade (i.e., sixteen-gauge) steel (e.g., for exterior panels and internal shelving), (2) transparent materials such as glass or Plexiglas, (3) rubber (e.g., for waterproofing insulation), (4) plastic, (5) aluminum, and/or (6) any suitable material.

Many commercially available machine cabinets can be modified to work in accordance with the present invention. For example, in snack machine embodiments, a suitable machine casing may comprise the 129 SnackShop™ manufactured by Automatic Products International, Ltd.™ of Saint Paul, Minn., which stands at 72"/1829 mm wide, has a width of 38⅞"/988 mm, and a depth of 35"/889 mm. Other suitable snack machine casings include the A La Carte™ machine from Automatic Products™, and the GPL SnackVendor™ model # 159 from Crane Merchandising Systems/Crane Co.™ of Stamford, Conn.

In beverage machine embodiments, machine cabinets commercially available from Dixie Narco™, Inc. of Williston, S.C. may be employed. Beverage machine cabinets may comprise a "cooler" or "glass front" style front panel, featuring a transparent front panel (e.g., glass) enabling customers to see inventory for sale. Alternatively, beverage machine casings may comprise a "bubble front" or "stack front" style front panel, featuring a decorative front panel, typically used to advertise a logo of a product manufacturer commercially interested in the vending machine's operation.

Other embodiments are contemplated as well, including combination snack and beverage vending machine embodiments, such as those available from Crain Co.™. Further details concerning the suitability of machine casing/cabinetry are well known in the art, and need not be described in further detail herein.

The vending machine 100 further comprises a product display window 155. The product display window 155 may comprise a glass or Plexiglas partition behind which are visible the products available for sale from the vending machine and the product storage and dispensing mechanism that holds the products within the vending machine.

Figure 2A:
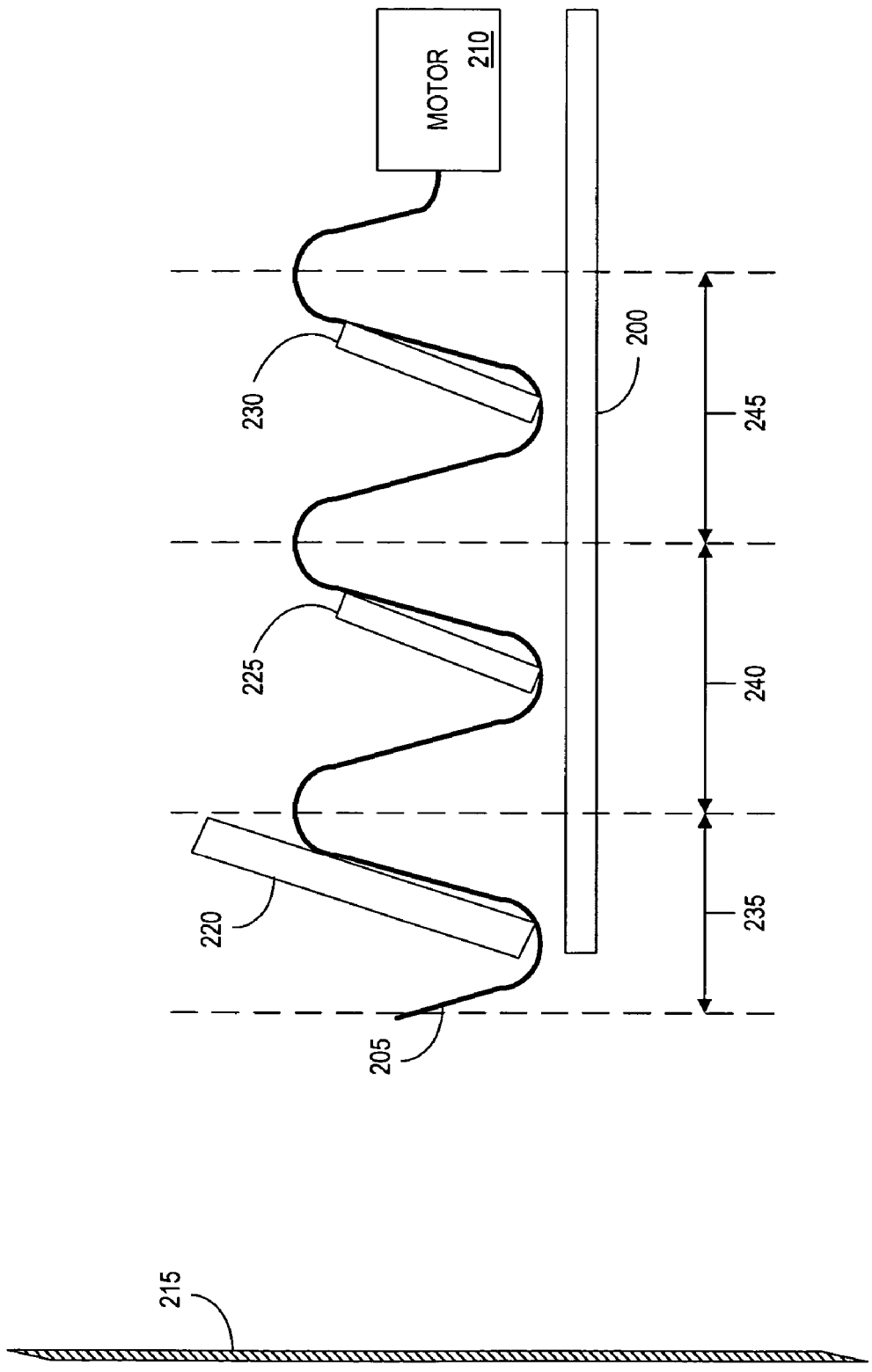
FIGS. 2A and 2B are each a schematic diagram of a side view of an exemplary receptacle of a vending machine, according to one embodiment.

Referring now to FIG. 2A, illustrated therein is a schematic representation of a side view of a receptacle 200. Receptacle 200 may comprise, for example, a receptacle of the vending machine 100 (FIG. 1). The receptacle 200 includes a helix 205 that is driven by a motor 210. The helix 200 comprises a plurality of coils. Between each set of two adjacent coils is located a product. The front of the vending machine is illustrated as structure 215. Structure 215 may comprise, for example, a glass or Plexiglas partition (which may serve, in some embodiments, as a product display window 155). It can be seen that the helix 205 holds, from the front 215 of the vending machine in which the receptacle 200 is located, a first unit of product 220 between the first two coils, a second unit of product 225 between the next two coils, and a third unit of product 230 between the next two coils. The first, second and third units may be units of the same product or units of different products. In accordance with one embodiment, the first unit of product 220 may be referred to as being located in a first position of the receptacle (indicated by reference numeral 235), the second unit of product 225 may be referred to as being located in a second position of the receptacle (indicated by reference numeral 240) and the third unit of product 230 may be referred to as being located in a third position of the receptacle (indicated by reference numeral 245).

As described above, a conventional series dispensing vending machine does not have access to information indicating a relationship among a unit of a product and the location of the unit of the product within a receptacle of the vending machine. Thus, for example, if the receptacle 200 with the units of product 220, 225 and 230 were located in a conventional vending machine, the vending machine would be unable to determine that the first unit of product 220 is located in the first position 235. In fact, a conventional vending machine would be unable to determine whether any product is located within the first position 235 or have access to any information regarding particular positions of the receptacle 200. Further, a conventional vending machine does not typically have access to any information regarding inventory. In embodiments of the present invention, a vending machine including the receptacle 200 with the units of products 220, 225 and 230 would be able to determine not only that the first unit of product 220 is located in the first position 235, but also that the second unit of product 225 is located in the second position 240 and that the third unit of product 230 is located in the third position 245.

It should be noted that although only three product positions are illustrated in FIG. 2A, a receptacle with any number of product positions is within the scope of the present invention. Further, although a receptacle with an inventory and storage mechanism comprising a rotating helix is illustrated in FIG. 2A, a receptacle with any type of inventory storage and dispensing mechanism is within the scope of the present invention.

In operation, the vending machine in which the receptacle 200 is located may cause the first unit of product 220 to be vended from the vending machine by activating the motor 210, thus causing the motor 210 to rotate the helix 205. The rotation of the helix 205 causes the first unit of product 220 to be pushed over the edge of the receptacle 200 and fall into a delivery bin (e.g., delivery bin 105) located below. The second unit of product 225 would thus be caused to shift from the second position 240 to the first position 235. Similarly, the third unit of product 230 would be caused to shift from the third position 245 to the second position 240. The third position 245 would be left empty.

Figure 2B:
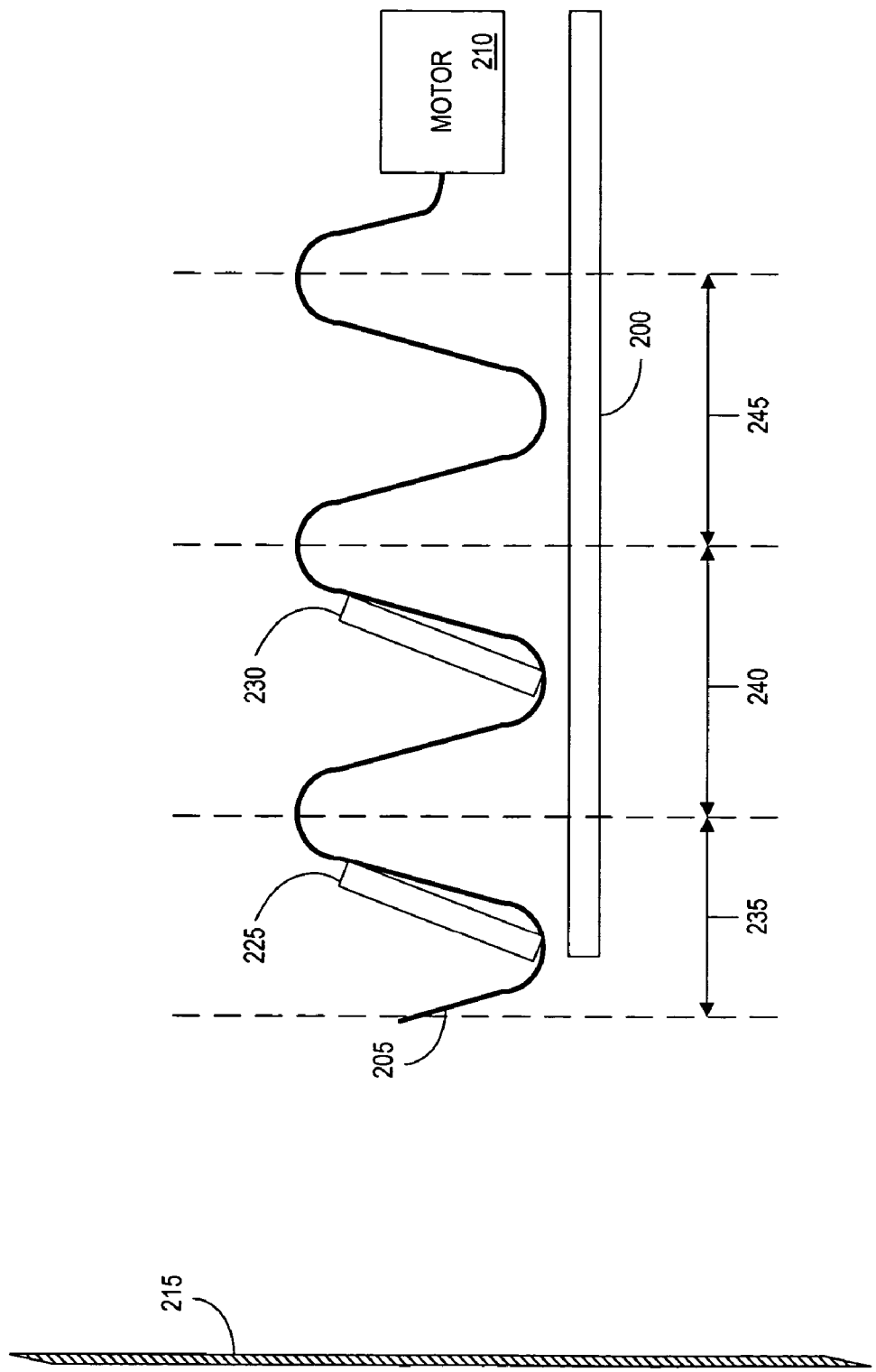

FIG. 2B illustrates a state of the receptacle 200 after the first unit of product 220 is vended.

A memory accessible to the vending machine (e.g., a memory of the vending machine, a memory of a receptacle, or a memory of another device accessible to the vending machine) of receptacle 200 may, upon the vending of a product from receptacle 200, be updated to indicate the new relationship among the units of product and the positions of the receptacle 200. The following figures illustrate some exemplary data structures for storing an indication of a relationship among the units of product stored in the vending machine and the positions of receptacles in the vending machine.

Figure 3A:
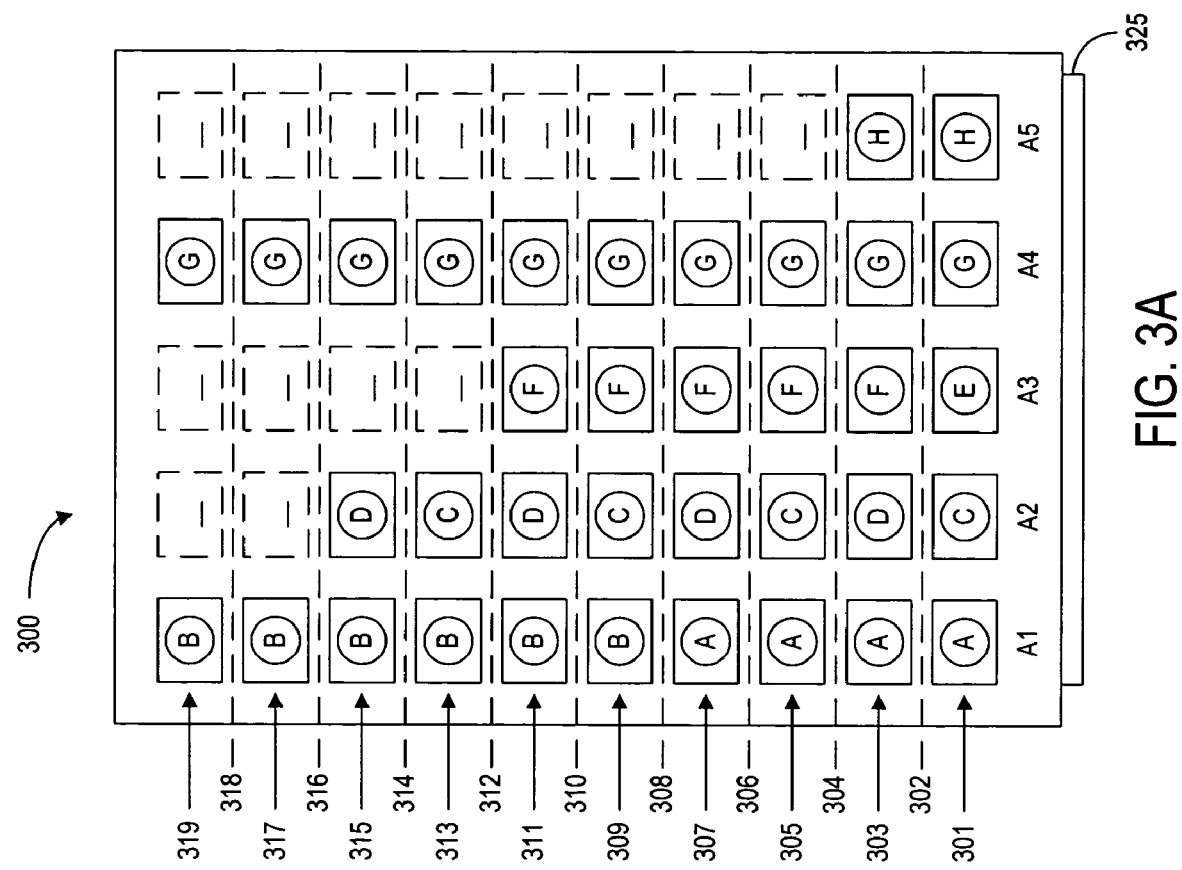
FIG. 3A is a plan view of a plurality of receptacles of a vending machine, according to one embodiment.

Referring now to FIG. 3A, illustrated therein is an embodiment 300 of a plan view of a plurality of receptacles of a vending machine, and an indication of a unit of a product (if any) located in a respective position of each of the illustrated receptacles. Specifically, FIG. 3A illustrates one embodiment of a plan view of the top receptacles of the vending machine 100 (i.e., a plan view of the receptacles A1 through A5). As can be seen, each receptacle is operable to store a plurality of units of products in a series. Each unit is located in a respective position of a receptacle. For example, receptacle A1 includes a plurality of positions 301 through 319. The positions are numbered sequentially from the front of the vending machine, which is indicated as front partition 325. Each position is defined by one or more partitions 302 through 318. For example, position 301 is defined by the front edge of the receptacle A1 and partition 302. Position 303 is defined by partition 302 and partition 304. The partitions 302 through 318 may comprise, for example, coils of a helix. In another example, partitions 302 through 318 may comprise retractable or otherwise movable wedges, lips or other structures protruding from the bottom, top or sides of receptacle A1.

As illustrated in embodiment 300, each receptacle may store units of more than one product. A unit of product located in a position is represented as a letter of the alphabet within a circle in FIG. 3A. A position that does not hold any unit of any product (i.e., an empty position) is thus illustrated without any circled letter within it. For example, receptacle A1 stores four units of product A (in positions 301 through 307) and six units of product B (in positions 309 through 319). Of course, a receptacle may also store only units of a single product (e.g., as the representation of receptacle A4 illustrates).

In the embodiment 300, a vending of a first product from a receptacle causes the remaining products to shift forward by one position. Thus, for example, if the unit of product A were to be vended from position 301 of receptacle A1, all remaining units would be shifted forward by one position. Accordingly, one of the three remaining units of product A would be located in each respective position of positions 301 through 305, and one of the six units of product B would be located in each respective position of positions 307 through 317. Position 319 would be left empty. As described below with reference to FIGS. 7-10, a vending machine in accordance with embodiments of the present invention has access (e.g., via a product inventory database) to information regarding the units of products occupying the locations of the receptacles of the vending machine at any given time.

Figure 3B:
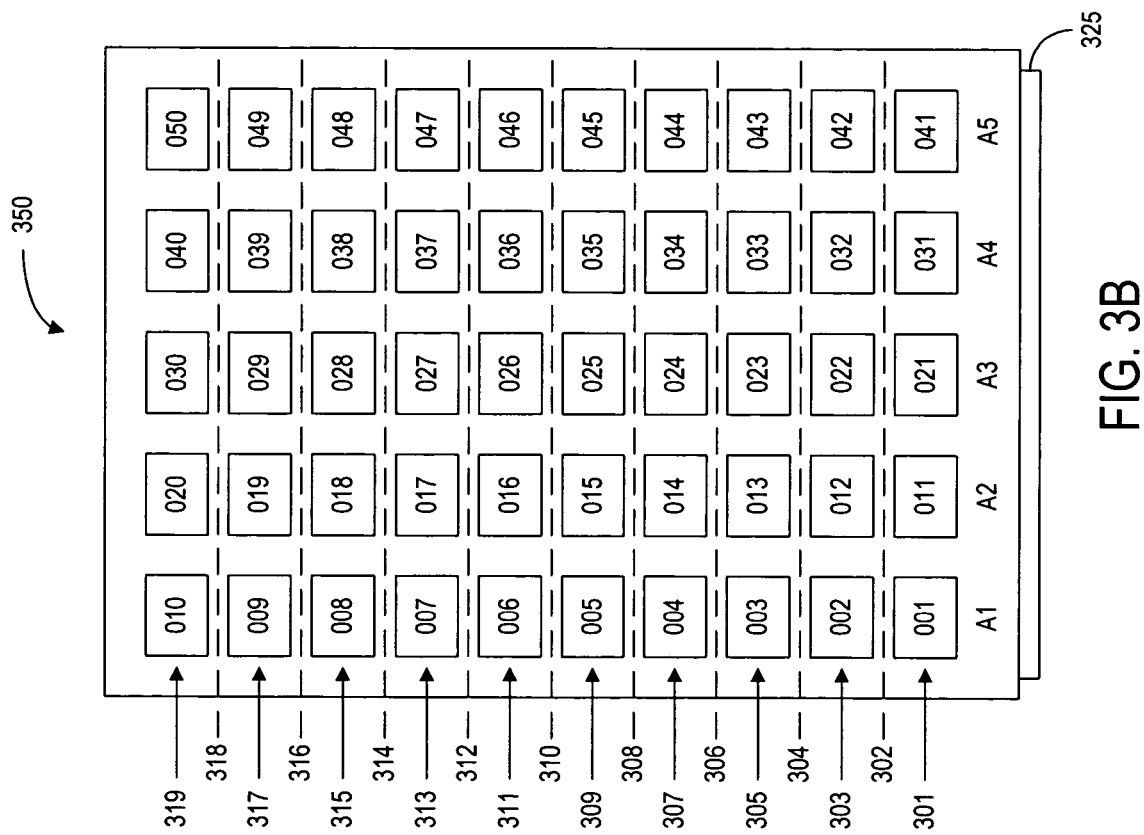
FIG. 3B is another representation of the plan view of the plurality of receptacles depicted in FIG. 3A, according to one embodiment.

Referring now to FIG. 3B, illustrated therein is an embodiment 350 of a plan view of the plurality of receptacles A1 through A5 of FIG. 3A. Embodiment 350 illustrates a representation of an identification system for the positions of the receptacles. No products are illustrated in FIG. 3B, the plan view merely illustrating a unique identifier for each position. For example, as described herein, a vending machine may have access to information, for each unit of product stored in the vending machine, allowing a relationship among a unit and a location of the unit in a receptacle of the vending machine to be determined. Accordingly, in one embodiment, the vending machine may have access to information identifying each available position of each receptacle of the vending machine. Each position may thus have a unique identifier associated therewith in the memory accessible to the vending machine. In embodiment 350, a unique identifier comprises a numeral. Each position in the vending machine thus has a number associated therewith, numbered consecutively starting with the first position in receptacle A1 and moving front-to-back, then to the front of the next receptacle to the right. Thus, in embodiment 300, the first position of receptacle A1 (which was referred to as position 301 in FIG. 3A) is identified as position "001". The last position of receptacle A5 is identified as position "050". Thus, for example, if a vending machine were to determine which product, if any, is located in the first position of receptacle A3, the vending machine would query the product identifier associated with position "021", as stored in a product inventory database. Similarly, if the vending machine were to determine which product, if any, is located behind the first product of receptacle A3 (i.e., in the second position of receptacle A3), the vending machine would query the product identifier associated with position "A22".

Of course, as would be understood by one of ordinary skill in the art upon reading the present disclosure, any type of unique identifier may be utilized to uniquely identify each position operable to store a product in vending machine 500. For example, the position referred to as position "001" in embodiment 300 may in another embodiment be identified as "Slot 1, tray A-1" in a situation where the receptacle 200 is a tray for holding products in a variety of slots.

Figure 4A:
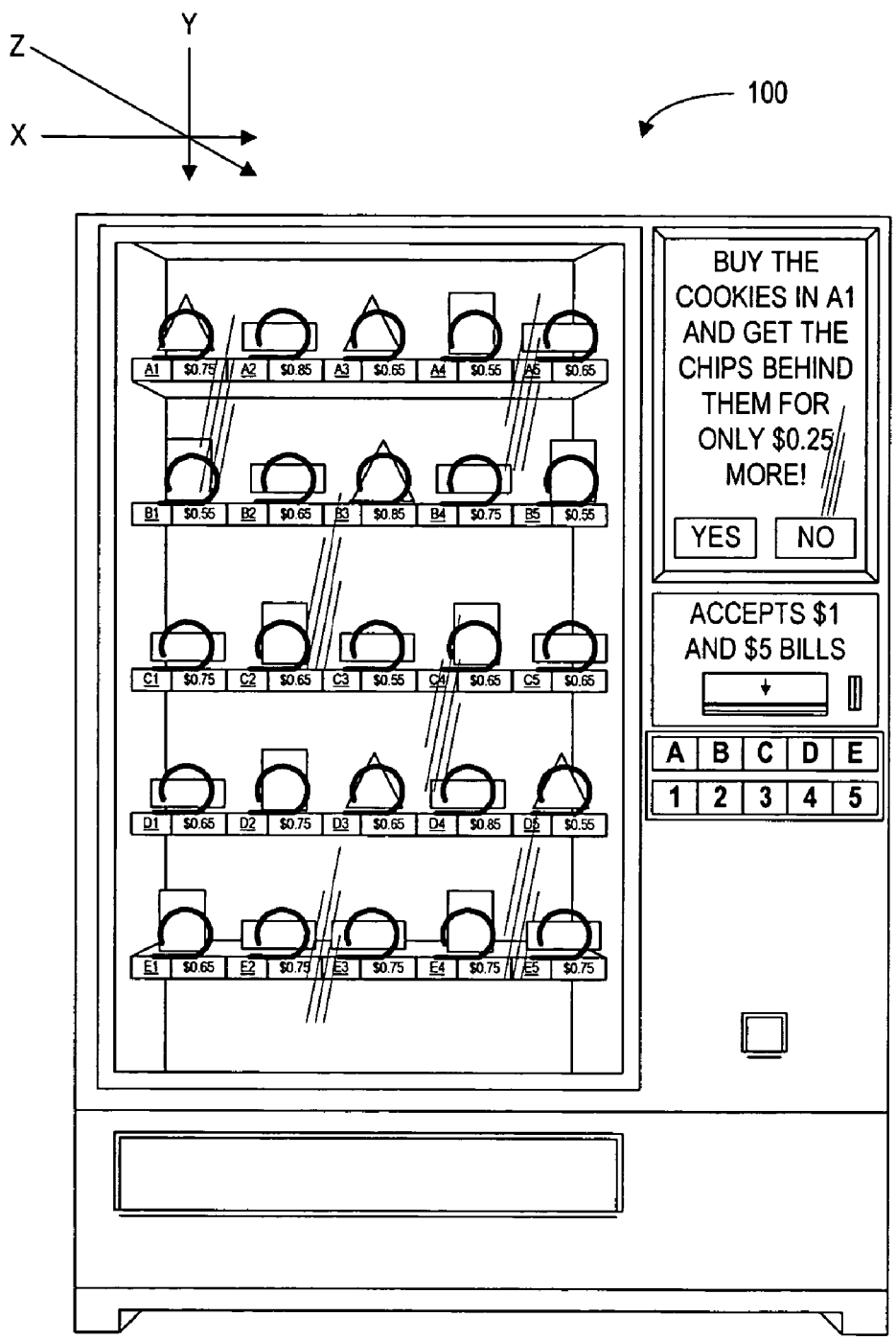
FIG. 4A is a diagram illustrating an example of the external appearance of a vending machine, with x, y and z coordinates superimposed thereon, according to one embodiment.
Figure 4B:
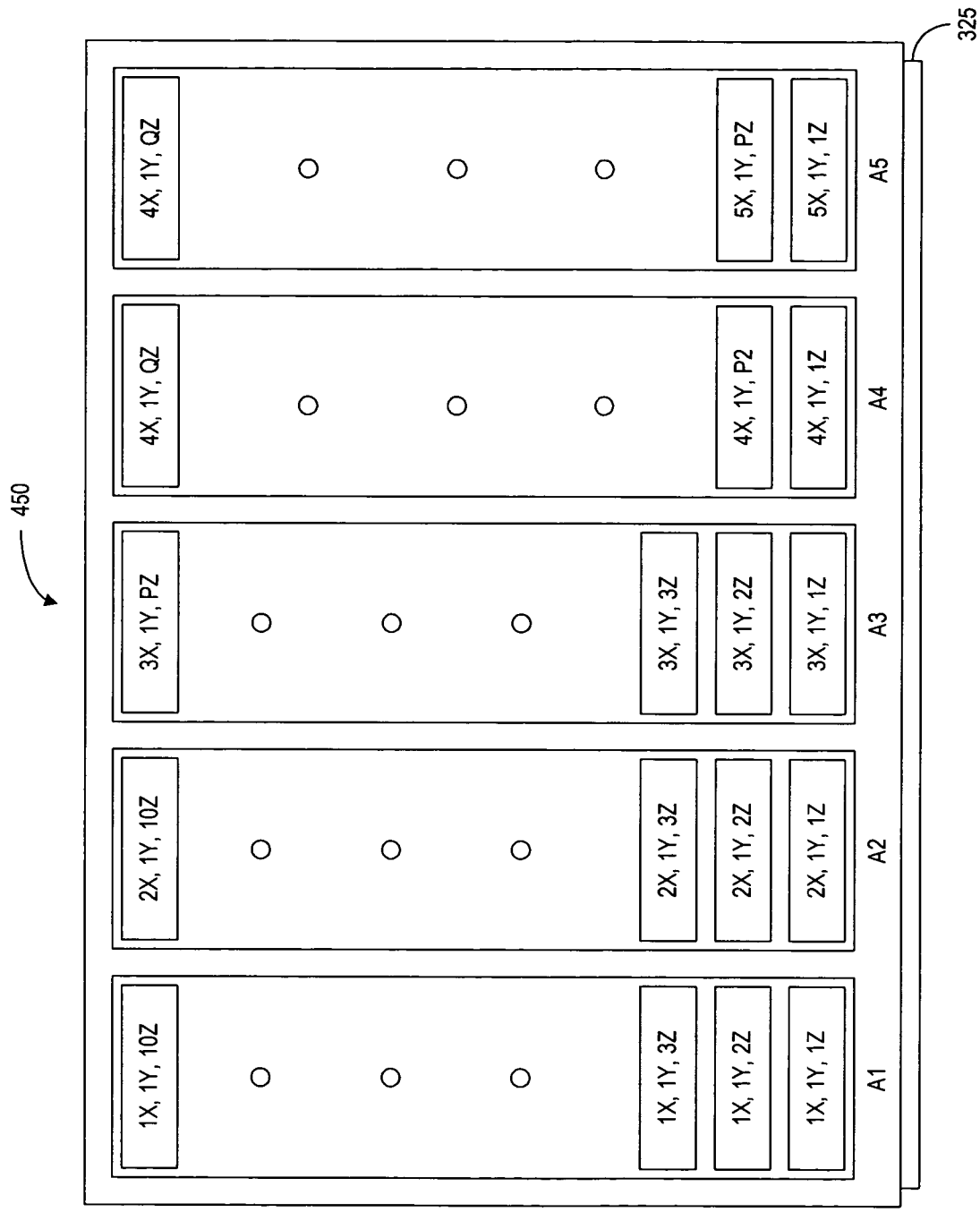
FIG. 4B is a plan view of a plurality of receptacles of a vending machine, illustrating coordinates for each position of each receptacle in the plan view, according to one embodiment.

Referring now to FIG. 4A, illustrated therein is an example of the external appearance of the vending machine 100 of FIG. 1, with reference lines (i.e., axes) of a three-dimensional rectangular coordinate system imposed thereon. Specifically, FIG. 4A illustrates an x-axis along which the rows of receptacles is arranged, a y-axis along about which the columns of receptacles of the vending machine are arranged, and a z-axis along the length of the receptacles A1 through E5. The axes are mutually orthogonal to each other (each at a right angle to the other). In other words, the x-axis is mutually orthogonal to the y-axis, the y-axis is mutually orthogonal to the z-axis and the z-axis is mutually orthogonal to the x-axis. It should be noted that in one embodiment the axes may not be mutually orthogonal to each other. For example, the receptacles may be positioned at an angle slanted towards the grounds (e.g., to utilize gravity to facilitate vending). In such an embodiment, for example, the z axis may not be orthogonal to the x-axis. FIGS. 4A and 4B are presented herein to illustrate that, in accordance with one embodiment, each position available for holding a unit of a product in a vending machine may be uniquely identified using the coordinates of a three-dimensional coordinate system.

Referring now to FIG. 4B, illustrated therein is an embodiment 450 of a plan view of the plurality of receptacles A1 through A5 of FIG. 4A. Embodiment 450 illustrates another representation of an identification system for the positions of the receptacles, wherein a vending machine is operable to uniquely identify each position for holding products within the vending machine. In embodiment 450, a unique identifier comprises a set of coordinates in the three-dimensional coordinate system referred to in FIG. 4A. For example, the first position in receptacle A1 is identified by the coordinates 1, 1, 1, indicating that the position is located at 1 unit length along the x-axis, unit length along the y-axis and 1 unit length along the z-axis. Similarly, the second position in receptacle A1 is identified by the coordinates 2, 1, 1, indicating that the first position is located at 2 unit lengths along the x-axis, one unit length along the same y-axis, and 1 unit length along the z-axis.

It should be noted that, in one or more embodiments, different trays may include a different numbers of positions. For example, a first receptacle may include ten positions while a second receptacle may include twelve positions. Thus, for example, a last position of a first tray may be located at a different unit length along the z-axis than a last position of a second tray. For example, in embodiment 450, the last position of receptacle A2 is located at ten unit lengths along the z-axis, while the last position of receptacle A3 is located at p unit lengths along the z-axis and the last position of receptacle A4 is located q unit lengths along the z-axis. Thus, p may not be equal to q which may not be equal to ten.

Of course, it should be understood that any other appropriate coordinate system or other method of uniquely identifying each position is within the scope of the present invention. The exemplary identification systems provided herein are for illustrative purposes only.

Figure 5:
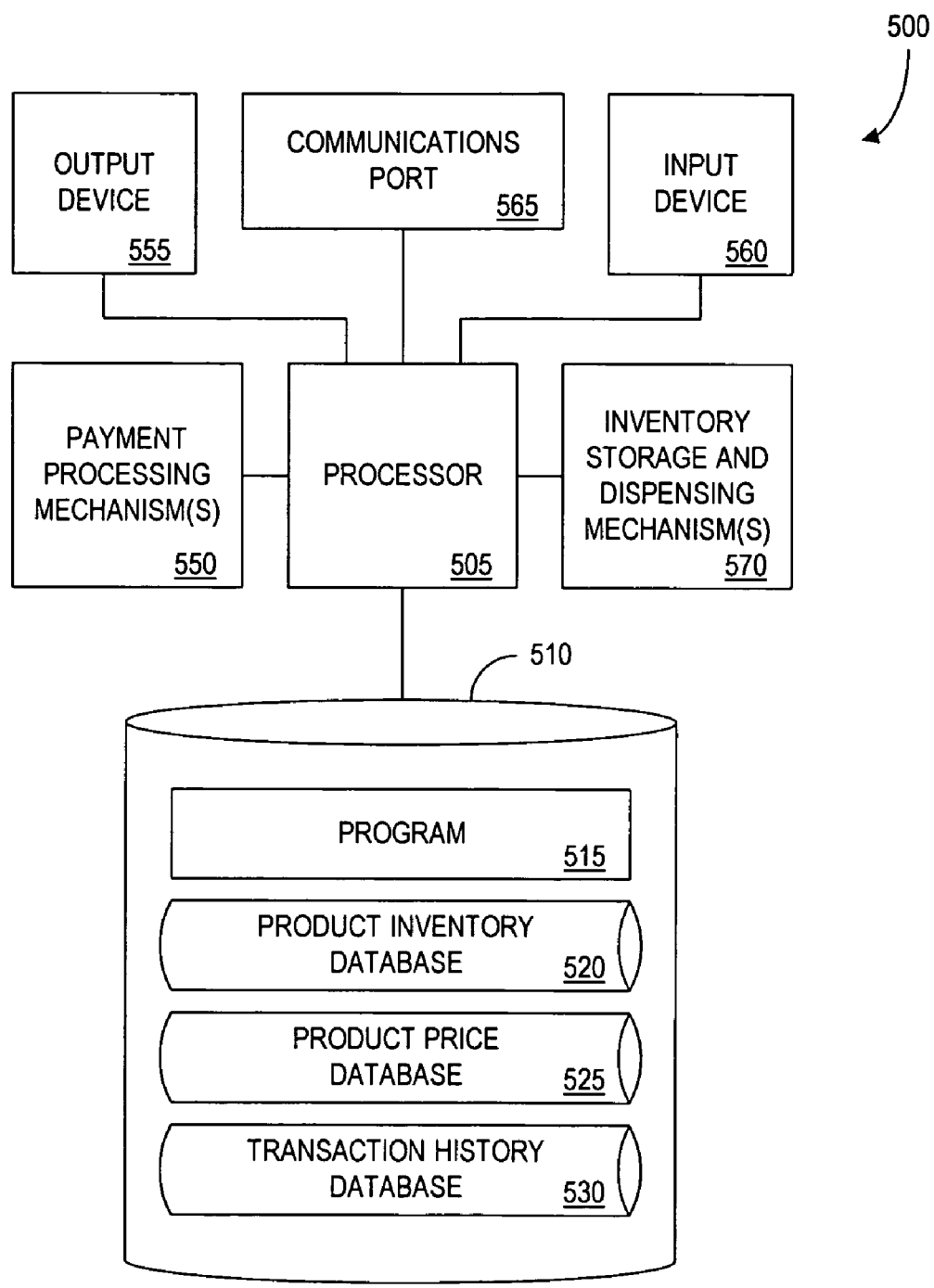
FIG. 5 is a block diagram illustrating an example vending machine, in accordance with one embodiment.

Referring now to FIG. 5, illustrated therein is a block diagram of an embodiment of a system consistent with the present invention. More specifically, FIG. 5 is a block diagram of a vending machine 500 that may be operable to perform one or more functions described herein.

The vending machine 500 may include a processor 505, such as one or more Intel® Pentium® processors. The processor 505 may include or be operatively connected to one or more clocks or timers (not pictured) and one or more communication ports 565 via which the processor 505 may communicate, in accordance with some embodiments, with other devices such as one or more peripheral devices, one or more controllers, one or more peripheral devices, and/or one or more user devices. The processor 505 is also in communication with a data storage device 510. The data storage device 510 may include any appropriate combination of magnetic, optical and/or semiconductor memory, and may include, for example, additional processors, communication ports, Random Access Memory ("RAM"), Read-Only Memory ("ROM"), a compact disc and/or a hard disk.

The processor 505 and the data storage device 510 may each be, for example: (i) located entirely within a single computer or other computing device; or (ii) operatively connected to each other by a remote communication medium, such as a serial port cable, a LAN, a telephone line, radio frequency transceiver, a fiber optic connection or the like. In some embodiments for example, the vending machine 500 may comprise one or more computers (or processors 505) that are connected to a remote controller computer operative to maintain databases, where the data storage device 510 is comprised of the combination of the remote controller computer and the associated databases.

The data storage device 510 stores a program 515 for controlling the processor 505. The processor 505 performs instructions of the program 515, and thereby operates in accordance with the present invention, and particularly in accordance with the methods described in detail herein. The present invention may be embodied as a computer program 515 developed using an object oriented language that allows the modeling of complex systems with modular objects to create abstractions that are representative of real world, physical objects and their interrelationships. However, it would be understood by one of ordinary skill in the art that the embodiments of the invention as described herein can be implemented in many different ways using a wide range of programming techniques as well as general purpose hardware systems or dedicated controllers.

The program 515 may be stored in a compressed, uncompiled and/or encrypted format. The program 515 furthermore may include program elements that may be generally useful, such as an operating system, a database management system and device drivers for allowing the processor 505 to interface with computer peripheral devices. Appropriate general purpose program elements are known to those skilled in the art, and need not be described in detail herein.

Further, the program 515 is operative to execute a number of invention-specific, objects, modules and/or subroutines which may include (but are not limited to) one or more subroutines to determine whether an inventory database should be updated; whether a price displayed for a receptacle should be updated; whether a promotion should be output and/or one or more subroutines to determine whether a vending of a particular unit of product should be facilitated. Examples of some of these subroutines and their operation are described in detail below in conjunction with the flowcharts depicted in FIGS. 13 through 17.

According to some embodiments of the present invention, the instructions of the program 515 may be read into a main memory of the processor 505 from another computer-readable medium, such from a ROM to a RAM. Execution of sequences of the instructions in the program 515 causes processor 505 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 515, the data storage device 510 is also operative to store one or more databases, such as (i) an product inventory database 520, (ii) a product price database 525, and (iii) a transaction history database 530 The databases 520, 525 and 530 are each described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though three separate databases are illustrated, the invention could be practiced effectively using one, two, four or more functionally equivalent databases.

Similarly, the illustrated entries of the databases represent exemplary information only; those skilled in the art will understand that the number and content of the entries can be different from those illustrated herein.

Further, despite the depiction of the databases as tables, an object-based model could be used to store and manipulate the data types of the present invention and likewise, object methods or behaviors can be used to implement the processes of the present invention. Examples of some of these processes are described below in detail with respect to FIGS. 13 through 17.

Vending machine 500 may comprise payment processing mechanism(s) 550. The payment processing mechanism(s) 550 may comprise one or more mechanisms for receiving payment and dispensing change, including a coin acceptor, a bill validator, a card reader (e.g. a magnetic stripe reader) and a change dispenser.

In a manner known in the art, a magnetic stripe card reader may read data on the magnetic stripe of a credit or debit card, and it may cooperate with conventional point-of-sale credit card processing equipment to validate card-based purchases through a conventional transaction authorization network. Suitable card-based transaction processing systems and methods are available from USA Technologies, Inc.™ of Wayne, Pa.

The coin acceptor, bill validator and change dispenser may communicate with a currency storage apparatus (a "hopper"; not shown) and may comprise conventional devices such as models AE-2400, MC5000, TRC200 by Mars, Inc.™ of West Chester, Pa., or CoinCo™ model 9300-L.

The coin acceptor and bill validator may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled COIN TUBE MONITOR MEANS, the entirety of which is incorporated by reference herein for all purposes. The change dispenser activates the return of coinage to the customer where appropriate (e.g. where a customer rejects or otherwise fails to accept a dynamically priced upsell offer). Such apparatus may feature Multidrop Bus (MDB) and/or Micromech peripheral capabilities, as is known in the art.

In another embodiment, a vending machine in accordance with the present invention may be configured to receive payment authorization and product selection commands through a wireless device communication network, directly or indirectly, from a customer device (e.g. a cellular telephone). In such an embodiment, a payment processing mechanism may comprise a cellular transceiver operatively connected to a processor, as described herein. Systems and methods allowing for the selection of and payment for vending machine articles through cellular telephones are provided by USA Technologies, Inc.™. Further, in such an embodiment, a customer cellular telephone may serve as an input/output device, as described herein.

Further details concerning vending machine payment processing mechanisms are well known in the art, and need not be described in further detail herein.

The vending machine 500 may further comprise an output device 555 and an input device 560. It should be understood that, although only a single output device 555 and a single input device 560 is illustrated in FIG. 5, any number of output devices and/or input devices may be used.

In accordance with embodiments of the presenting invention, a vending machine may include an input device for receiving input from (i) a customer indicating a product and/ or offer selection, and/or (ii) an operator during stocking or maintenance of the vending machine. Also, a vending machine may include one or more output devices for outputting product and/or promotion information to a customer or operator.

Many combinations of input and output devices may be employed in accordance with embodiments of the present invention. For example, in embodiments which feature touch screens (described herein), input and output functionality may be provided by a single device.

As described, a vending machine may include more than one input device. For example, a vending machine may include an exterior input device for receiving customer input and an interior input device for receiving operator input. In some embodiments, however, the input device provides the dual functionality of receiving input data from both operators and customers.

As also described, a vending machine may comprise more than one output device. For example, a vending machine may include both an Liquid Crystal Display (LCD) screen and several Light Emitting Diodes (LEDs).

Output device 555 may comprise, for example, an LCD and/or one or more LEDs displays (e.g., several alphanumeric LEDs on the shelves of a vending machine, each LED being associated with a receptacle).

In one embodiment, an LED display screen may be mounted atop a vending machine (e.g., attached thereto, such as via bolts or other mounting hardware). Such a mounted LED display screen and may be used to communicate promotions and other messages (e.g., product advertisements) to prospective customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, green, black) regarding current and upcoming promotions.

Further, in some embodiments, an output device comprises a printer. In one embodiment, a printer is configured to print on card stock paper (e.g. 0.06 mm to 0.15 mm thickness), such as the EPSON EU-T400 Series Kiosk Printer. Further, a printer may be capable of thermal line printing of various alphanumeric and graphical symbols in various font sizes (e.g. raging from 9 to 24 point) on various types of paper. Additionally, such a printer may communicate with a processor (described herein) via an RS232/IEEE 12834 and/or bi-directional parallel connection. Such a printer may further comprise a 4 KB data buffer.

Additionally, in some embodiments, an output device comprises an audio module, such as an audio speaker, that outputs information to customers audibly.

Input device 560 may comprise one or more of (1) a set of alpha-numeric keys for providing input to the vending machine, such as the Programmable Master Menu® Keypad, (2) a selector dial, (3) a set of buttons associated with a respective set of item dispensers, (4) a motion sensor, (5) a barcode reader, (6) a voice recognition module, (7) a Dual-Tone Multi-Frequency receiver/decoder, (8) a wireless device (e.g. a cellular telephone or wireless Personal Digital Assistant), and/or (9) any other conventional input device commonly employed by a vending machine designer.

As described, in some embodiments, a touch-sensitive screen may be employed to perform both input and output functions. Suitable, commercially available touch screens for use in accordance with the present invention are manufactured by Elo TouchSystems, Inc.™, of Fremont, Calif., such as Elo's AccuTouch™ series touch screens. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use in accordance with embodiments of the present invention may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art and need not be described further herein.

Vending machine 500 may further comprise one or more inventory storage and dispensing mechanism(s) 570. Product inventory storage and product dispensing functions of a vending machine configured in accordance with a snack machine embodiment of the present invention may include one or more of: (i) a drive motor, (ii) metal shelves, (iii) a product delivery system (e.g. a chute, product tray or other delivery bin, product tray door, etc.), (iv) dual spiral (i.e. double helix) item dispensing rods, (v) convertible (i.e. extendable) shelves, and/or (vi) a refrigeration unit. In some embodiments, some or all components of the inventory storage and dispensing mechanism(s) 570 may comprise product receptacles as described herein. Further details concerning vending machine inventory storage and dispensing mechanisms are well known in the art, and need not be described in further detail herein.

In some embodiments, as described above with respect to FIG. 1, a vending machine may be housed in a casing of the model 129 SnackShop manufactured by Automatic Products™. In such embodiments, 3 removable shelves may be employed, together providing for 30 product rows and an inventory capacity of between 185 to 522 commonly vended snack products.

In one embodiment, a control system executes instructions for managing the operation of the vending machine, and in particular in accordance with the inventive functionality described herein. Such vending machine functions include, but are not limited to: (1) product pricing (e.g., displaying prices via an LED, changing such prices where appropriate, etc.), (2) processing vending transactions by (i) receiving customer selections via an input device, (ii) processing payment via a payment processing mechanism, (iii) actuating corresponding product dispensing mechanisms, (3) determining promotions to output to customers, (4) outputting promotions to customers via output devices (including display of graphics/content on LCD and LED displays), (5) recording transaction information (inventory levels, acceptance rates for promotions, etc.) and (6) updating inventory information such as locations of units of products within receptacles of the vending machine.

In some embodiments, machine components (e.g., machine hardware, including mechanical hardware such as input devices, output devices, product dispensing mechanisms, and payment processing mechanisms including coin acceptors, bill validators, card readers, change dispensers, etc.) may be controlled by the control system through a standard RS-232 serial interface. In such embodiments, embedded API/devices may be used to enable software to actuate/control vending machine components via RS-232 connectivity. Such vending machine components may be operatively connected to the control system directly or indirectly, in any manner that is practicable. Alternatively, machine components may communicate with the control system through a Universal Serial Bus "USB" standard (e.g., USB ports may allow "plug-and-play" installation of machine components).

Figure 6A:
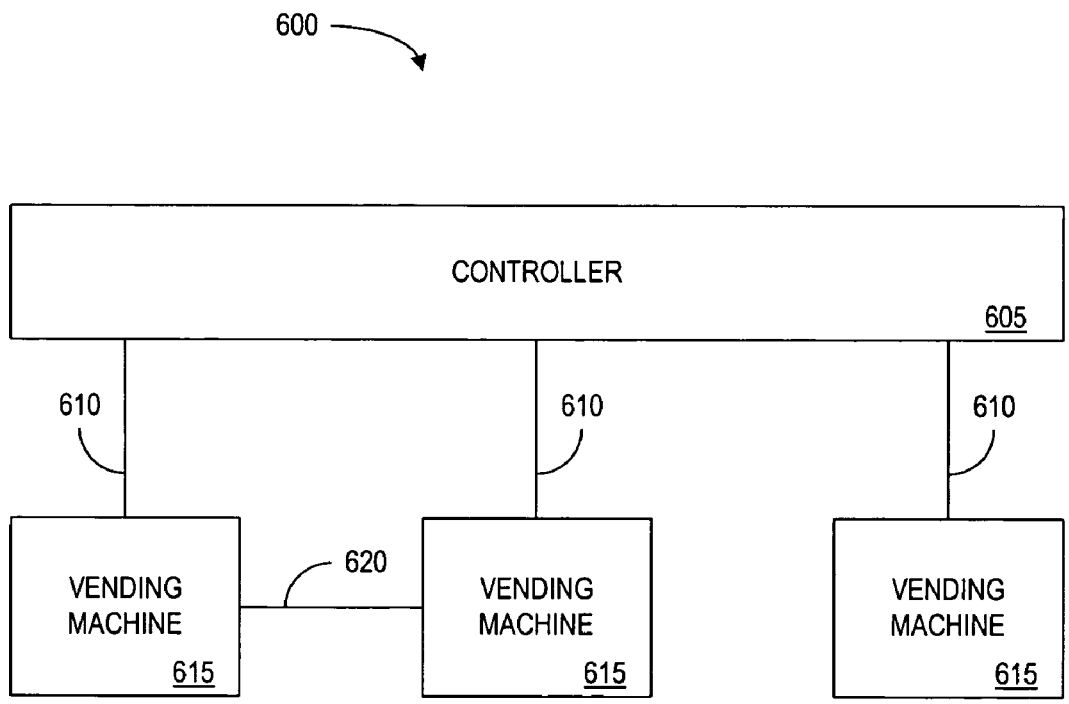
FIG. 6A is a block diagram illustrating an example system, in accordance with one embodiment.

Referring now to FIG. 6A, a block diagram of a system 600 according to at least one embodiment of the present invention includes a controller 605 that is in communication, via a communications network 610, with one or more vending machines 615. The controller 605 may communicate with the vending machines 615 directly or indirectly, via a wired or wireless medium such as the Internet, LAN, WAN or Ethernet, Token Ring, or via any appropriate communications means or combination of communications means. Each of the vending machines 615 may comprise computers, such as those based on the Intel® Pentium® processor, that are adapted to communicate with the controller 605. Any number and type of vending machines 615 may be in communication with the controller 605. In one embodiment, a vending machine 615 is substantially similar to the vending machine 500 (FIG. 5).

Communication between the vending machines 615 and the controller 605, and among the vending machines 615 (which communicate via communication network 620), may be direct or indirect, such as over the Internet through a Web site maintained by controller 605 on a remote controller or over an on-line data network including commercial on-line service providers, bulletin board systems and the like. In yet other embodiments, the vending machines 615 may communicate with one another and/or controller 605 over RF, cable TV, satellite links and the like.

Some, but not all, possible communication networks that may comprise network 610 and/or network 620 or be otherwise part of system 600 include: a local area network (LAN), a wide area network (WAN), the Internet, a telephone line, a cable line, a radio channel, an optical communications line, a satellite communications link. Possible communications protocols that may be part of system 600 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, the controller 605 may not be necessary and/or preferred. For example, the present invention may, in one or more embodiments, be practiced on a stand-alone vending machine 500 and/or a vending machine 500 in communication only with one or more other vending machines 500. In such an embodiment, any functions described as performed by the controller 605 or data described as stored on the controller 605 may instead be performed by or stored on one or more vending machines 500.

It should be noted that, in the embodiment of FIG. 6A, some of the functionality described with reference to FIG. 5 as being performed by vending machine 500 may instead or in addition be performed by controller 605. For example, controller 605 may store an indication of a relationship among a unit of a product stored in the vending machine and a location of the unit within the vending machine or a receptacle of the vending machine. Similarly, any data described with reference to FIG. 5 as being stored in a memory of vending machine 500 may, in the embodiment of FIG. 6A, be instead or in addition stored in a memory of controller 605. For example, data associated with past transactions completed at a vending machine 500 may be stored in a memory of controller 605.

It should further be noted that controller 605 may comprise one or more computing devices (e.g., working in cooperation with one another) that may or may not be located remotely to one another or remotely to one or more of the vending machines 500.

Figure 6B:
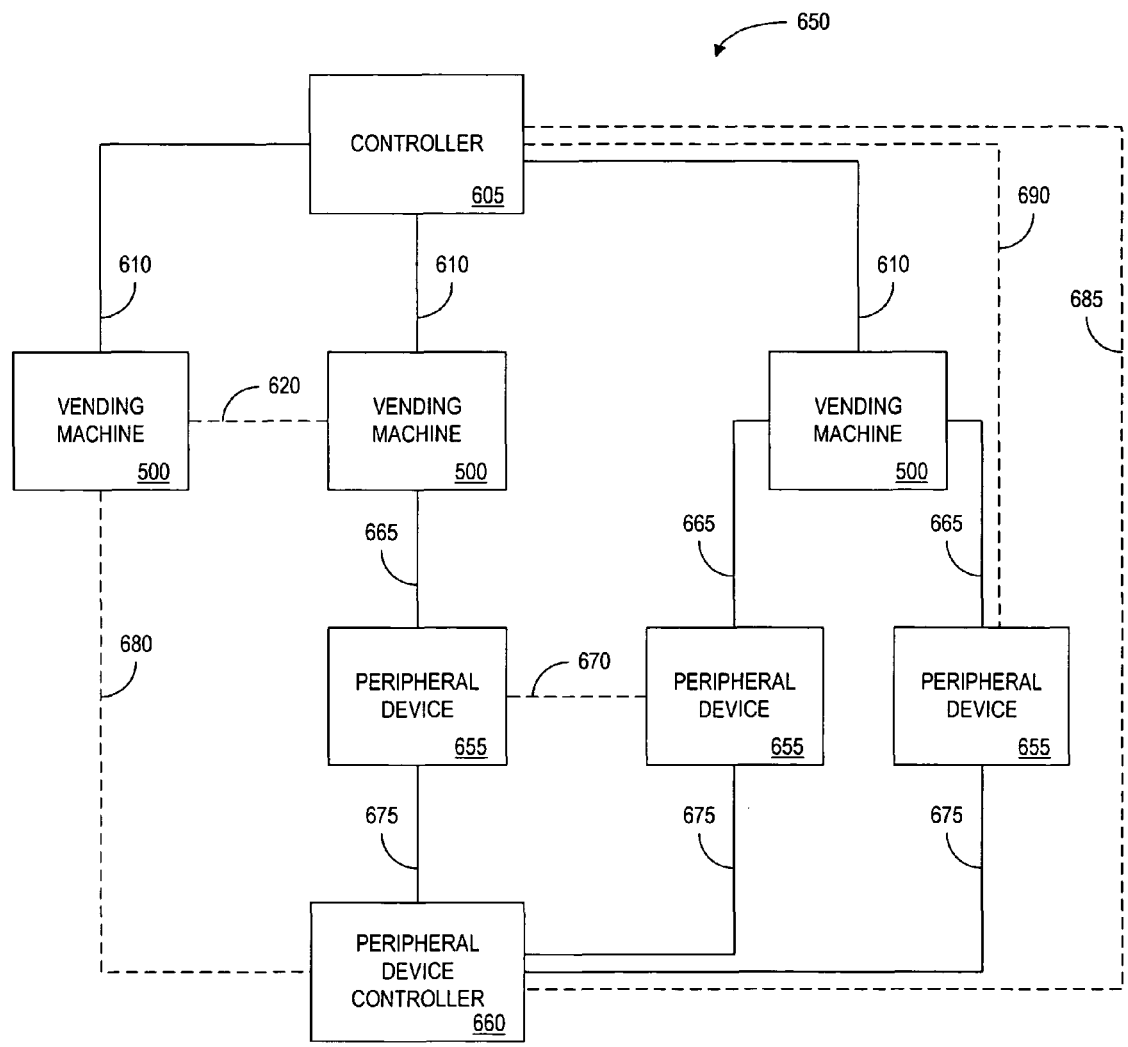
FIG. 6B is a block diagram illustrating another example system, in accordance with one embodiment.

Referring now to FIG. 6B, a block diagram of another system 650 according to at least one embodiment of the present invention includes a controller 605 that is in communication, via a communications network 610, with one or more vending machines 500. A difference between system 600 (FIG. 6A) and system 650 (FIG. 6B) is that in system 650 at least one vending machine 500 is also in communication with one or more peripheral devices 655 (defined above). A peripheral device 655 may, in turn, be in communication with a peripheral device controller 660 (via communication network 675). In some embodiments, a peripheral device 655 may also or instead be in communication with controller 605 (via communication network 690), one or more vending machines 500 (via communication network 665) and/or one or more user devices (not shown). In one or more embodiments the peripheral device controller 660 may be in communication with one or more vending machines 500 (via communication network 680) and/or controller 605 (via communication network 685).

Any of the controller 605, the vending machines 500, the peripheral devices 655 and/or the peripheral device controller 660 may communicate with one another directly or indirectly, via a wired or wireless medium such as the Internet, LAN, WAN or Ethernet, Token Ring, or via any appropriate communications means or combination of communications means. For example, the controller 605 may communicate directly with one of the vending machines 500 (e.g., via a LAN) and indirectly (e.g., via a vending machines 500) with a peripheral device 655. In another example, the controller 605 may communicate with one of the vending machines 500 via a LAN and with another of the vending machines 500 via the Internet.

Any and all of the controller 605, the vending machines 600, the peripheral devices 655 and the peripheral device controller 660 may comprise computers, such as those based on the Intel® Pentium® processor. Further, in one or more embodiments, each of the peripheral devices 655 may comprise an external or internal module associated with one or more of the vending machines 500 that is capable of communicating with one or more of the vending machines 500 and of directing the one or more vending machines 500 to perform one or more functions.

Any number of vending machines 500 may be in communication with the controller 605. Any number and type of peripheral devices 655 may be in communication with a vending machine 500, peripheral device controller 660 and controller 605.

Communication between any of the controller 605, the vending machines 500, the peripheral devices 655 and the peripheral device controller 660, among the vending machines 500 and among the peripheral devices 655 may be direct or indirect, such as over the Internet through a Web site maintained by controller 605 on a remote controller or over an on-line data network including commercial on-line service providers, bulletin board systems and the like. In yet other embodiments, any and all of controller 605, the vending machines 500, the peripheral devices 655 and the peripheral device controller 660 may communicate with one another over RF, cable TV, satellite links and the like.

Some, but not all, possible communication networks that may comprise any or all of the network 610, 620, 665, 670, 675, 680, 685 and 690, or that otherwise may be part of system 650 include: a local area network (LAN), a wide area network (WAN), the Internet, a telephone line, a cable line, a radio channel, an optical communications line, a satellite communications link. Possible communications protocols that may be part of system 650 include: Ethernet (or IEEE 802.3), SAP, ATP, Bluetooth™, and TCP/IP. Communication may be encrypted to ensure privacy and prevent fraud in any of a variety of ways well known in the art.

Figure 6C:
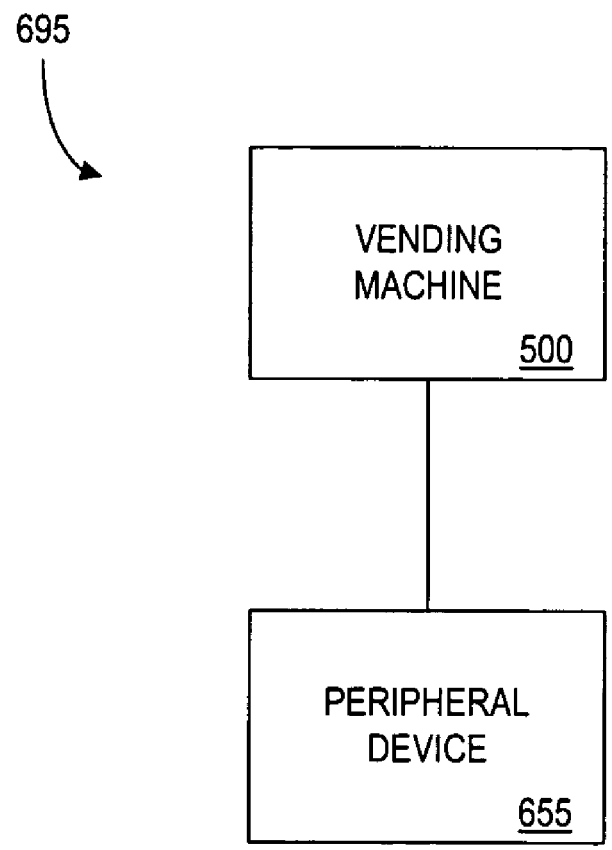
FIG. 6C is a block diagram illustrating another example system, in accordance with one embodiment.

In an embodiment, the controller 605 may not be necessary and/or preferred. For example, the present invention may, in one or more embodiments, be practiced on a stand-alone vending machine 500, one or more vending machines 500 in communication with one or more peripheral devices 655 (as illustrated in FIG. 6C), one or more vending machines 500 in communication with peripheral device controller 660, one or more peripheral devices 655 in communication with peripheral device controller 660, and/or a vending machine 500 in communication only with one or more other vending machines 500. In such embodiments, any functions described as performed by a particular device (e.g., by a vending machine 500) or data described as stored in a memory of a particular device (e.g., in a memory of a vending machine 500) may instead or in addition be performed by or stored in another of the devices described herein (e.g., a peripheral device 655).

Similarly, peripheral device controller 660 may not be desired and/or needed in some embodiments of the present invention. In embodiments that do not involve peripheral device controller 660, any or all of the functions described herein as being performed by peripheral device controller 660 may instead be performed by controller 605, one or more vending machines 500, one or more peripheral devices 655, or a combination thereof. Similarly, in embodiments that do not involve peripheral device controller 660 any data described herein as being stored in a memory of peripheral device controller 660 may instead be stored in a memory of controller 605, one or more vending machines 500, one or more peripheral devices 655, or a combination thereof.

Any or all of the vending machines 500 may, respectively, include or be in communication with a peripheral device 655. A peripheral device 655 may be a device that obtains (e.g., receives or reads) information from (and/or transmits information to) one or more vending machines 500. For example, a peripheral device 655 may be operable to obtain information about transactions being conducted at a vending machine 500, such as the initiation of a transaction, an amount of money deposited for a transaction and/or a product selected during a transaction. For example, a peripheral device 655 may monitor activities carried out by a processor of a vending machine 500.

In one or more embodiments, one or more such peripheral devices 655 may be in communication with a peripheral device controller 660. This allows the peripheral device controller 660 to receive information regarding a plurality of transactions conducted at a plurality of vending machines 500. The peripheral device controller 660, in turn, may be in communication with the controller 605. It should be understood that any functions described herein as performed by a peripheral device 655 may also or instead be performed by the peripheral device controller 660. Similarly, any data described herein as being stored on or accessed by a peripheral device 655 may also or instead be stored on or accessed by the peripheral device controller 660.

A peripheral device 655 may be operable to access one or more databases (e.g., of peripheral device controller 660 or of the peripheral device 655 or a combination thereof) to determine a promotion based on, for example, one or more transactions initiated and/or completed at a vending machine 500. A peripheral device 655 may also be operable to access one or more databases (e.g., a product inventory database and/or a transaction history database, each of which is described in detail below) to, for example, determine a promotion for output or to cause a change in a price displayed as associated with a receptacle of the vending machine.

The peripheral device controller 660 may also monitor promotions output to customers of vending machines 500 over time to determine acceptance rates for various promotions. For example, in embodiments wherein a customer is presented with a promotion at a vending machine 500 and responds thereto by providing an acceptance or rejection of the promotion via an input device of the vending machine 500 or an input device of a peripheral device 655, the peripheral device controller 660 may track which promotions are accepted by customers and subsequently use that information to select or otherwise determined promotions for output to customers. Further, information about a transaction obtained or accessed by peripheral device controller 660 may be analyzed, e.g., to identify the circumstances under which a promotion is most likely to be accepted by a customer. Based upon desired objectives, the peripheral device controller 660 may direct the appropriate peripheral device 655 to output customized promotions to a customer of a vending machine based on the circumstances of a transaction initiated by the customer.

Information received by a peripheral device 655 from a vending machine 500 may include inventory data such as an indication of a unit of product that was vended (and, e.g., which receptacle the product was vended from), an actual rate at which a particular product is selling, a number of transactions per unit of time, a coin inventory, a product inventory and/or a selection of a product by a customer currently conducting a transaction at the vending machine.

An example of a peripheral device that may comprise a peripheral device 655 is the e-Port™ by USA Technologies Inc. The e-Port™ is a credit and smart card-accepting unit that controls access to office and MDB vending equipment, and serves as a point of purchase credit card transaction device. The e-Port™ includes an LCD that allows for the display of color graphics, and a touch sensitive input device (touch screen) that allows users to input data to the device. The display may be used to prompt users interactively with, e.g., promotions and information about their transaction status.

A peripheral device 655 may be operable to receive input from customers, receive payment from customers, exchange information with a remotely located controller (e.g., controller 605 and/or peripheral device controller 660) and/or display messages to customers (e.g., promotion content). A peripheral device 655 may be operable to instruct a vending machine 500 that appropriate payment has been received (e.g., via a credit card read by the separate device) and/or that a particular product should be dispensed by the vending machine. Further, a peripheral device 655 may be operable to instruct the vending machine to execute promotions or price changes.

The functions described herein as being performed by a peripheral device controller 660 and/or a peripheral device 655 may, in one or more embodiments, be performed by the controller 605 (in lieu of or in conjunction with being performed by a peripheral device controller 660 and/or a peripheral device 655). Such functions may be performed by controller 605 in either system 600 (FIG. 6A) or system 650 (FIG. 6B).

In one or more embodiments, a peripheral device 655 may be useful for implementing the embodiments of the present invention into the operation of a conventional vending machine. For example, in order to avoid or minimize the necessity of modifying or replacing a program already stored in a memory of a conventional vending machine, an external or internal module that comprises a peripheral device 655 may be inserted in or associated with the vending machine. For example, a conventional vending machine may be retrofitted with a peripheral device 655 in order to implement one or more embodiments of the present invention.

A peripheral device 655 may include (i) a communications port (e.g., for communicating with one or more vending machines 500, peripheral device controller 660, another peripheral device 655, and/or controller 605); (ii) a display (e.g., for graphics and/or text associated with a promotion), (iii) another output means (e.g., a speaker and/or light to communicate with a customer), and/or (iv) a benefit providing means (e.g., a printer and paper dispensing means).

In one or more embodiments, the peripheral device 655 may direct a vending machine to perform certain functions. For example, a program stored in a memory of peripheral device 655 may cause a processor of a vending machine 500 to perform certain functions. For example, a program stored in a memory of peripheral device 655 may cause a processor of a vending machine to dispense one or more products, dispense a monetary amount, refrain from dispensing a monetary amount, refrain from outputting a product, and/or communicate with another device.

Note that, in one or more embodiments, a vending machine 500 and a peripheral device 655 that is associated with the vending machine 500 may not communicate directly with one another at all. In some embodiments, however, each may communicate with a computer or other device. For example, a vending machine 500 may communicate with controller 605 and an associated peripheral device 655 may communicate with peripheral device controller 660 and/or controller 605. For example, if both vending machine 500 and peripheral device 655 are in communication with controller 605, each may obtain information associated with the other through controller 605.

It should be noted that in either the system 600 (FIG. 6A) or the system 650 (FIG. 6B), the controller 605 and/or the peripheral device controller 660 may be accessible, directly or indirectly, via another computer (communicating, e.g., over the Internet or other network) by a customer or another entity. Accordingly, a customer or other entity (e.g., an operator of the vending machine) of the other computer could communicate with the controller 605 and/or peripheral device controller 660 (e.g., via a Web browser).

In one embodiment, the other computer may be operable to receive data, e.g., from the controller 605 and/or peripheral device controller 660. For example, the computer could receive messages (e.g., promotions) described herein as being output by the vending machine or peripheral device.

In one embodiment, the computer may be operable to transmit data to the controller 605 and/or peripheral device controller 660 (e.g., data described herein as being provided to the vending machine). For example, the computer may be operable to transmit an indication of products being stocked in the vending machine and, e.g., an indication of a location of each unit of product being stocked. In another example, the computer may be operable to transmit an indication of a respective price associated with each product that is being stocked, or may be stocked, in the vending machine.

Similarly, various data described herein as received through an input device of a vending machine 500 and/or peripheral device 655 may be received through a Web browser communicating with the controller 605 and/or peripheral device controller 660, which in turn communicates with the vending machine 500. Thus, an owner/operator of the vending machine may have remote polling and reporting capabilities, may be able to transmit inventory information, prices and/or new business rules to the vending machine 500, and the like.

In one embodiment, an operator of the vending machine restocking the vending machine may utilize a portable device to transmit inventory information, price and/or new business rules to the vending machine and/or a peripheral device of the vending machine.

Referring now to FIG. 6C, a block diagram of another system 695 according to at least one embodiment of the present invention includes a vending machine 500 that is in communication with a peripheral device 655. As described above, a prior art vending machine 500 may be retrofitted with a peripheral device 655. The peripheral device 655 may be operable to perform at least some of the methods of the present invention and/or to direct the vending machine 500 to perform at least some of the methods of the present invention, without requiring a controller 605 and/or a peripheral device controller 660. For example, in one embodiment, a peripheral device may comprise a camera operable to capture an image of a vending machine and/or a product located in a first position of a receptacle of the vending machine. In one or more embodiments, the vending machine 500 and/or the peripheral device 655 may be accessible from a remote location via a communication port.

3. Databases

Embodiments of the present invention may be implemented using one or more databases. As indicated above, it should be noted that although the example embodiment depicted in FIG. 5 includes three particular databases stored in data storage device 510 of a vending machine 500, other database arrangements may be used which would still be in keeping with the spirit and scope of the present invention. In other words, the present invention could be implemented using any number of different database files or data structures, as opposed to the three depicted in FIG. 5. Further, the individual database files could be stored on different controllers (e.g. located on different storage devices in different geographic locations, such as on a peripheral device 655, controller 605, peripheral device controller 660 or a combination thereof). Likewise, the program 515 could also be located remotely from the data storage device 510 and/or on another controller. As indicated above, the program 515 may include instructions for retrieving, manipulating, and storing data in the databases 520, 525 and 530, as may be useful in performing the methods of the invention as will be further described below.

Turning to FIGS. 7A and 7B, illustrated therein is a tabular representation of an embodiment 700 of the product inventory database 520 (FIG. 5). FIG. 7A illustrates a state of the product inventory database before a product is vended from position "001" while FIG. 7B illustrates the state of the database after the unit of product is vended from position "001." The tabular representation 700 of the product inventory database includes a number of example records or entries, each of which defines a unit of a product available for sale from a vending machine. Those skilled in the art will understand that the product inventory database may include any number of entries. The tabular representation of product inventory database also defines fields for each of the entries or records. The fields specify: (i) a position 705 of a unit of a product within the vending machine, (ii) an identification of a unit of product 710 located in the corresponding position, and (iii) an indication of whether the corresponding position is a first position of a receptacle (i.e., whether the unit of product (if any) stored in that position is available for immediate vending).

As described herein, a vending machine operating in accordance with embodiments of the present invention may store or have access to information, for each unit of product stored in the vending machine, allowing a relationship among a unit and a location of the unit in a receptacle of the vending machine to be determined.

For example, the vending machine may be operable to determine an identity of a unit stored in a position of the vending machine based on a determined position of the vending machine. In an even more specific example, the vending machine may be operable to determine what product is stored in the first slot of tray "A-1". Such a determination may be performed, for example, in a subroutine for determining what price should be displayed as associated with tray "A-1".

In another example, a vending machine may be operable to determine which position(s) units of a particular product are located in. In a more specific example, a vending machine may receive a request to purchase a particular product (e.g., Reese's™ Peanut Butter Cups) and, after determining that this product is not immediately available for vending (e.g., the product is not located in a first position of any receptacle), the vending machine may be operable to determine where the product is located. For example, the vending machine may be operable to determine that the product is located in a second position of a particular receptacle. In some embodiments, the vending machine may then be operable to cause an event to facilitate the vending of the product in the first position in order to make the product in the second position available for sale. For example, if the vending machine determines that a package of Doritos™ chips is located in a first position of a particular receptacle and that the package of Reese's™ Peanut Butter Cups is located in the second position of the receptacle and should be made available for immediate vending, the vending machine may output a promotion for a package deal that includes the Doritos™. For example, the vending machine may output a promotion for a package of Doritos™ and a package of Reese's™ Peanut Butter Cups for a package price that is less than the sum of the prices for these individual products.

Various methods of utilizing information in the product inventory database are described below in Section 4.

Returning now to table 700, the position field 705 stores a unique position identifier for each position available for holding products within the vending machine. In the embodiment of table 700, each position is identified by a unique number. The positions identified in table 700 correspond to the positions illustrated in FIG. 3B. Thus, a vending machine having the receptacles illustrated in the plan view of FIG. 3B may store an indication of what product, if any, is located in each position of each receptacle.

The product field 710 stores an identifier of a product located in each respective position. Thus, as the first record of table 700 indicates, position "001" holds product "A". The identifications of the products located in each position in table 700 corresponds to the plan view of FIG. 3A. Thus, the vending machine storing units of products as indicated in the plan view of FIG. 3A may store an indication of the placement of the products as embodied in table 700. It should be noted that although a vending machine has been described as storing a product inventory table or storing product placement information, in some embodiments the vending machine itself may not store this information but may rather have access to this information. For example, the information may be stored in a memory of another device (e.g., a controller) with which the vending machine is operable to communicate.

In one embodiment, each product in the vending machine may be equipped with a radio frequency identification (RFID) tag, readable by the vending machine. For example, the vending machine may include one or more radio frequency reader devices operable to receive the information from such tags. An RFID tag of a product may include information such as the expiration date of the product and an identification of the product (e.g., bar code uniquely identifying the product via, for example, a Stock Keeping Unit). U.S. patent application Ser. No. 10/213,167, filed Aug. 6, 2002 in the name of McGarry et al. and entitled VENDING AUDIT SYSTEM describes a RFID tag system usable in a vending machine. The entirety of U.S. patent application Ser. No. 10/213,167 is incorporated by reference herein for all purposes.

In one embodiment, a camera may be positioned to capture the unit of product in a first position of a receptacle at any given time. The image captured by such a camera may be analyzed and the information utilized to update the product inventory database. Such a camera may be positioned, for example, (i) across from a vending machine with the lens angled towards the front of the vending machine, (ii) on the vending machine with the lens angled towards the partition of the vending machine, or (iii) inside the vending machine with the lens angled towards the first position of one or more receptacles.

In one embodiment, the information in product inventory database 520 is input by an operator of a vending machine (e.g., at a time the operator is refilling the vending machine with inventory). Various methods of loading a vending machine with inventory and inventory and pricing information are described below in Section 5.

It should be noted that, for simplicity, the product identifiers in table 700 and elsewhere in the present application are indicated as a single letter (e.g., "A", "B", "C", etc.). However, an identifier of a product may be of any form. For example, a bar code or information encoded in a bar code format may be stored as a product identifier. In another example, a bar code may be a trademark or brand name of a product (e.g., "Pepperidge Farm™ Milano™ Cookies). In yet another example, a product identifier may be a description of the product (e.g., "chocolate covered mints, bite-size"). In yet another embodiment, a product identifier may be an identifier assigned to the product by a vending machine operator to identify the product (e.g., "P-101-33") based on a product identification system utilized by the operator. In one embodiment, more than one product identifier may be stored for a single product. For example, a product located in a particular position may be identified by storing both its bar code and its trademark or brand name.

For purposes of illustrating an embodiment in a particular set of circumstances, the data in table 700 of FIG. 7A corresponds to the inventory status illustrated in the plan view of FIG. 3A and the positions illustrated in the plan view of FIG. 3B. Thus, positions "001" through "004" (the first four positions of receptacle "A1") are each depicted in table 700 of FIG. 7A as storing a respective unit of product "A" while positions "005" through "010" (the last six positions of receptacle "A1") are each depicted in table 700 as storing a respective unit of product "B".

Referring now to FIG. 7B, illustrated therein is table 700 depicting a status in inventory after the vending of a unit of product "A" from position "001". Thus, positions "001" through "003" (the first three positions of receptacle "A1") are each depicted in table 700 of FIG. 7B as storing a respective unit of product "A" while positions "004" through "090" (the next six positions in receptacle "A1") are each depicted as storing a respective unit of product "B". Position "010" (the last position of receptacle "A1") is depicted as being empty.

Thus, for example, a vending machine storing the table 700 of FIG. 7B may, in some circumstances, determine that it would be advantageous to an operator of the vending machine to sell the unit of product "B" that is currently in position "004". For example, the vending machine may determine that a customer desires to purchase the unit of product "B" or that the unit of product "B" is approaching its expiration date. Accordingly, the vending machine may cause an event to facilitate the vending of the units of product "A" that are currently stored in positions "001" through "003". For example, the vending machine may determine and output an offer to sell these units of product "A" for 50% of their regular price.

Referring now to FIG. 8A, illustrated therein is an embodiment of a product inventory database 520 in the form of tabular representation 800. The tabular representation 800 of the product inventory database includes a number of example records or entries, each of which defines a unit of a product available for sale from a vending machine. Those skilled in the art will understand that the product inventory database may include any number of entries. The tabular representation 800 of product inventory database 520 also defines fields for each of the entries or records. The fields specify: (i) a position 805 of a unit of a product within the vending machine, (ii) an indication of a unit of product 810 located in the corresponding position and (iii) a price 815 of the corresponding unit of the product. Thus, the tabular representation 800 of the product inventory database 520 stores an indication of pricing. In other embodiments, pricing information for products available from a vending machine may be stored in a different table or database.

Assume, for exemplary purposes only, that tabular representation 800 represents a product inventory database 800 of a vending machine that includes eight receptacles, arranged in five columns and eight rows: A1 through A5 in the top row, B1 through B5 in the second row, C1 through C5 in the third row, D1 through D5 in the fourth row, E1 through E5 in the fifth row, F1 through F5 in the sixth row, G1 through G5 in the seventh row, and H1 through H5 in the eighth and bottom row. Of course, any number of receptacles arranged in any configuration may be used. Assume further that at least receptacle A1 includes six positions. Of course, any number of positions may be used. Further, as discussed above, different receptacles in a single vending machine may include different numbers of positions. For example, a first receptacle may include a first number of positions while a second receptacle may include a second number of positions, wherein the first number does not equal the second number.

Differences between tabular representation 800 and tabular representation 700 (FIGS. 7A and 7B) include the format of the position identifier, the format of the product identifier, and the inclusion of a price for each position. As described with reference to FIG. 7A, many different formats for product identifiers and position identifiers may be used. In tabular representation 800, the position identifier comprises an indication of the receptacle in which the position of reference is located (e.g., "tray A1") and an indication of the slot within the receptacle. Thus, for example, position identifier "A1-1" may define the first position (i.e., first from the front of the vending machine) in tray "A1". It should be noted that a receptacle identifier (e.g., "A1") may identify the row and column in which the receptacle is located, as is known in the art.

FIG. 8B illustrates tabular representation 800 after units of product have been vended, thus reflecting a change in the data. More particularly, tabular representation 800 of FIG. 8B illustrates the product inventory data after the Snickers™ Bar in position "A1-1" has been vended and after the Milano™ Cookies in position H5-5 have been vended. Thus, each of the units of product remaining in receptacle "A1" is moved forward by one position and each of the units of product remaining in receptacle "H5" is moved forward by one position and the tabular representation 800 reflects this change in positions. FIG. 8A, illustrating the tabular representation before the vending of the units of product, illustrates that positions "A1-1" through "A1-3" each hold a respective unit of a Snickers™ Bar while positions "A1-4" through "A1-6" each hold a respective unit of Reese's™ Cups and that positions "H5-5" and "H5-6" each hold a respective unit of Milano™ Cookies. FIG. 8B illustrates that, after the vending of the Snickers™ Bar from position "A1-1", positions "A1-1" through "A1-2" each store a respective Snickers™ Bar while positions "A1-3" through "A-5" each store a respective unit of "Reese's™ Cups". Position "A1-6" is empty. FIG. 8B further illustrates that, after the vending of the Milano™ Cookies from position "H5-5", position "H5-5" still holds a unit (albeit a different unit) of Milano™ Cookies while position "H5-6" is empty.

It should be noted that, when a change of data occurs in a product inventory database, the data prior to the change may be stored for future reference. Thus, for example, in one embodiment a new table may be generated and populated with the updated data (and, e.g., a time stamp or other indication that this is the current inventory status) while the table storing the data prior to the change may remain stored in memory. In other embodiments, the new data may simply replace the old data in the table. An indication of products vended may instead, or in addition, be stored in a transaction database, as described below.

Other data besides that illustrated in tabular representations 700 and 800, respectively, may be stored in product inventory database 520. For example, an indication of units of products previously stored in a receptacle (e.g., within the current fill period) but vended may be stored. In another example, a time stamp or other indication of a time at which, or order in which, a unit of product was loaded into the vending machine relative to one or more other units of product may also be stored. For example, an indication of a time (e.g., date and/or time of day) at which a unit of product was loaded into the vending machine may be stored in association with the unit.

Referring now to FIG. 9A illustrated therein is an embodiment of a product inventory database 520 in the form of tabular representation 900. The tabular representation 900 of the product inventory database includes a number of example records or entries, each of which defines a number of units of a product available for sale from a vending machine. Those skilled in the art will understand that the product inventory database may include any number of entries. The tabular representation 900 of product inventory database 520 also defines fields for each of the entries or records. The fields specify: (i) a receptacle identifier 905 that identifies a receptacle within the vending machine, (ii) an indication of products located in the receptacle 910, (iii) a number of units 915, (iv) a loaded position rank 920, and (v) a current position rank 925. Thus, the tabular representation 900 of the product inventory database 520 stores an indication of an order in which units of products were loaded into a receptacle of a vending machine as well as an indication of an order in which units of products are currently stored in a receptacle of a vending machine.

The number of units 915 stores an indication of a block or number of units that are associated with one another and stored in series in a particular receptacle of the vending machine (e.g., as defined by an operator of a vending machine). A number or block of units may be associated with one another, for example, because they are units of the same product or are units of products that sell for the same price. It should be noted that a block or number of units stored in field 915 may be zero, one or a number greater than one.

The loaded position rank 920 stores an indication of the relative order in which the different blocks of units indicated in fields 910 and 915 were loaded into the corresponding receptacle of the vending machine. For example, the loaded position rank 920 may store (i) an indication of "1" to indicate the block of units that was loaded first into the receptacle (e.g., with the first unit of the block being placed at the front of the receptacle (i.e., into the first position of the receptacle)); (ii) an indication of "2" to indicate the block of units that was loaded second into the receptacle; and (iii) an indication of "3" to indicate the block of units that was loaded third into the receptacle, etc. In a more specific example, assume an operator loads three bags of Chips into the front of a tray of a vending machine, followed by four bags of Popcorn, followed by two bags of Pretzels. The bags of Chips may thus be assigned a loaded position rank of "1", the bags of Popcorn may be assigned a loaded position rank of "2" and the bags of Pretzels may be assigned a loaded position rank of "3", thus indicating that the receptacle was loaded (front to back) with the bags of Chips first, then the bags of Popcorn, and then the bags of Pretzels.

The current position rank 925 stores an indication of the relative order in which the different blocks of units indicated in fields 910 and 915 are currently stored in the corresponding receptacle.

As is apparent from FIG. 9A, tabular representation 900 does not necessarily include a record for each individual unit of product stored in a vending machine in association with a unique position identifier corresponding to each unit. Rather, the tabular representation 900 stores a record for each different block or number of units stored in a receptacle of a vending machine, along with an indication of a relative order in positioning within the receptacle of each block or number of units.

Assume, for exemplary purposes only, that the tabular representation 900 stores product inventory data for a vending machine that includes a receptacle identified as "A1" and that this receptacle includes six product positions (i.e., is operable to hold six individual units of product). Assume further that each of the first two positions holds a respective unit of "Brand X Chocolate Bar" while each of the last four positions holds a respective unit of "Brand X Peanut Butter Cups". Tabular representation 900 does not store a record for each position of receptacle "A1", indicating that positions "A1-1" through "A1-2" each hold a respective unit of product "Brand X Chocolate Bar" while positions "A1-3" through "A1-6" each hold a respective unit of product "Brand X Peanut Butter Cups". Rather, tabular representation 900 instead stores a record for each block or number of units that were loaded in series and an indication of the relative order of each block.

For example, as illustrated in record R900-1, tabular representation stores an indication that two units of "Brand X Chocolate Bar" are located in series in receptacle "A1" and four units of "Brand X Peanut Butter Cups" are located in series in receptacle "A1". Further, as also illustrated in record R900-1, tabular representation 900 stores an indication that the two units of "Brand X Peanut Chocolate Bar" were loaded first into the receptacle "A1" (as indicated in Loaded Position Rank 920) and the four units of "Brand X Peanut Butter Cups" were loaded second into the receptacle "A1" (as also indicated by Loaded Position Rank 920).

It should be noted that the relative order of positioning of the blocks of products within the corresponding receptacle may be indicated in other manners. For example, a unique identifier may be associated with each block, where the unique identifier is assigned upon the loading of the block and the unique identifiers for the respective blocks are numbered consecutively (such that the lowest numbered identifier indicates the block that was loaded first and the highest numbered identifier indicates the block that was loaded last). In another embodiment, a time stamp may be associated with each block, indicating the time (e.g., date and time of day) that each block was loaded into the receptacle.

It should further be noted that other methods of indicating a current relative positioning of the different blocks of products within a particular receptacle may be used. For example, the tabular representation 900 (or any product inventory database) may store a "vended" flag, indicating which blocks of products (or individual unit of product within a block) has been vended. Thus, in order to determine a current relative positioning of units of products within a particular receptacle of a vending machine, the unit of product with the lowest rank that is not yet vended may be determined to be the next product immediately available for vending, while the next lowest rank that is not yet vended may be determined to be the product available for vending after that and so on.

Referring now to FIG. 9B, illustrated therein is tabular representation 900 indicating a change in data (from the data of FIG. 9A) due to a vending of three products from receptacles of the vending machine. In particular, FIG. 9B illustrates the change in data due to a vending of one unit of product "Brand X Chocolate Bar" from receptacle A1, a vending of one unit of product "Brand Y Soda" from receptacle A2, and a vending of one unit of product "Brand Z Chips" from receptacle A3. Due to this vending, the number of units 915 and the current position rank 925 has been changed in each of records R900-1, R900-2 and R900-3 to indicate the updated inventory status.

Referring now to FIG. 10A, illustrated therein is an embodiment of a product inventory database 520 in the form of tabular representation 1000. The tabular representation 1000 of the product inventory database includes a number of example records or entries, each of which defines a unit of a product available for sale from a vending machine. Those skilled in the art will understand that the product inventory database may include any number of entries. The tabular representation 1000 of product inventory database 520 also defines fields for each of the entries or records. The fields specify: (i) a Row field 1005, (ii) a Column 1 field 1010, (iii) a Column 2 field 1015, (iv) a Column 3 field 1020, (v) a Column 4 field 1025, (vi) a Column 5 field 1030 and (vii) a Position field 1035.

Assume that the tabular representation 1000 stores product inventory data for a vending machine that includes a plurality of receptacles, the receptacles being arranged in four rows and five columns. Assume further that each receptacle includes three positions for holding products. Thus, tabular representation 1000 comprises a matrix including a cell for each position available within the vending machine, each cell of the matrix corresponding to a position in a particular row and column. Each cell of tabular representation 1000 stores an identifier of the product, if any, a unit of which is located in the position identified by the cell. For example, tabular representation stores an indication that "Position 1" of "Row 1", "Column 1" stores a unit of product "P-001-99".

A dash in a cell indicates that the position identified by the cell is currently empty.

As can be determined from the data in tabular representation 1000, a receptacle may include more than one product and units of a particular product may be located in more than one receptacle. For example, block of cells 1040 indicates that Row 1 of Column 3 includes one unit of product "P-555-43" and two units of product "P-919-00". Further, block of cells 1045 indicates that product "P-555-43" is also located in Row 1, Column 4. Similarly, block of cells 1050 indicates that Position 1 of Row 4, Column 3 stores a single unit of product "P-103-91". Block of cells 1055 indicates that product "P-103-91" is also located in each of Positions 2 and 3 of Row 4, Column 4, behind a unit of product "P-894-31". Blocks of cells 1040, 1045, 1050 and 1055 will each be referred to below in Section 4, for purposes of illustrating a use of the data in product inventory database 520 as embodied in tabular representation 1000.

Referring now to FIG. 10B, illustrated therein is tabular representation 1000, with data after a vending of product "P-555-43" from Position 1 of Row 1, Column 3. As can be seen, the two units of product "P-919-00" that were previously stored in Position 2 and Position 3, respectively, of Row 1, Column 3, are now stored in Position 1 and Position 2, respectively of Row 1, Column 3. Position 3 of Row 1, Column 3 is now empty.

Referring now to FIG. 11, illustrated therein is an embodiment of a product price database 525 in the form of tabular representation 1100. The tabular representation 1100 of the product price database includes a number of example records or entries, each of which defines a price of a product that may be for sale or may be made available for sale from a vending machine. Those skilled in the art will understand, upon reading the present disclosure, that the product price database may include any number of entries. The tabular representation 1100 of product price database 525 also defines fields for each of the entries or records. The fields specify: (i) a product identifier 1105 that identifies a product that is stored or potentially may be stored in a vending machine, and (ii) a price 1110 corresponding to the product.

The product price database may be accessed by a vending machine to, for example, determine a price to be displayed in association with a receptacle of the vending machine. For example, assume a unit of a first product is vended from the vending machine and, as a result, a unit of a second product is made available for vending. The vending machine may be operable access product price database 525 to determine the price associated with the second product by retrieving the appropriate record based on the product identifier. The vending machine may further be operable to determine whether the price associated with the second product is different from a current price associated with the receptacle from which the unit of the second product is now available for vending. If the price is not the same, the vending machine may be operable to change the price associated with the receptacle to be the price associated with the second product.

It should be noted that, in some embodiments, additional data may be stored in the product price database 525 (or a different table or database). Some examples of additional data that may be associated with a product includes (i) a cost of a product (i.e., the cost of the product to the operator of the vending machine); (ii) an expiration date of the product; (iii) a lowest acceptable price that the operator of the vending machine is willing to accept for the product; (iv) a discount at which the operator of the vending machine is willing to offer the product (and, in some embodiments, a rule indicating the circumstances under which the discount is to be applied); and/or (v) a sales rate (e.g., ideal, historical and/or current).

Referring now to FIG. 12, illustrated therein is an embodiment of a transaction database 530 in the form of tabular representation 1200. The tabular representation 1200 of the transaction database includes a number of example records or entries, each of which defines a transaction that has occurred at a vending machine. Those skilled in the art will understand that the transaction database may include any number of entries. The tabular representation 1200 of transaction database 530 also defines fields for each of the entries or records. The fields specify: (i) transaction identifier 1205 that uniquely identifies a transaction; (ii) a transaction time 1210 that indicates a time at which a transaction occurred (e.g., was initiated, payment was received, a product was vended, etc.); (iii) product(s) purchased 1215 during the transaction; (iv) an identifier of a receptacle 1220 from which the product(s) purchased were vended; and (v) a transaction total 1225.

It should be noted that, in one or more embodiments, the transaction database may store data regarding transactions at more than one vending machine. In such embodiments, the transaction database may further store additional information regarding the vending machine at which a transaction occurred (e.g., an identifier of the vending machine, a location of the vending machine, etc.).

In one embodiment, a new record in the transaction database is created upon the occurrence (e.g., initiation, completion or a time there-between) of a transaction at a vending machine. In one embodiment, the transaction database stores a record for transactions initiated but not completed at a vending machine (e.g., a customer may change his mind and request a refund, etc., thus not completing a transaction).

As described below, in one embodiment an offer may be output to a customer during a transaction. For example, an offer for a package of products and/or for an upsell product may be output to the customer. In such embodiments, an indication of an offer output and/or accepted during a transaction may be stored in the transaction database or another database. For example, an indication of whether an offer was output and/or accepted may be stored in the transaction database, along with an identifier of the offer that was output and/or accepted. The details (e.g., type of offer, product offered, price defined by offer, etc.) of the offer output and/or accepted may be stored in a different table, retrievable based on the offer identifier. In one embodiment, the details of the offer may be stored in the transaction database.

As described below, in one embodiment a customer may be enabled to provide an indication of a product desired by the customer that is not immediately available for vending. For example, a customer may desire a product stored in a receptacle of the vending machine but behind units of another product. In such an embodiment, the transaction database or another database may store an indication of the product indicated by the customer along with an indication of whether the customer obtained the product (e.g., whether the product was made available for vending and was vended for the customer).

It should be noted that any and all of the data in any of the databases discussed herein may be input to, or changed in, a database on a periodic or non-periodic basis. For example, data may be input to a product inventory database and/or a product pricing database by an operator of a vending machine at the time of restocking the vending machine or at another time. In another example, data in a product inventory database and/or a product pricing database may be updated at a time of restocking of the vending machine or at another time. Further, any and all of the data in any of the databases described herein may be input and/or updated remotely (e.g., via a computing device communicating over a communications network) and/or locally (e.g., by an operator using a keypad, touch-screen and/or barcode scanner). For example, in one embodiment at least some data may be input to, or updated in, a database via a communication port (e.g., a Universal Serial Bus (USB)) port of a vending machine or a peripheral device associated with a vending machine. For example, an operator of the vending machine may utilize a portable device on which the data is stored and download the data to the vending machine and/or peripheral device using a USB port connection (e.g., at a time of restocking the vending machine).

4. Methods of Utilizing Product Data

As described above, Applicants have recognized many novel methods that utilize data regarding product inventory in a vending machine and/or a relative positioning of a product within a vending machine, to facilitate sales at the vending machine. For example, in one embodiment a determination that a unit of a first product is located in a first position of a receptacle of a vending machine (e.g., is the next product immediately available for vending from the receptacle) may cause one or more subsequent determinations and/or events at the vending machine. For example, the event may be a change in an indicator of information associated with the receptacle. In a more particular example, an event may comprise a change in a price associated with the receptacle. In another more particular example, an event may comprise a change in an indicator (e.g., LED light) of an availability of the first product for inclusion in a package offer. In another embodiment, a determination that a unit of a second product is located within a receptacle of the vending machine but not currently available for immediate vending (e.g., the unit is not located in a first position of any receptacle) may cause one or more subsequent determinations and/or events. For example, a determination that no unit of a second product is available for immediate vending may cause a determination of whether one or more offers should be output to facilitate the second product being made available for immediate vending. FIGS. 13A and 13B through FIG. 16 illustrate some exemplary methods of utilizing product inventory and relative product positioning data, in accordance with some embodiments of the present invention.

In one embodiment, an advertisement or other promotion may be stored in a memory of the vending machine and/or a memory accessible to the vending machine. The advertisement or promotion may be associated with a particular product. Further, the output of the advertisement or promotion may be dependent on a positioning of the product within the vending machine. For example, in one embodiment an advertisement for a product may be output (e.g., via an LCD screen or other output device of the vending machine) when no unit of the product is located in a first position of a receptacle. For example, an operator of the vending machine or manufacturer of the product may find it desirable to advertise the product when it is not currently immediately available for vending, to promote awareness of the presence of the product within the vending machine even if no unit of the product is located in a first position of a receptacle. In another embodiment, an advertisement for a product may be output only if a unit of the product is located in a first position of a vending machine.

In one embodiment, a menu of products available for immediate vending (e.g., a menu on a touch-screen via which customers select products for purchase) may be updated based on which products are located in first positions of the receptacles of the vending machine. For example, the menu may be updated as appropriate to only display icons for the products units of which are currently located in first positions of the receptacles.

As described herein, in one or more embodiments the product inventory data available in accordance with embodiments of the present invention may be used to determine whether the vending of one or more units of product should be facilitated in some manner. For example, it may be determined that the vending of a first unit of product is a pre-condition to the vending of a second unit of product. In one embodiment, the first unit may be a unit of a first product while the second unit may be a unit of a second product. For example, units of a first product may be located in front of units of a second product in a given receptacle and thus "block" the units of the second product. Thus, the vending of the units of the first product is a pre-condition to the vending of a unit of the second product. A first unit of product that renders a second unit of product unavailable for immediate vending by obstructing the vending path (e.g., by being located in a position in front of the second unit of product) is referred to as a "blocking" product or unit of product herein. Similarly, the second unit of product that is unavailable for immediate vending due to obstruction by the first unit of product is referred to as a "blocked" product or unit of product herein.

In one or more embodiments of the present invention, product inventory data may be utilized to determine whether making one or more units of a blocked product available for immediate vending should be accelerated. Such an acceleration may be accomplished, for example, by promoting the vending of one or more units of a blocking product. For example, it may be determined whether a promotion for the blocking product should be output, in order to increase the rate of sale of units of the blocking product.

In one embodiment, a price for a blocked product may be raised if, for example, the blocked product is not available for immediate vending from another receptacle and/or a demand for the blocked product is greater than the demand for the blocking product. For example, a unit of a blocked product that is normally offered for sale for $0.75 may be offered to a customer for $1.00. The raise in the price may be implemented, for example, if it is determined that the blocking product is to be vended without being sold (e.g., by being vended into a locked compartment of the vending machine such as a designated partition of the delivery bin, designated to hold vended products that have not been sold to customers). The raise in price may be due to, for example, the foregone opportunity to sell the unit of the blocking product for the time being. Thus, in one embodiment, a customer may be enabled to purchase a blocked product by paying a premium for the blocking product.

Various variables may be utilized in determining whether the vending of a blocking product should be facilitated in an attempt to make the blocked product available for sale. In general, it may be determined whether it would be more advantageous to an operator of the vending machine for the blocked product to be available for immediate vending (at the current time or a future time) rather than the blocking product being available for immediate vending. If so, a promotion for the blocking product may be constructed and output, as described in detail below. For example, the blocking product may be offered at a discount, as a free bonus product, or as part of a package of products.

As described herein, whether it is advantageous to an operator of a vending machine to have a product available for immediate vending, or whether it is advantageous to an operator of a vending machine to promote the vending of a blocking product, may be based on various factors. Such factors include, for example:

(i) profitability of the blocked product and/or the blocking product,
(ii) a demand for the blocked product and/or the blocking product,
(iii) a rate of sale (e.g., an ideal product velocity and/or an actual product velocity) for the blocked product and/or the blocking product,
(iv) a current time and/or a time of the next expected refill of the vending machine,
(v) an expected rate of sale over a predetermined time for the blocked product and/or the blocking product,
(vi) an expiration date of the blocked product and/or the blocking product,
(vii) a customer's selection or indication of a desire to purchase the blocked product, and/or
(viii) an availability of the blocked product and/or the blocking product from receptacles other than the receptacle being considered.

In one illustrative example, with reference to elements 1050 and 1055 of FIG. 10A, assume that product "P-103-91" is selling at a higher than expected rate during a fill period (e.g., the actual product velocity is greater than the ideal product velocity). As illustrated in table 1000 of FIG. 10A, a unit of product "P-103-91" is located in Position 1 of Row 4, Column 3. Thus, this unit of product "P-103-91" is available for immediate vending. One of two additional units of product "P-103-91" is located in Positions 2 and 3, respectively, of Row 4, Column 3. However, these two units are blocked by a unit of product "P-894-31". It should be noted that units of product "P-103-91" are not located in any other positions of the vending machine in question, as illustrated in table 1000. In such a circumstance, a subroutine may be executed to determine whether the vending of the unit of product "P-894-31" should be facilitated in some manner, in order to make the units of product "P-103-91" located behind it available for vending sooner than they may be available absent the promotion. The subroutine may include, for example, determining a rate of sale of the blocking product (product "P-894-31"). For example, if the rate of sale of the blocking product is below a predetermined threshold (e.g., below the ideal product velocity for product "P-894-31" and/or below the actual product velocity of product "P-103-91"), then it may be determined that the vending of product "P-894-91" should be facilitated. In other words, it may be determined that sales of the blocking product(s) of the first receptacle should be promoted in order to decrease the likelihood of unavailability of the blocked product at the time that the units of the blocked product from the second receptacle are sold out.

A subroutine to determine whether a vending of a blocking product should be facilitated may be initiated, for example, when one or more predetermined conditions is satisfied by a state of product inventory of the vending machine. Examples of such predetermined conditions include, for example, that a product that is:

(i) currently selling at a rate above a predetermined rate (e.g., above an expected or predicted rate); and/or
(ii) a blocked product in another receptacle; and/or
(iii) sold out from a receptacle of a vending machine (e.g., the subroutine is launched when the last unit of the product is vended from the receptacle); and/or
(iv) close to being sold out from a receptacle of a vending machine (e.g., less than a predetermined number of units of the product remain in the receptacle); and/or
(v) expected to be sold out from a receptacle of a vending machine before another unit of the product is expected to become available for immediate vending from another receptacle (e.g., based on current rates of sale of the blocked product and/or the blocking product, based on outstanding subscriptions to the blocked product and/or the blocking product).

It should be noted that various data, referred to as Optimal Product Inventory Management (OPIM) data, which may be utilized in the determination of whether a vending of a product should be facilitated, may be accessible to a vending machine in accordance with embodiments of the present invention. Such data may be accessible, for example, by being stored in a memory of the vending machine, a memory of a peripheral device associated with the vending machine, an RFID tag, a memory of a controller in communication with the vending machine, a memory of a peripheral device controller, or a combination thereof. Such data may include, for example:

(i) an expected product velocity for a product available for sale within a vending machine,
(ii) an actual product velocity of a product available for sale within a vending machine,
(iii) a cost to the operator of the vending machine of a product available for sale within a vending machine,
(iv) a minimum acceptable price (or highest acceptable discount) for a product available for sale within a vending machine, and/or
(v) a profitability of a product to an operator of the vending machine.

A more detailed description of such data and how such data may be obtained and used, may be found in commonly-owned U.S. patent application Ser. No. 10/855,247 entitled "Method and Apparatus for Managing Vending Machine Offers", filed May 27, 2004 in the name of Walker et al., which was previously incorporated by reference herein for all purposes.

Figure 13A:
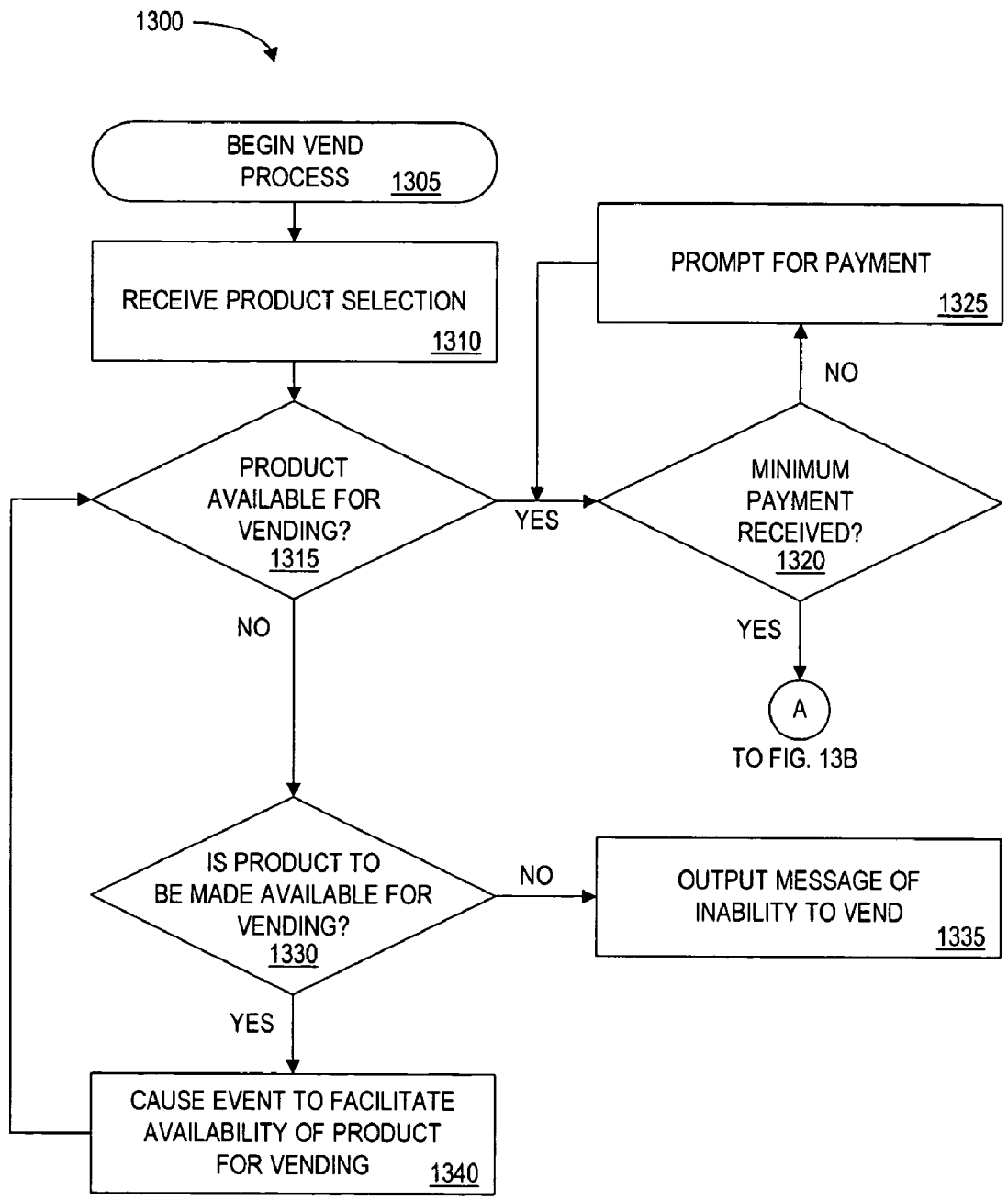
FIGS. 13A and 13B are a flow chart illustrating an exemplary process according to an embodiment of the present invention.
Figure 13B:
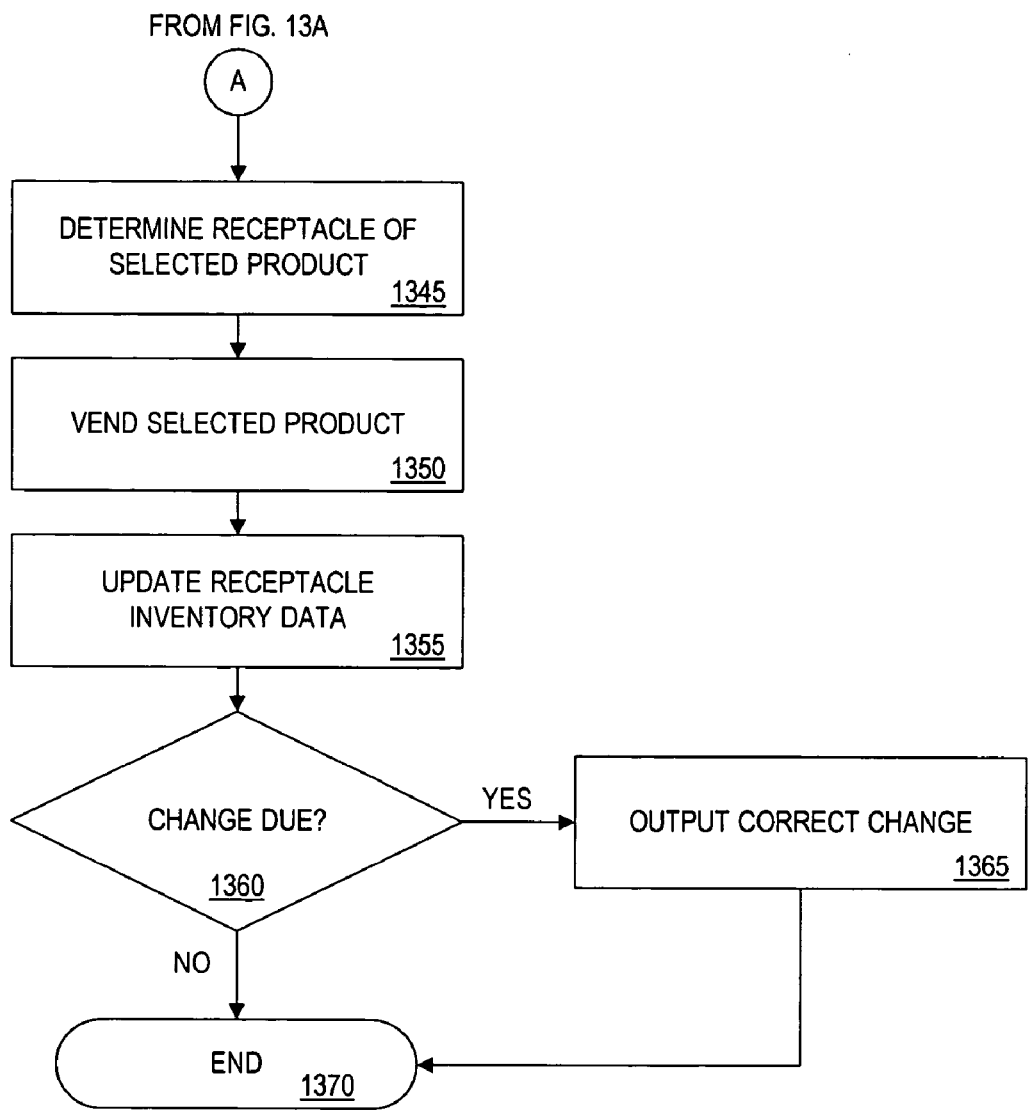

Referring now to FIGS. 13A and 13B, illustrated therein is a process 1300 for vending a product from a vending machine, in accordance with one or more embodiments of the present invention. Process 1300 initiates with step 1305, in which the vend process begins. Step 1305 may be triggered by, for example, an action of a customer of the vending machine. For example, a customer's input of payment into the vending machine (e.g., coins, bills, tokens, a code, an account identifier, a customer identifier, etc.) may trigger step 1305. In another example, a customer's indication of a desire for a product may trigger step 1305. In yet another process, a determination of a customer's proximity to the vending machine (e.g., via a motion detector) may trigger step 1305.

In step 1310, a selection of a product is received. For example, a customer may indicate an identifier of a receptacle, thus indicating a selection of the unit of the product which is next available for vending from the receptacle. In another example, a customer may indicate a desired product by selecting a representation of the desired product from a menu of choices. For example, a display screen or menu of bezels may be provided to the customer, the display screen or menu indicating various products available for sale from the vending machine. In one embodiment, a selection of a product may be received from a remote customer device (e.g., a personal computer communicating with the vending machine over a network). In one embodiment, a selection of a product may be received wirelessly (e.g., a portable device may transmit the selection via a wireless protocol such as Bluetooth™).

A determination of whether a unit of the selected product is available for immediate vending is performed in step 1315. For example, step 1315 may comprise determining whether a unit of the selected product is located in a first position of a receptacle of the vending machine. Such a determination may comprise, in one embodiment, querying a product inventory database based on an identifier associated with the selected product. The determination may further comprise determining whether any one of the positions in which units of the product are located is a first position of a receptacle. For example, a product inventory database may store an indication of which positions are first positions (e.g., the database may include a flag for each position that is a first position and/or a vending machine may be programmed to recognize a first position based on a format of the position identifiers).

If it is determined, in step 1315, that a unit of the selected product is available for immediate vending, the process continues to step 1320, in which it is determined whether the minimum payment required to purchase the selected product has been received. For example, it may be determined whether the amount of coins, bills or tokens provided by the customer is at least equal to the price of the selected product. In another example, it may be determined whether a code, account identifier or other identifier provided as payment is sufficient to cover the price of the selected product. If the minimum payment has been received, the process continues to step 1345 (FIG. 13B). Otherwise, the process continues to step 1325, in which a prompt for the required additional payment is output. For example, a message or other indication may be output. The message or other indication may inform the customer of the need for more payment, an additional amount of payment required and/or of the insufficiency of the payment already provided.

If, in step 1315, it is determined that a unit of the selected product is not available for immediate vending, the process continues to step 1330. In step 1330 it is determined whether a unit of the selected product is to be made available for vending. This determination may involve, for example, determining an identity of the one or more units of product that may be positioned in front of the selected product in a receptacle (e.g., by querying a product inventory database based on the position identifier(s)). In one embodiment, the determination may further involve determining whether the unit(s) of product located in front of the unit of the selected product may be offered as a package to the customer, the package including the unit of the selected product. In another embodiment, the determination may further involve determining whether the unit(s) of product located in front of the unit of the selected product may be offered as a free gift or bonus to the customer with the purchase of the unit of the selected product. In one or more embodiments, the determination of whether a unit of the selected product is to be made available for sale may be based on any or all of the OPIM data with respect to the selected product and any products blocking the selected product.

If, in step 1330, it is determined that a unit of the selected product is not to be made available for vending, the process 1300 continues to step 1335, in which an indication of the inability to vend a unit of the selected product is output. For example, a text or audio message may be output to a customer via one or more output devices of the vending machine or of a peripheral device.

If, in step 1330, it is determined that a unit of the selected product is to be made available for vending, the process continues to step 1340. In step 1340 an event to facilitate the availability of the unit of the selected product is caused. For example, step 1340 may comprise outputting an offer to the customer. The offer may comprise, for example, an offer for a package comprising a unit of the selected product and the unit(s) of other product located in front of the unit of the selected product, for a package price that is less than the sum of the retail prices of the products included in the package. In one embodiment, step 1340 may comprise vending of the unit of the selected product and the unit(s) of product located in front of the unit of the selected product. The vending may, in one embodiment, be accompanied by an output of a message that informs the customer that the unit(s) of product located in front of the unit of the selected product are being provided to the customer as a free bonus or gift, or that the customer has randomly won the unit(s) of product located in front of the unit of the selected product.

In one embodiment, causing an event to facilitate making a blocked product available for vending may comprise contacting an operator of the vending machine and informing the operator of the desirability of removing the blocking product from the receptacle. For example, a message (e.g., e-mail, pager message, etc.) may be output to the operator via a communication network. In one embodiment, the operator may be informed of the desirability of switching the units of the blocked product and the blocking product such that the blocked product becomes the blocking product.

The process then returns to step 1315, in which it is again determined whether a unit of the selected product is available for immediate vending. For example, if step 1340 comprised an output of an offer for a package of products, step 1315 may comprise determining whether the customer accepted the offer. In another example, if step 1340 comprised providing the unit(s) of product located in front of the unit of the selected product as a bonus, gift or prize, step 1315 may comprise determining whether the unit(s) or product have in fact been vended.

If it is determined, in step 1315, that a unit of the selected product is available for immediate vending, the process 1300 continues to step 1345 (FIG. 13B). In step 1345, the receptacle of the unit of the selected product to be vended is determined. In step 1350 the unit of the selected product is vended.

The receptacle inventory data is then updated, in step 1355, to reflect the vending of the unit of the selected product (and, if appropriate, the vending of the unit(s) of product that had been located in front of the vended unit of the selected product). For example, the product inventory database associated with the vending machine from which the unit(s) of product had been vended may be updated to reflect the new positioning of units of product as a result of the vending.

In one embodiment, a transaction database associated with the vending machine is also updated. For example, a new record may be created in the transaction database, the record storing data related to the vending of the unit of the selected product.

In step 1360 it is determined whether any change is due to the customer. For example, in an embodiment where a customer provided a code as payment for the selected product, determining whether any change is due may comprise determining whether any additional funds are associated with the code or a determination of whether a number of units remain available for purchase with the code. In an embodiment where a customer provided coins, bills and/or tokens as payment for the selected product, step 1360 may comprise determining whether the monetary amount represented by the coins, bills or tokens provided by the customer exceeds the payment required for the transaction.

If, in step 1360, it is determined that change is due, the process continues to step 1365. Otherwise, the process ends at step 1370.

In step 1365 the appropriate amount of change is provided to the customer. For example, an account associated with the customer may be credited. In another example, a new code may be output to the customer. In yet another example, coins, bills and/or tokens may be output to the customer. Once the appropriate amount of change is provided, the process ends at step 1370.

In one embodiment, a customer may be enabled to indicate a desire to purchase a product not available for immediate vending (e.g., a product no unit of which is located in a first position of any receptacle). In such an embodiment, an effort may be made to provide the product to the customer. For example, a package deal offer may be output to the customer, offering the customer a unit of the desired product along with any units of any blocking products for a package price. In another example, the customer may be enabled to provide contact information (e.g., an e-mail address). This contact information may be stored in association with the product identifier. The contact information may be utilized to inform the customer of the availability of the product once a unit of the product is available for immediate vending. In one embodiment, the unit of the desired product may be reserved for the customer for a predetermined period of time. For example, in one embodiment a code may be provided to the customer for which the unit of product is reserved. The customer may input the code into the vending machine in order to cause the unit to be vended.

Figure 14:
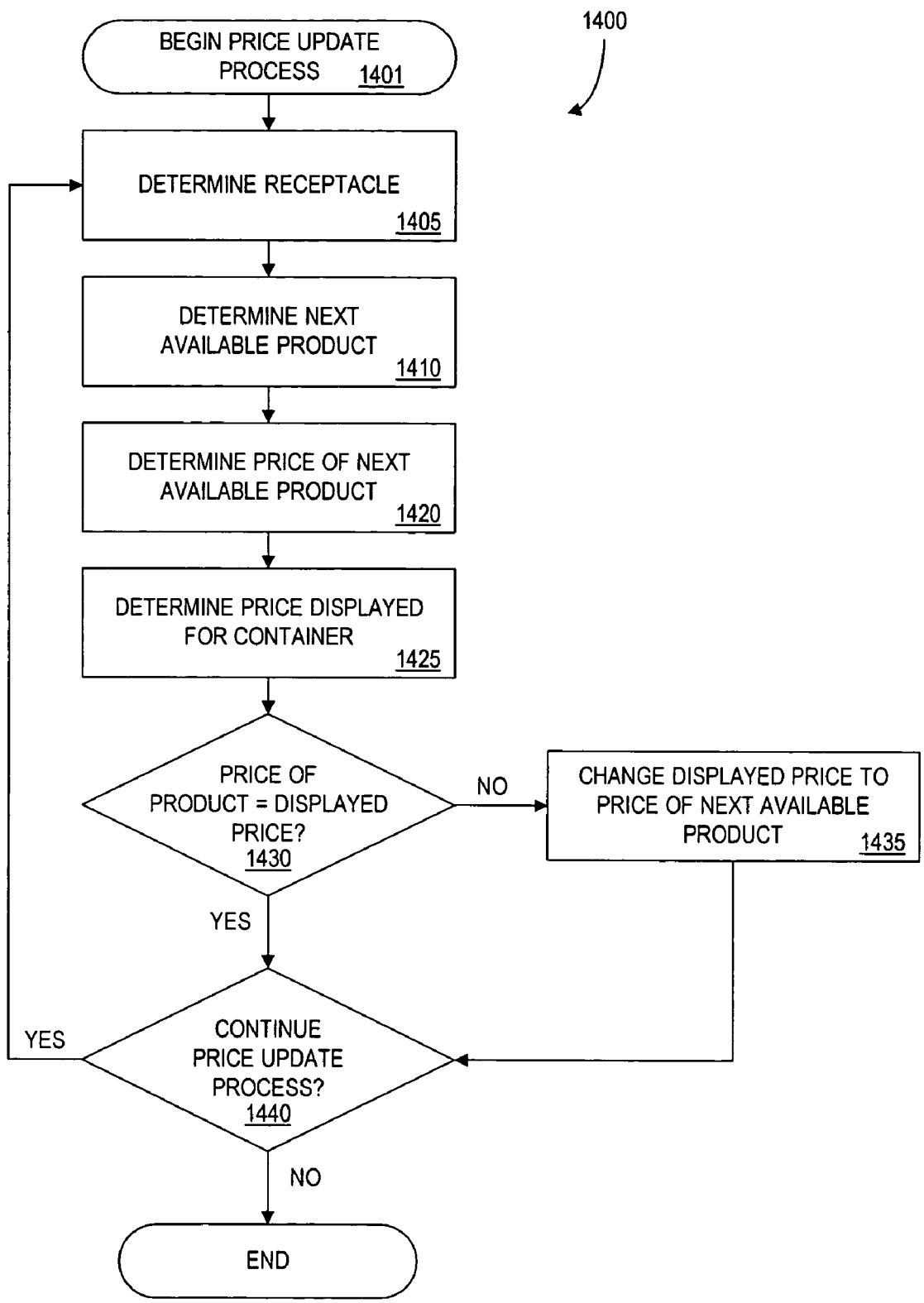
FIG. 14 is a flow chart illustrating an exemplary process according to an embodiment of the present invention.

Referring now to FIG. 14, illustrated therein is a process 1400 for updating an indicator associated with a receptacle of a vending machine. As described above, an indicator may comprise a message output via an output device of a vending machine or a peripheral device, indicating information to a customer of the vending machine. For example, an indicator may comprise an LED light that, depending on whether it is lit, informs the customer of the availability of a unit of a product for inclusion in a package of products (e.g., if the light is lit, the product is available). In another example, an indicator may comprise a price display (e.g., an LED display or LCD screen) that informs the customer of a price at which a unit of a product is being offered for sale. For purposes of illustrating the process 1400, the latter indicator will be used.

Process 1400 begins with step 1405. For example, a vending of a unit of a product may cause process 1400 to be initiated. In step 1410 a receptacle of the vending machine is determined. Step 1410 may comprise, for example, determining the receptacle of the vending machine from which a unit of a product was just vended. In another example, the process 1400 may be performed periodically or substantially continuously. In such an embodiment, the device performing process 1400 may perform the process 1400 for each receptacle of the vending machine in a certain order. Accordingly, step 1410 may comprise determining the next receptacle to be reviewed in the order programmed into the vending machine. Determining the receptacle may comprise determining the identifier of the receptacle.

In step 1415, the next product available for immediate vending from the receptacle is determined. For example, the identity of the product a unit of which is located in the first position of the receptacle may be determined. In one embodiment, a product inventory database may be queried for the identity of the product in the first position of the receptacle. In another embodiment, an RFID tag of the product in the first position may be communicated with to determine the identity of the product.

In step 1420 the price of the product available for immediate vending from the receptacle is determined. In one embodiment, a product price database may be accessed to determine the price associated with the product determined in step 1415. In another embodiment, a product inventory database may store a price for the product and thus the price may be retrieved from the product price database. In yet another embodiment, a product RFID tag may store a price for the product and thus the price may be determined by communicating with the RFID tag.

In step 1425 the price currently displayed as associated with the receptacle may be determined. For example, in one embodiment a vending machine may have access to a table of receptacles located within the vending machine and the respective price currently being displayed as associated with each receptacle. Such a table may be stored, for example, in a memory of the vending machine, a memory of a peripheral device and/or a memory of another device. Typically, the price displayed as associated with a receptacle is the price for the unit of the product currently located in the first position of the receptacle.

The price determined in step 1420 is then compared to the price determined in step 1425. If the price determined in step 1420 is the same as the price determined in step 1425, then no change in price is necessary or desired and the process continues to step 1440. If the price determined in step 1420 is different from the price determined in step 1425, the process continues to step 1435.

In step 1435 the price displayed as associated with the receptacle determined in step 1410 is changed to be the price determined in step 1420. For example, a memory of the vending machine may be updated to reflect this change. In one embodiment, the table of receptacles and associated prices (described with respect to step 1425) may be accessed and the record of the receptacle determined in step 1410 may be updated to reflect that the receptacle is currently associated with the price determined in step 1420. Step 1435 may further comprise changing the data being output via an output device associated with the receptacle, the output device outputting the current price associated with the receptacle. For example, in one embodiment each receptacle is associated with an LED display that outputs the price for the product next available for vending from the receptacle. In such an embodiment, step 1435 may comprise causing the LED display to display the price determined in step 1420.

Once the price for the receptacle is changed in step 1435, the process 1400 continues to step 1440, in which it is determined whether the price update process should continue. If, for example, the process 1400 had been initiated due to a vending of a unit of a product from a particular receptacle, it may be assumed that there is no further need to continue the price update process. If, in another example, the process 1400 is to be performed on a periodic basis for all receptacles in the vending machine, the step 1440 may comprise determining whether all receptacles had been updated and, if not, which receptacle should be evaluated next. If it is determined that the price update process should continue, the process 1400 returns to step 1410, in which step another receptacle is determined. If, on the other hand, it is determined that the price update process should not continue, then the process 1400 ends.

In one embodiment, a price is not displayed for a receptacle. Instead, the price is determined from memory in response to a customer's inquiry. For example, a device (e.g., vending machine) may receive a price inquiry for a particular receptacle. In response, the device may determine the unit of product currently stored in the first position of the receptacle. The device may then determine the price associated with the unit of product (e.g., by accessing the price database and based on an identifier of the product). Accordingly, the device may utilize product inventory data to determine an identity of a product a unit of which is currently stored in a first position of a receptacle identified by a customer and determine the price thereof. In such an embodiment, for example, step 1435 may comprise storing in a memory the price for the product next available for immediate vending. For example, in addition or in lieu of pricing information for products being stored in a price database, a vending machine may cache a price corresponding to a product or otherwise temporarily store the price (e.g., in RAM, volatile memory, flash memory, etc.).

Figure 15:
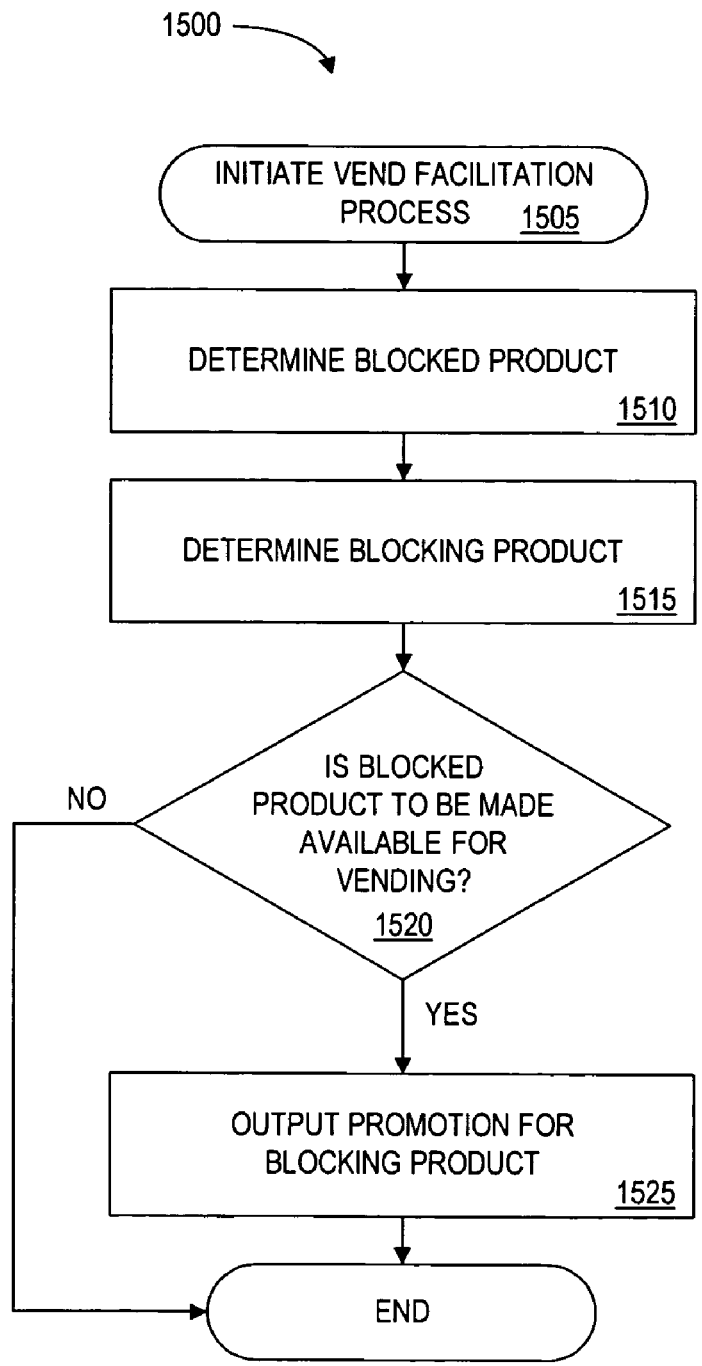
FIG. 15 is a flow chart illustrating an exemplary process according to an embodiment of the present invention.

Referring now to FIG. 15, illustrated therein is an exemplary process 1500 that utilizes product inventory data to cause an event to facilitate vending of a blocking product in an attempt to make a blocked product available for immediate vending (at the current time or a future time). Process 1500 begins with step 1505, in which the vend facilitation process is initiated. As described above, in one or more embodiments it may be determined that the vending of a blocking product should be facilitated in an attempt to make one or more units of a blocked product available for immediate vending. For example, it may be determined that a customer desires a unit of a blocked product and this determination may cause the vend facilitation process to be initiated. In another example, it may be determined that units of a product that is a blocked product in a first receptacle, while currently available for immediate vending from a second receptacle, are soon expected to be sold out from the second receptacle (e.g., based on a current rate of sales for the product). This is another example of a determination that may cause the vend facilitation process to be initiated. It should be noted that, in one embodiment, an occurrence of one or more of the predetermined conditions listed in the example immediately above may cause the vend facilitation process to be initiated.

In step 1510, the blocked product is determined. This may comprise, for example, identifying the units of the blocked product and the position(s) thereof. It may also comprise determining the receptacle in which the blocked product is located.

In step 1515, the blocking product is determined. This may comprise, for example, querying the product inventory database for the identity of any product that is located in the positions of the receptacle of the blocked product that are located in front of the positions in which the units of the blocked product are located.

In step 1520, it is determined whether an attempt should be made to accelerate the time at which the blocked product is available for immediate vending. In other words, it is determined whether the vending of the blocking product should be facilitated. This determination may comprise, for example, taking into account any and all of the OPIM data described above (e.g., rate of sale of the blocking product and/or the blocked product, profitability to the operator of the blocked product and/or the blocking product) as well as any additional data deemed appropriate. If it is determined that the vending of the blocking product should not be facilitated (e.g., because the current demand or product velocity for the blocking product is greater than the current demand or product velocity for the blocked product), the process ends. Otherwise, the process continues to step 1525.

In step 1525 a promotion for the blocking product is output. For example, an offer to sell the blocking product at a discount (e.g., a predetermined discount stored in memory) may be output. In another example, if there is only one unit of the blocking product in front of a unit of the blocked product, an offer for a package of the unit of the blocking product and a unit of the blocked product may be output. For example, the two units may be offered for a package price that is less than the sum of the retail prices of the individual units. A vending machine may have access to many different rules for determining what type of promotion should be output and for constructing a promotion instance. Commonly-owned U.S. Patent Application Serial No. (03-039), previously incorporated by reference herein, describes various methods of determining a type of promotion and of constructing a promotion instance.

It should be noted that, in one embodiment, a device other than the vending machine may determine whether to output a promotion for a blocking product, determine the promotion type, and/or construct the promotion instance. For example, a controller in communication with a vending machine (or a peripheral device associated with a vending machine) may perform any or all of these determinations. The vending machine may then, in one embodiment, be directed to perform one or more activities based on these determinations. For example, the vending machine may be directed to output a promotion instance, change a price associated with a receptacle of the vending machine, etc. It should further be noted that any of the determinations described herein may be performed by a device other than a vending machine, in addition to, in conjunction with, or instead of being performed by the vending machine.

Figure 16:
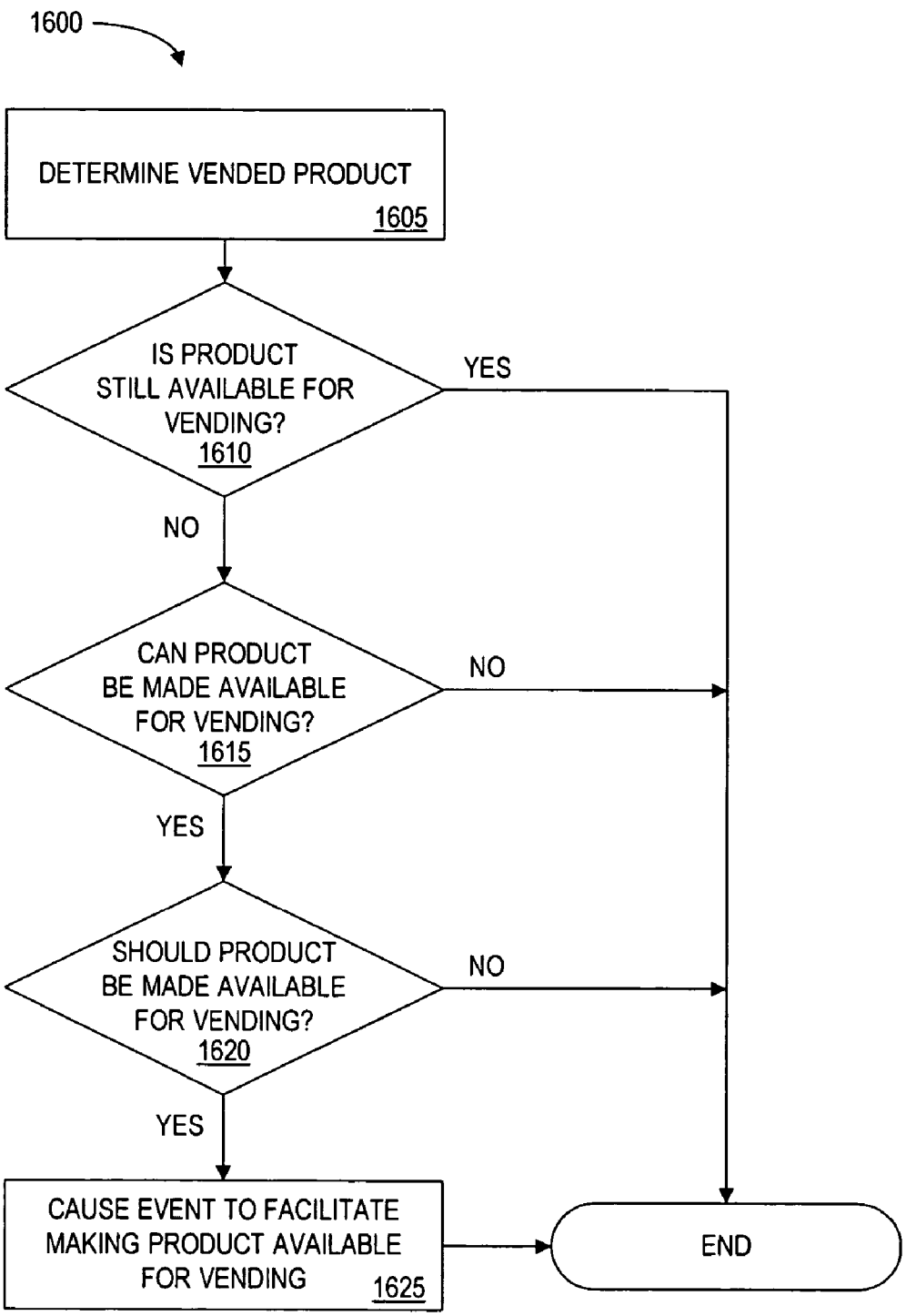
FIG. 16 is a flow chart illustrating an exemplary process according to an embodiment of the present invention.

Referring now to FIG. 16, illustrated therein is an example process 1600 that may be performed after each vending of a product from a vending machine. The process 1600 begins with step 1605, in which the vended product is determined. For example, a product identifier that identifies the vended product may be determined. A position and/or receptacle from which the product was vended may also be determined.

In step 1610 it is determined whether a minimum or predetermined number of units of the vended product are still available for immediate vending. For example, it may be determined whether a unit of the vended product is located in a first position of any receptacle of the vending machine. In one embodiment, it may further be determined whether a minimum number of additional units of the vended product are located in series behind the unit located in the first position. The determination of step 1610 may be performed by querying a product inventory database based on the product identifier determined in step 1605.

For example, referring to elements 1040 and 1045 of FIGS. 10A and 10B, assume that process 1600 is performed upon the vending of the unit of product "P-555-43" from Position 1 of Row 1, Column 3. Step 1610 may comprise determining whether a unit of product "P-555-43" is still available for immediate vending. A review of the example data in the table 1000 indicates that it is. A unit of product "P-555-43" is located in Position 1 of Row 1, Column 4.

Returning to process 1600, if it is determined in step 1610 that a unit of the vended product is still available for immediate vending, the process ends. If, on the other hand, it is determined that a unit of the vended product is not available for immediate vending, the process continues to step 1615.

In step 1615 it is determined whether a unit of the vended product can be made available for immediate vending (or whether an attempt to accelerate the time at which the unit will be available for immediate vending can be made). This determination may comprise, for example, determining whether a unit of the vended product is located in any position of the vending machine. Such a determination may be performed by querying a product inventory database based on the product identifier of the vended product. In one embodiment, the determination of step 1615 may comprise determining whether less than a predetermined or maximum number of units are blocking the unit of the vended product.

If it is determined, in step 1615, that a unit of the vended product can be made available, the process 1600 continues to step 1620. Otherwise, the process ends. In step 1620 it is determined whether a unit of the vended product should be made available for immediate vending (or whether an attempt should be made to accelerate a time at which a unit of the vended product will be available for immediate vending). In one embodiment, step 1620 may comprise determining whether a promotion for the blocking products that are positioned in front of the unit of the vended product should be output. This determination may be based on, for example, any or all of the OPIM data described above, or any other data deemed appropriate. For example, step 1620 may comprise determining whether it would be more profitable to an operator of the vending machine to promote the blocking product in an attempt to make the blocked product available for vending or whether it would be more profitable to the operator to sell the blocking product at the current or retail price.

If it is determined, in step 1620, that a unit of the vended product should be made available for vending, the process continues to step 1625. Otherwise, the process ends. In step

1625, an event to facilitate the making of the unit of the vended product available for immediate vending is caused. For example, a price of the blocking product may be reduced. In another example, the blocking product may be made available for inclusion in a package with a popular product. In yet another example, one or more units of the blocking product may be provided to a customer as a bonus, gift or prize. In yet another example, one or more units of the blocking product may simply be vended. In yet another example, one or more units of the blocking product may be vended into a designated compartment of the vending machine (e.g., a locked compartment that is accessible only to the operator of the vending machine and/or only to a customer having a code allowing access to the compartment).

It should be noted that some of the processes described herein comprise a subroutine that utilizes product inventory information in response to an event initiated by a customer (e.g., an indication that a customer desires to purchase a particular product, a vending of a unit of a product, etc.). Other processes, however, utilize product inventory data and OPIM data in a proactive manner (i.e., in anticipation of expected future needs) and not necessarily in response to a specific event. For example, process 1500 (FIG. 15) is a process that may be performed on a periodic, non-periodic or continuous basis and need not be triggered by a particular event at the vending machine. In another example, a process may entails a continuous, periodic or non-periodic evaluation of OPIM data for products available for sale from a vending machine and utilization of the data to determine whether an event to facilitate vending of one or more products should be initiated. Accordingly, a subroutine may be utilized to promote sales of a blocking product in order to accelerate the time at which a unit of a blocked product is available for immediate vending, even when a unit of the blocked product is currently available for immediate vending from a second receptacle. For example, it may be determined that sales of the blocking product(s) of the first receptacle should be promoted in order to decrease the likelihood of unavailability of the blocked product at the time that the units of the blocked product from the second receptacle are sold out.

It should be noted that various specific uses of the product inventory information have been described herein. However, the scope of the present invention is not limited to the uses explicitly described. A person of ordinary skill in the art, upon reading the present disclosure, will recognize other uses of product inventory data that are within the spirit and scope of the invention.

For example, because conventional vending machines do not have access to product inventory information as described herein, the conventional vending machines continue to attempt to vend a product from a receptacle even when there is no inventory in the receptacle if a customer selects the receptacle. For example, assume a conventional vending machine having a helix dispensing mechanism has dispensed all the products from row "A1" such that row "A1" is currently empty. A customer approaching the vending machine may visually recognize that row "A1" is empty and thus not attempt to purchase a product therefrom. However, the conventional vending machine has no means of determining that row "A1" is empty. The conventional vending machine simply attempts to vend a unit of product from whichever row a customer identifies. Thus, if the customer were to input payment and identify row "A1" as the row from which a unit of product should be vended, the conventional vending machine will initiate the motor of the helix of row "A1" in an attempt to vend a unit of product therefrom. For example, a customer may intend to purchase a product from row "A2" but inadvertently identify row "A1" to the machine (e.g., by actuating the inappropriate keys on a keypad of the vending machine). This may result in frustration to the customer. For example, the vending machine may initiate the motor of the helix of row "A1", accept the customer's payment, and have no manner of determining that no unit of product was in fact output to the customer. This unsuccessful attempt to vend a product from an empty row also results in unnecessary wear and tear on the dispensing mechanism of the vending machine and usage of the vending machine's resources (e.g., processing power, electricity). The product inventory information described herein, if accessible to a vending machine, would allow the vending machine to effectively or actually "turn off" a receptacle (e.g., make it unavailable for vending until it is restocked with product), thus avoiding the disadvantages described above.

5. Methods of Inputting Product Data

Various means may be employed for providing product data to a memory accessible to a vending machine in accordance with embodiments of the present invention. In one embodiment, an operator of a vending machine may locally input the data using an input device of the vending machine at a time of servicing the vending machine. For example, an operator may use a keypad, touch-screen, bar code scanner or USB port to input the information to the vending machine while the operator is servicing the vending machine. In another embodiment, the product inventory data may be communicated remotely to the vending machine (e.g., downloaded over a communication network) from another device such as a controller, peripheral device, peripheral device controller, another device, or a combination thereof.

Figure 17:
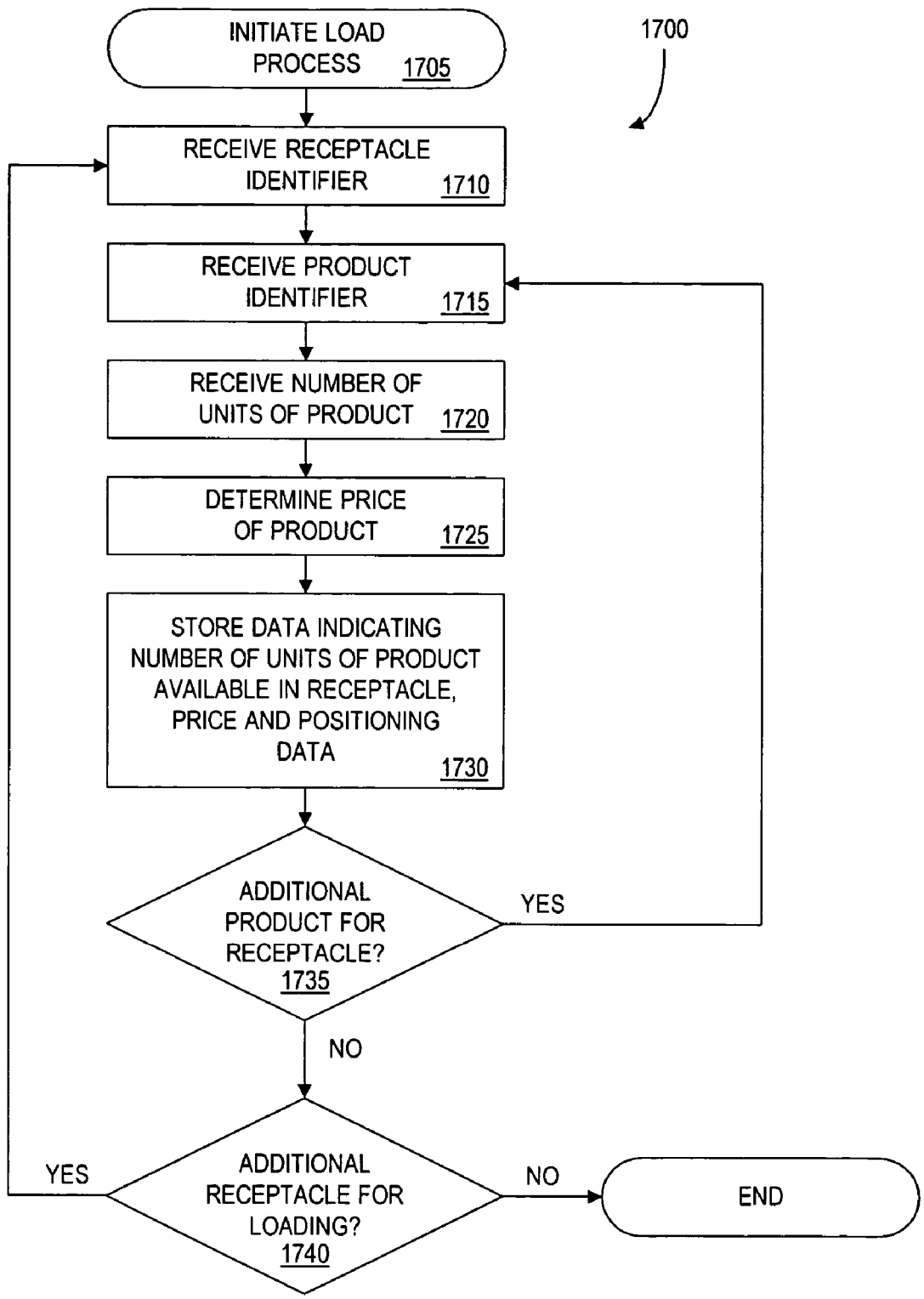
FIG. 17 is a flow chart illustrating an exemplary process according to an embodiment of the present invention.

Referring now to FIG. 17, a process 1700 illustrates an exemplary process via which product inventory information may be provided to a memory accessible to a vending machine. Process 1700 begins with step 1705, in which the load process is initiated. Step 1705 may be performed in response to an indication from an operator of a vending machine (e.g., the operator may open a service door of the vending machine, input a code (e.g., a bar code) that initializes the process, etc.). In another embodiment, step 1705 may be performed in response to receiving an electronic communication from a device. For example, a device may communicate product inventory information via a network or the product inventory information may be downloaded via a USB port from a portable device of the operator.

In step 1710, a receptacle identifier is received. In one embodiment, an operator of a vending machine may scan a bar code associated with the receptacle, thus indicating the receptacle identifier. For example, each receptacle may have a bar code affixed thereto, the bar code encoding a unique identifier of the receptacle. In another embodiment, an operator manual may include a bar code for each receptacle and the operator may scan the appropriate bar code to indicate the receptacle the operator desires to input product inventory information for. The example Operator Manual, provided below in Section 7, illustrates examples of bar codes usable for such a purpose. In another embodiment, step 1710 may comprise determining an identifier of a receptacle which is currently being loaded with products or otherwise updated, without an explicit provision of a receptacle identifier. For example, a vending machine may sense that a receptacle has been removed or repositioned or has had a unit of a product placed therein and determine the receptacle identifier thereof. In yet another embodiment, an operator may indicate a receptacle identifier via another input device (e.g., a keypad, a touch-screen, a microphone, etc.).

In step 1715, a product identifier is received. The product identifier may comprise, for example, a Universal Product Code (UPC), a description of the product, a brand name or trademark name of the product, and/or another type of identifier that uniquely identifies a product. In one embodiment, receiving a product identifier comprises receiving a bar code scanned by a bar code reader associated with the vending machine. The bar code reader may comprise, for example, a hand-held bar code scanner operated by the operator. In another embodiment, receiving a product identifier comprises receiving a typed-in product identifier that is input via a keypad or touch-screen of the vending machine. In another embodiment, receiving a product identifier comprises reading the information of an RFID tag of a unit of product input to the vending machine.

In step 1720 a number of units of the product identified in step 1715 is received. In one embodiment, an operator may scan a bar code representing the number of units being loaded into the receptacle (e.g., as illustrated in the exemplary Operator Manual described below in Section 8). In another embodiment, an operator may input a number of units using a keypad, touch-screen or microphone of a vending machine. In yet another embodiment, the receptacle may be equipped with one or more sensors for detecting units of product positioned in the receptacle. For example, a vending machine may be equipped with one or more pressure sensors or optical sensors (e.g., for each position of the receptacle) and may thus determine the number of units based on the data gathered by such sensors. In yet another embodiment, the number of units may be determined based on the RFID tags of the units of products loaded into the machine.

It should be noted that, in one embodiment, a vending machine may be equipped with a bar code scanner for each receptacle of the vending machine. In such an embodiment, the bar code of each unit of product may be automatically read by the bar code reader as the unit is being placed into the vending machine. Thus, the vending machine may determine the product identifier, number of units, and order of loading of each unit by scanning and tracking the bar codes of the loaded units.

In step 1725, the price of the product identified in step 1715 (and thus the price for each unit of the product, in accordance with one or more embodiments) is determined. In one embodiment, the operator may input the price for the product (e.g., by scanning a bar code, typing in the price via a keypad or touch-screen, speaking the price, etc.). In another embodiment, the price may be determined from a price database based on the product identifier received in step 1715. The price may be input to the price database or otherwise determined at a different time than during the execution of process 1700.

In step 1730, the data determined in steps 1710 through 1725 is stored in a product inventory database. In one embodiment, if a price was received in step 1725, the price may be stored in a price database in addition to or instead of being stored in a product database.

In step 1735, it is determined whether an additional product is being loaded into the receptacle identified in step 1710. For example, it may be determined whether an identifier of another product has been input, before an identifier of another receptacle has been input. In one embodiment, the operator may be queried as to whether another product is to be loaded into the receptacle. In one embodiment, if an identifier of another product is received before an identifier of another receptacle is received, the operator may be asked to confirm that the next product is being loaded into the same receptacle. In one embodiment, the operator may be required to input a receptacle identifier in conjunction with each product identifier. Thus, if the operator is loading another product into the same receptacle, the operator may simply provide the same receptacle identifier as was provided for the previous product. If it is determined that an additional product is being loaded into the receptacle, the process returns to step 1715, in which another product identifier is received. Otherwise, the process continues to step 1740.

In step 1740 it is determined whether an additional receptacle is being loaded with products (or whether product inventory information is being updated for another receptacle). For example, an identifier of another receptacle may be received. In one embodiment, an operator may be queried as to whether product inventory information is to be loaded and/or updated for another receptacle. If it is determined that another receptacle is being loaded and/or updated, the process returns to step 1710, in which a receptacle identifier is received. Otherwise, the process ends.

It should be noted that, although the product inventory information is described with respect to process 1700 as being received a portion at a time (e.g., a receptacle identifier, then a product identifier, then a number of units of product), the various product inventory data may be received substantially simultaneously. For example, a product inventory table storing the appropriate information may be downloaded to the vending machine.

In one embodiment, product inventory information may be transmitted electronically to a vending machine or a peripheral device of a vending machine. For example, the product inventory information may be downloaded to a memory accessible to the vending machine via a communication network. For example, the information may be downloaded from a remote controller, such as controller 605 and/or peripheral device controller 660. In another embodiment, the information may be downloaded from a portable device of the operator via a communication port of the vending machine or a peripheral device of the vending machine (e.g., via a USB port).

In an embodiment in which product inventory information is transmitted electronically, an operator of the vending machine may be provided with a printed version of the product inventory information. For example, the printed version may include the number of units of each product to be loaded into the vending machine or that is stored in the vending machine and/or the location of the units (e.g., five units of a first product are to be loaded into the first five positions of a first identified receptacle, and five units of a second product are to be loaded into the last five positions of a second identified receptacle). In another embodiment, the vending machine or peripheral device of the vending machine may prompt the operator as to how to load the vending machine. For example, based on the product inventory information received electronically, the operator may be prompted via an output device such as an LCD screen to load, for each receptacle, a particular number units of respective particular products and the relative positioning of the products (e.g., to load five "Diet Pepsi™ cans into the first five positions of tray A1, five "Caffeine Free Pepsi™" cans into the last five positions of tray A2, ten cans of Canada Dry™ Ginger Ale into tray A3, etc.).

Further, in either the embodiment of process 1700 or the embodiments in which the product inventory data is transmitted electronically, the operator of the vending machine may be requested to confirm that the stored product inventory information matches the actual inventory of the vending machine. For example, such a confirmation request may be output to the operator at the end of the loading process (e.g., once the operator indicates that the loading of the vending machine is complete). For example, the operator may be requested to confirm, for each receptacle, (i) the products stored in the receptacle, (ii) the number of units of each such product, (iii) the relative positioning of the units of each such product (e.g., the units of a first product are located in front of the units of a second product) and/or (iv) the specific position each individual unit of product is located in. In one embodiment, a touch-screen of the vending machine may output confirmation queries for each receptacle. In another embodiment, audio prompts may be output to the operator.

Figure 18:
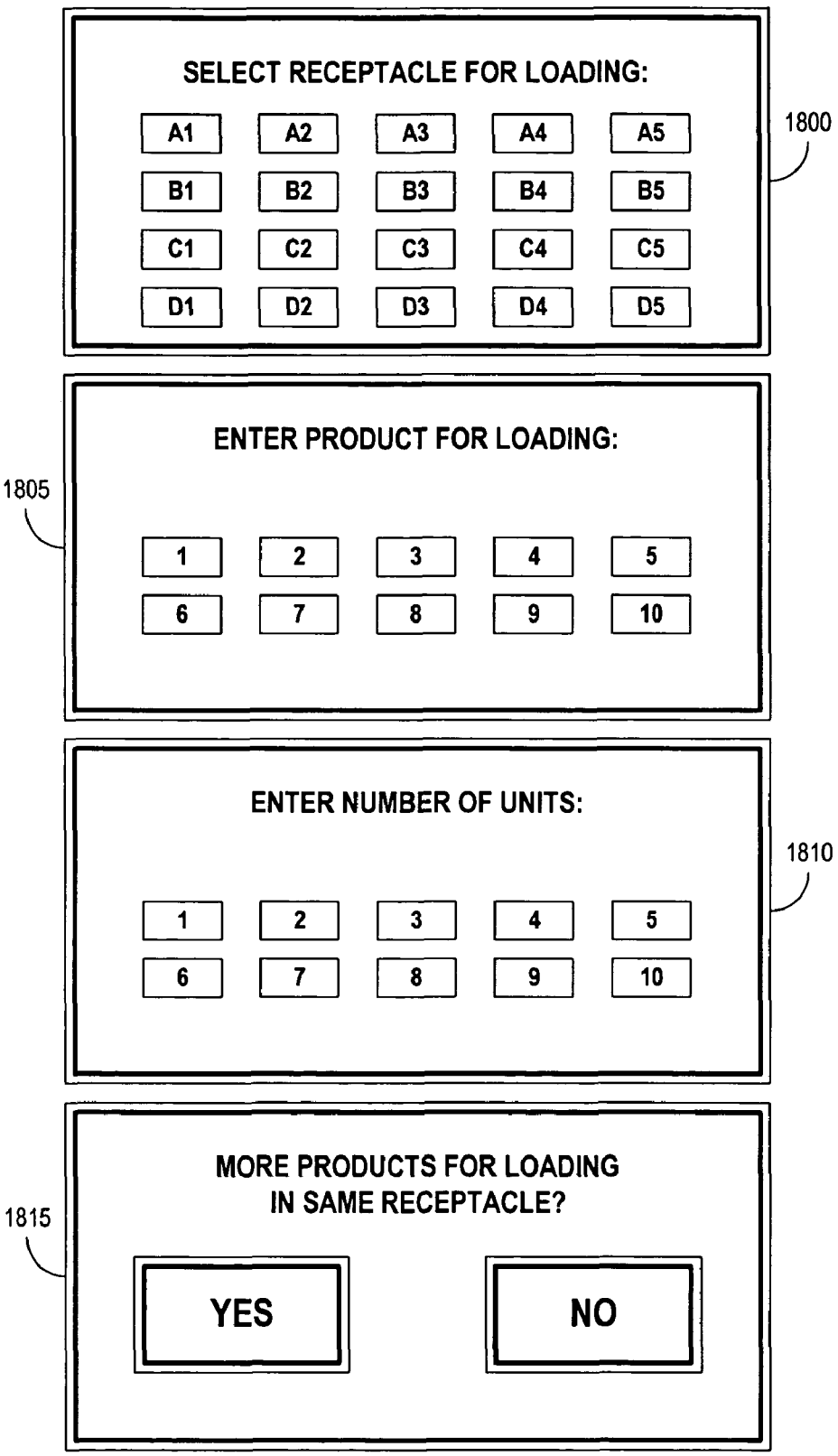
FIG. 18 is a drawing illustrating an example of various display screens that may be displayed to an operator of a vending machine, in accordance with one embodiment.

Referring now to FIG. 18, illustrated therein are various display screens 1800 through 1815 that may be displayed to an operator of a vending machine, in accordance with one embodiment. The various display screens may be displayed, for example, sequentially to an operator, to prompt the operator to provide the information received in process 1700. Of course, many other formats and methods for prompting an operator for appropriate information may be used.

In one or more embodiments, loading of a product into a receptacle of a vending machine may be rejected, prevented, and/or a warning against the loading of the product may be output to an operator. For example, some vending machine operators enter agreements with product manufacturers/bottlers (e.g., Coca-Cola™) whereby operators receive free or discounted machines from the product manufacturer/bottler provided the operator only stock the manufacturer's brand(s). For example, Coca-Cola™ may provide to a local operator a vending machine so long as he stocks only Coca-Cola™ products (e.g., Coke™, Sprite™, etc.). Product manufacturers heretofore have limited means to monitor the operators' adherence to such agreements. Prior to the present invention, a manufacturer attempted to verify adherence to such an agreement by paying personnel to visit and visually check the inventory of vending machines subject to such an agreement.

In one embodiment of the present invention, a vending machine may be programmed to only accept products of a particular manufacturer and/or to output a warning or message informing an operator of a violation of an agreement with the manufacturer if an operator loads or attempts to load a product of a competing manufacturer. Further, in one embodiment, if a product in violation of an agreement with a manufacturer is loaded into a vending machine, attempted to be loaded into a vending machine, and/or dispensed from the vending machine, an indication of such a violation may be stored and/or transmitted to the manufacturer.

For example, in one embodiment, a product's RFID signals are read to determine the manufacturer of the product. In another embodiment, manufacturer-specific bar codes must be read and authorized by the vending machine.

If stocking the manufacturer's product is a violation of an agreement, as stored in a memory accessible to the vending machine, the vending machine may be programmed to perform one or more actions. For example, the vending machine may be programmed to shut down or otherwise reject the sale of the violating product. In another example, the vending machine may be programmed to store and/or transmit an indication of the loading or attempted loading of the violating product to a predetermined entity (e.g., a server associated with the manufacturer that provided the vending machine to the operator).

6. Load Data

Provided below is one example of how data describing the units of product stored in available receptacles of a vending machine may be stored, and the type of data that may be stored for each receptacle (referred to as a "slot" for purposes of the data below). It should be noted that although the data is provided in Extensible Markup Language (XML) format, any format may be used.

7. Example Operator Manual

Figure 19A:
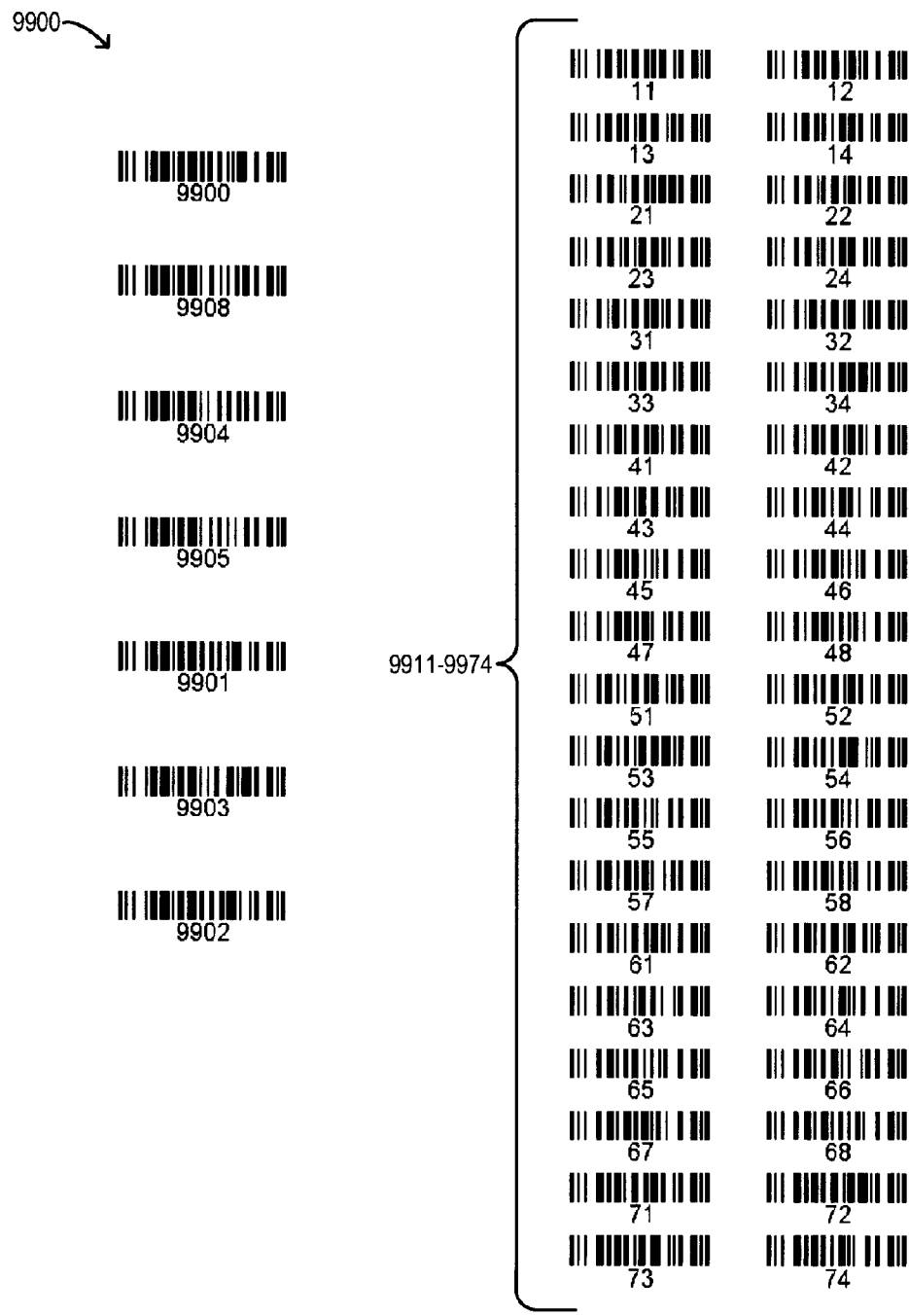
FIG. 19A and FIG. 19B are diagrams of example barcodes according to some embodiments.
Figure 19B:
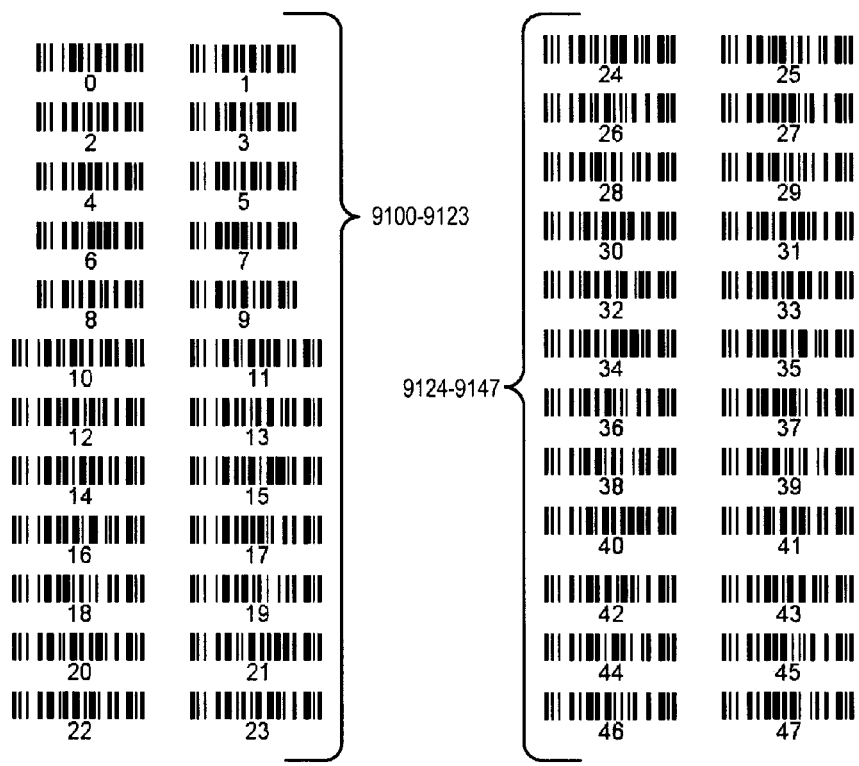

Provided below are example representations of an exemplary Operator Manual, which may be used by an operator to input product inventory information to a vending machine, in accordance with some embodiments of the present invention. It should be noted that the excerpts from the exemplary Operator Manual make extensive use of bar codes 9100, 9900 (See FIG. 19A-B; where the barcodes 9100, 9900 are referenced and also depicted as numerals enclosed in less than and greater than signs/brackets—e.g., in the place they may appear within the exemplary Operator Manual) that may be scanned by the operator to convey information to the vending machine. It should be understood that bar codes 9100, 9900 are just one means via which information may be communicated to a vending machine or a device associated with a vending machine (e.g., a peripheral device associated with the vending machine):

| Chapter 1: Taking Post-Inventory Once you completed restocking the machine, it is time to update the system with post-inventory counts. Required Steps | |
|---|---|
| Step # | Description |
| 1 | Scan the "Post-Inventory" bar code 9900 to start <9900> |
| 2 | Scan the first location you wish to count |
| 3 | Scan the product |
| 4 | Scan the count Tip: If one location has more than one product, you can enter the same location again. |
| 5 | When finished with entering the new counts of all locations that were restocked, scan the "Restock" bar code 9908 below to complete the process. <9908> Then, scan the "restart" bar code 9904 below to restart the system <9904> When prompted, scan the "Confirm" bar code 9905 below to confirm <9905> |

| Chapter 2: If you make mistakes | |
|---|---|
| Type One | If you make a mistake, you can undo the last transaction by scanning the "Undo" bar code 9901 below. <9901> |
| Type Two | If you wish to go back to a location you just counted and redo it, scan the "Redo" bar code 9903 below. <9903> The system will ask you for the location and the correct count |
| Type Three | If you wish to undo everything you did so far and start over, scan the "Undo All" bar code 9902 below. <9902> |

| Chapter 3: Downloading Data You can download reporting data through the USB Jump Drive. Steps | |
|---|---|
| Step # | Description |
| 1 | Insert the device to the USB port |
| 2 | Remove the device once the system alerts that copying is completed |

| Index 1: Location Bar Codes | |
|---|---|
| <9911> | <9912> |
| <9913> | <9914> |
| <9921> | <9922> |
| <9923> | <9924> |
| <9931> | <9932> |
| <9933> | <9934> |
| <9941> | <9942> |
| <9943> | <9944> |
| <9945> | <9946> |
| <9947> | <9948> |

| | |
|---|---|
| <9951> | <9952> |
| <9953> | <9954> |
| <9955> | <9956> |
| <9957> | <9958> |
| <9961> | <9962> |
| <9963> | <9964> |
| <9965> | <9966> |
| <9967> | <9968> |
| <9971> | <9972> |
| <9973> | <9974> |

Index 2: Number Bar Codes

| | |
|---|---|
| <9100> | <9101> |
| <9102> | <9103> |
| <9104> | <9105> |
| <9106> | <9107> |
| <9108> | <9109> |
| <9110> | <9111> |
| <9112> | <9113> |
| <9114> | <9115> |
| <9116> | <9117> |
| <9118> | <9119> |
| <9120> | <9121> |
| <9122> | <9123> |
| <9124> | <9125> |
| <9126> | <9127> |
| <9128> | <9129> |
| <9130> | <9131> |
| <9132> | <9133> |
| <9134> | <9135> |
| <9136> | <9137> |
| <9138> | <9139> |
| <9140> | <9141> |
| <9142> | <9143> |
| <9144> | <9145> |
| <9146> | <9147> |

Use Case

Provided below is an example "use case" description for an operator restocking of a vending machine in accordance with some embodiments of the present invention. As would be readily understood by one of ordinary skill in the art, a use case is a "Unified Modeling Language" graphic or text-based description of the behavior/functionality of software application. Use cases are well known tools which help set forth the requirements for the application.

Use Case: Operator Restocks Vending Machine

Actor(s)
 Driver

| | |
|---|---|
| Activity 1 | Operator Takes Pre-Inventory |
| Stimulus | The operator opens the door |
| Variant 1 | Basic |
| Pre-condition | 1. Price display screen for every location is flashing with a number that indicates the inventory count according to the database. |
| Dialog | 1. Actor observes each location to see if there are any locations that have a count discrepancy between what's physically in the location and what's displaying.<br>2. Actor confirms that all counts are accurate |
| Post-condition | 1. Driver is ready to restock the machine |
| Variant 2 | There are locations with discrepancies |
| Pre-condition | 1. Actor has reviewed the counts and confirms that there are locations with count discrepancies. |
| Dialog | 1. Actor scans "Pre-Inventory" barcode<br>2. Display reads "Enter location"<br>3. Actor scans the location that has discrepancy<br>4. Display reads "Enter product"<br>5. Actor scans the item that has discrepant count<br>6. Display reads "Enter correct count"<br>7. Actor enters the count of the product that is actually in the location<br>8. Display reads "Enter Location" |
| Post-condition | 1. Driver is ready to enter the next location<br>2. Driver is ready to end the Pre-Inventory menu |
| Variant 3 | Driver ends "Pre-Inventory" |
| Dialog | 1. Actor scans "End Pre-Inventory" barcode<br>2. Display reads "OK" |
| Activity 2 | Operator fills the machine with stock |
| Description | This is an off-line activity that does not require interaction with the system. |
| Activity 3 | Operator Takes Post-Inventory |
| Stimulus | The operator opens the door |
| Variant 1 | Basic |
| Pre-condition | 1. Driver has completed restocking the entire machine and is ready to confirm the counts. |
| Dialog | 1. Driver scans the "Post-inventory" barcode<br>2. Display reads "Enter location"<br>3. Actor scans the location he wants to service<br>4. Display reads "Enter product"<br>5. Actor scans the product he wants to add to this location<br>6. Display reads "Ending count"<br>7. Actor enters the total count of the product in the location<br>8. Display reads "Enter Location" |
| Post-condition | 1. Driver is ready to service another location (scanning another location). Note: If the Actor wishes to add a different product to same location, he can do so by scanning the same location again. Assumption is that the order of product will be based on the order of the scan. That is, if product A is scanned and added before product B, that means product A is in front of product B. |
| Variant 2 | Exception Path - Product Not Found |
| Pre-condition | 1. The operator has scanned "Fill" barcode<br>2. The operator has a "New Product Scan Sheet" available |
| Dialog | 1. Display reads "Enter location"<br>2. Actor scans the location he wants to service<br>3. Display reads "Enter product"<br>4. Actor scans the product he wants to move from this location<br>5. Display reads "Product Not Found. Scan the Product Again"<br>6. Actor scans the product<br>7. Display reads "Scan the product description sheet"<br>8. Actor scans the product description from the "New Product Scan Sheet"<br>9. Display reads "Ending count"<br>10. Actor enters the total count of the product in the location |
| Post-condition | 1. New product is added to the database<br>2. Driver is ready to service another location |
| Variant 3 | Driver ends "Post-Inventory" |
| Dialog | 1. Actor scans "End Post-Inventory" barcode<br>2. Display reads "OK" |

9. Conclusion

As has been described herein, Applicants have invented many novel methods of using detailed product inventory data in a vending machine. At least some of these methods may be carried out more efficiently by providing to a vending machine access to information regarding product inventory of the vending machine. Such information may include, for example, a number of units of each product stored in a receptacle of the vending machine, a relative positioning of one product to another (e.g., an order in which the products or units of products were loaded) and/or the particular position of each individual unit of product within the vending machine or within a receptacle of the vending machine. Prior to Applicants inventions, no need or use had been recognized for such information and such information was not stored. Applicants, however, by recognizing some of the novel methods of promoting sales at a vending machine described herein, recognized a need and various uses for such product inventory information. Accordingly, a vending machine in accordance with embodiments of the present invention has access to product inventory information and may utilize such information to promote sales at the vending machine. Additionally, the vending machine is operable to receive such information and/or to access such information from another device (e.g., from a memory of a peripheral device, from a memory of an RFID tag of a product, and/or from a memory of a controller).

What is claimed is:

1. A method, comprising:
storing, in a memory of a vending machine, an indication of a first price and an indication of a second price associated with a single receptacle of the vending machine, the receptacle being operable to store a plurality of units of products,
wherein the indication of the first price comprises an indication that a unit of product next available for vending from the receptacle is available for inclusion in a package of products,
wherein the indication of the second price comprises an indication that a unit of product next available for vending from the receptacle is not available for inclusion in a package of products, and
wherein only one of the indication of the first price and the indication of the second price is active at a time; and
storing, in the memory of the vending machine, a rule for determining which one of the indication of first price and the indication of the second price is to be active, the rule being a rule based at least on inventory data of the vending machine.

2. The method of claim 1, wherein
the indication of the first price comprises a first monetary amount required for purchase of a unit of product next available for vending from the receptacle, and
the indication of the second price comprises a second monetary amount required for purchase of a unit of product next available for vending from the receptacle.

3. The method of claim 1, wherein the rule comprises a rule based on an inventory status of the receptacle.

4. A method for obtaining a product from a vending machine, comprising:
determining, by execution of stored programming instructions by a processing device of the vending machine and for a receptacle of the vending machine, a first product that is a product next available for vending from the receptacle;
determining, by execution of the stored programming instructions by the processing device of the vending machine and for the receptacle, a second product stored in the receptacle, the second product being stored behind the first product and thus not being next available for vending from the receptacle;
determining, by execution of the stored programming instructions by the processing device of the vending machine, that a predetermined rule has been satisfied, thereby determining that a process is to be executed to facilitate making the second product next available for vending from the receptacle;
executing, by execution of the stored programming instructions by the processing device of the vending machine, the process; and
outputting, by execution of the stored programming instructions by the processing device of the vending machine, a promotion for the first product in an effort to make the second product available for vending from the receptacle.

5. The method of claim 4, wherein determining that a predetermined rule has been satisfied comprises:
determining that a demand for the second product exceeds a predetermined threshold.

6. A method for obtaining a product from a vending machine comprising:
determining, by execution of stored programming instructions by a processing device of the vending machine and for a receptacle of the vending machine, a first product that is a product next available for vending from the receptacle;
determining, by execution of the stored programming instructions by the processing device of the vending machine and for the receptacle, a second product stored in the receptacle, the second product being stored behind the first product and thus not being next available for vending from the receptacle;
determining, by execution of the stored programming instructions by the processing device of the vending machine, that a predetermined rule has been satisfied by determining that a consumer has indicated an interest in purchasing the second product and that the second product is not next available for vending from any other receptacle of the vending machine, thereby determining that a process is to be executed to facilitate making the second product next available for vending from the receptacle;
executing, by execution of the stored programming instructions by the processing device of the vending machine, the process.

7. The method of claim 4, wherein determining that a predetermined rule has been satisfied comprises:
determining that a demand for the first product is below a predetermined threshold.

8. The method of claim 4, wherein determining that a predetermined rule has been satisfied comprises:
determining that profit management data indicates that it would be advantageous to an operator of the vending machine for the second product to be next available for vending from the receptacle.

9. The method of claim 8, wherein the product inventory management data comprises at least one of the following:
a profitability of at least one of the first product and the second product;
a cost to the operator of at least one of the first product and the second product;
an ideal product velocity of at least one of the first product and the second product;
a current product velocity of at least one of the first product and the second product;
a request from a customer for the first product; and
an indication of positions in which units of at least one of the first product and the second product are located within the vending machine.

10. A vending machine, comprising:
a serial product storage device configured to store units of products in series such that only a subset of all units of products stored in the vending machine are available as next-to-vend;
a processor; and
a memory in communication with the processor, the memory storing instructions that when executed by the processor cause the vending machine to:

receive, from a first customer, an indication that the first customer desires to purchase a first unit of a product that is blocked by a second unit that is next-to-vend; and transmit, when the second unit is vended to a second customer, making the first unit of the product next-to-vend, a message to a device associated with the first customer, the message indicating that the first unit is now available as next-to-vend.

11. A vending machine comprising a plurality of product receptacles, each receptacle storing a plurality of units of product in series, wherein only a first unit of product in each series is available as next-to-vend at any given time, and wherein the vending machine comprises a processor and a memory in communication with the processor, the memory storing instructions that when executed by the processor cause the vending machine to allow a customer to select for purchase a unit of product that is blocked by one of the first units of product that is next-to-vend.

12. The vending machine of claim 11, wherein the instructions, when executed by the processor, further cause the vending machine to sell, to the customer, the unit of product selected by the customer.

13. The vending machine of claim 12, wherein the selling of the unit of product selected by the customer is conducted by selling the selected product for a price higher than an advertised price of the selected product.

14. The vending machine of claim 12, wherein the selling of the unit of product selected by the customer comprises vending the one of the first units of product that is blocking the selected unit of product, thereby making the selected unit of product next-to-vend.

\* \* \* \* \*